US009759420B1

(12) United States Patent
Baloga

(10) Patent No.: US 9,759,420 B1
(45) Date of Patent: Sep. 12, 2017

(54) CURVED DISPLAY AND CURVED DISPLAY SUPPORT

(71) Applicant: Mark A Baloga, East Grand Rapids, MI (US)

(72) Inventor: Mark A Baloga, East Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 131 days.

(21) Appl. No.: 14/500,091

(22) Filed: Sep. 29, 2014

Related U.S. Application Data

(63) Continuation-in-part of application No. 14/159,589, filed on Jan. 21, 2014, now Pat. No. 9,261,262.

(60) Provisional application No. 61/756,753, filed on Jan. 25, 2013, provisional application No. 61/886,235, filed on Oct. 3, 2013, provisional application No. 61/911,013, filed on Dec. 3, 2013.

(51) Int. Cl.
*A47B 23/06* (2006.01)
*F21V 33/00* (2006.01)
*F21S 8/08* (2006.01)
*F21V 21/30* (2006.01)
*F21W 131/301* (2006.01)

(52) U.S. Cl.
CPC ............ *F21V 33/0012* (2013.01); *F21S 8/08* (2013.01); *F21V 21/30* (2013.01); *F21W 2131/301* (2013.01)

(58) Field of Classification Search
CPC ............ F21V 21/00; A47B 2200/0071; G09F 15/0068
See application file for complete search history.

(56) References Cited

U.S. PATENT DOCUMENTS

| 4,920,458 | A | * | 4/1990 | Jones | A47B 83/001 248/917 |
|---|---|---|---|---|---|
| 6,540,094 | B1 | * | 4/2003 | Baloga | G09F 7/08 211/169 |
| 7,821,510 | B2 | | 10/2010 | Aksemit et al. | |
| 8,433,759 | B2 | | 4/2013 | Styles et al. | |
| 8,464,184 | B1 | | 6/2013 | Cook et al. | |
| 8,600,084 | B1 | | 12/2013 | Garrett | |
| 2007/0069975 | A1 | * | 3/2007 | Gettemy | G06F 1/1615 345/1.3 |

(Continued)

FOREIGN PATENT DOCUMENTS

| AU | 2011101160 B4 | 10/2011 |
|---|---|---|
| CA | 2806804 A1 | 8/2013 |

(Continued)

OTHER PUBLICATIONS

Beaudouin-Lafon, et al., Multisurface Interaction in the Wild Room, IEEE Computer, IEEE, 2012, Special Issue on Interaction Beyond the Keyboard, 45(4):48-56.

(Continued)

*Primary Examiner* — Evan Dzierzynski
(74) *Attorney, Agent, or Firm* — Quarles & Brady LLP

(57) ABSTRACT

A flexible display includes surfaces that can be folded, bent, or curved into a workstation, kiosk, or other configuration. The surfaces in the flexible display can be bent or folded to provide viewing surfaces in various planes. A controller can configure the display to provide selected functions on the various defined surfaces. A number of display stands for mounting the displays are also disclosed.

47 Claims, 53 Drawing Sheets

(56) References Cited

U.S. PATENT DOCUMENTS

| | | |
|---|---|---|
| 2007/0157089 A1 | 7/2007 | Van Os et al. |
| 2009/0254843 A1 | 10/2009 | Van Wie et al. |
| 2009/0285131 A1 | 11/2009 | Knaz |
| 2010/0148647 A1* | 6/2010 | Burgess ............... A47B 21/00 312/327 |
| 2012/0013539 A1 | 1/2012 | Hogan et al. |
| 2012/0030567 A1 | 2/2012 | Victor |
| 2012/0066602 A1 | 3/2012 | Chai et al. |
| 2012/0102111 A1 | 4/2012 | Salesky et al. |
| 2012/0162351 A1 | 6/2012 | Feldman et al. |
| 2012/0216129 A1 | 8/2012 | Ng et al. |
| 2013/0019195 A1 | 1/2013 | Gates |
| 2013/0091205 A1 | 4/2013 | Kotler et al. |
| 2013/0091440 A1 | 4/2013 | Kotler et al. |
| 2013/0103446 A1 | 4/2013 | Bragdon et al. |
| 2013/0159917 A1 | 6/2013 | Loebach |
| 2013/0169687 A1 | 7/2013 | Williamson et al. |
| 2013/0185666 A1 | 7/2013 | Kenna, III et al. |
| 2013/0194238 A1 | 8/2013 | Sakai |
| 2013/0222266 A1 | 8/2013 | Gardenfors et al. |
| 2013/0226444 A1 | 8/2013 | Johansson et al. |
| 2013/0227433 A1 | 8/2013 | Doray et al. |
| 2013/0227478 A1 | 8/2013 | Rydenhag et al. |
| 2013/0232440 A1 | 9/2013 | Brown et al. |
| 2013/0246529 A1 | 9/2013 | Salesky et al. |
| 2013/0249815 A1 | 9/2013 | Dolan et al. |
| 2013/0275883 A1 | 10/2013 | Bharshankar et al. |

FOREIGN PATENT DOCUMENTS

| | | |
|---|---|---|
| CN | 202602701 U | 12/2012 |
| CN | 202773002 U | 3/2013 |
| EP | 1659487 A2 | 5/2006 |
| EP | 1986087 A2 | 10/2008 |
| EP | 2400764 A2 | 12/2011 |
| EP | 2444882 A1 | 4/2012 |
| EP | 2464082 A1 | 6/2012 |
| EP | 2632187 A1 | 8/2013 |
| EP | 2665296 A2 | 11/2013 |
| EP | 2680551 A1 | 1/2014 |
| WO | 2004075169 A2 | 9/2004 |
| WO | 2006048189 A1 | 5/2006 |
| WO | 2007143297 A2 | 12/2007 |
| WO | 2008043182 A1 | 4/2008 |
| WO | 2010017039 A2 | 2/2010 |
| WO | 2010033036 A1 | 3/2010 |
| WO | 2011005318 A2 | 1/2011 |
| WO | 2011041427 A2 | 4/2011 |
| WO | 2011084245 A2 | 7/2011 |
| WO | 2011133590 A1 | 10/2011 |
| WO | 2011149560 A1 | 12/2011 |
| WO | 2012015625 A2 | 2/2012 |
| WO | 2012037523 A1 | 3/2012 |
| WO | 2012048007 A2 | 4/2012 |
| WO | 2012100001 A1 | 7/2012 |
| WO | 2012116464 A1 | 9/2012 |
| WO | 2012162411 A1 | 11/2012 |
| WO | 2013009092 A2 | 1/2013 |
| WO | 2013021385 A2 | 2/2013 |
| WO | 2013023183 A1 | 2/2013 |
| WO | 2013029162 A1 | 3/2013 |
| WO | 2013074102 A1 | 5/2013 |
| WO | 2013124530 A1 | 8/2013 |
| WO | 2013154827 A1 | 10/2013 |
| WO | 2013154829 A1 | 10/2013 |
| WO | 2013154831 A1 | 10/2013 |
| WO | 2013156092 A1 | 10/2013 |

OTHER PUBLICATIONS

Takanashi, et al., Human-Computer Interaction Technology Using Image Projection and Gesture-Based Input, NEC Technical Journal, 2013, 7(3):122-126.

\* cited by examiner

CURVED DISPLAY AND CURVED DISPLAY SUPPORT

CROSS-REFERENCE TO RELATED APPLICATIONS

This application is a continuation-in-part of U.S. patent application Ser. No. 14/159,589 which was filed on Jan. 21, 2014 which is titled "Emissive Shapes And Control Systems" and also claims priority there through to US provisional patent application No. 61/756,753 which was filed on Jan. 25, 2013 which is titled "Emissive Shapes And Control Systems" and claims priority to provisional U.S. patent application No. 61/886,235 which was filed on Oct. 3, 2013 which is titled "Emissive Surfaces And Workspaces Method And Apparatus" as well as to U.S. provisional patent application No. 61/911,013 which was filed on Dec. 3, 2013 which is titled "Curved Display And Curved Display Support", each of which is incorporated herein in its entirety by reference.

STATEMENT REGARDING FEDERALLY SPONSORED RESEARCH OR DEVELOPMENT

Not applicable.

BACKGROUND OF THE INVENTION

The present invention relates to curved and/or flexible display screens for displaying output from a computer or other video driver, and more particularly to structures designed to support such screens for viewing by a user as well as structures that can be configured using these screens such as workstations, kiosks and other furniture artifacts.

Most computers include one or more input devices enabling user interaction with computer applications as well at least one display screen for presenting computer application output. Keyboards were some of the first computer input devices available and enabled text input, movement of a cursor on a screen via arrow key and some other rudimentary input activities. Mechanical mouse type devices were developed to increase a user's ability to quickly move about on a display screen and to rapidly interact with graphical application tools on a screen by dragging a mouse controlled cursor about on the screen.

After keyboards and mouse devices, the next substantial change in input devices occurred with the development of touch sensitive display technology which enables users to touch a display screen in order to interact with content on the screen. For instance, with application control icons on a display, a user can touch an icon with a finger tip to select the icon. In some cases a user can move a finger on a screen to draw a line or other artifact. In other cases a user can perform a swiping action of a screen to cause some activity to occur. In still other cases a user may use a virtual keyboard presented on a screen to enter text or other information into an application program. In addition to eliminating the need for other mechanical devices to interact with a computer program, virtual touch type interface screens have enabled development of many new types of interface features and has enabled a single device (e.g., the touch screen) to morph into many different types of interfaces.

Regarding display screens, in general there has been a constant drive toward providing computer display screen configurations that tend to increase the sense of user immersion in content being presented on the screens. In addition to helping a user focus on presented content by blocking out distractions, additional screen space or emissive surface enables users to simultaneously open and view output from many different application programs which increases productivity in most cases.

One way to increase the sense of immersion has been to simply increase the size of a single flat panel LCD, plasma, or other type of computer display screen. For instance, while early computers had screens with diagonal dimensions of eight or less inches, many computers today come equipped with screen that are twenty-seven inches or more diagonally. One problem with increasing the size of a single screen too much is that peripheral portions of a large screen near a user at a workstation or the like become burdensome to view. For instance, if a sixty inch screen were placed two feet from a user's eyes at a workstation, the user would literally have to turn her head to the side and perhaps upward to see peripheral portions of the screen. Another problem with extremely large displays is that a user's perspective is often skewed with respect to content presented on peripheral portions of such displays rendering the content more difficult to understand.

In some cases, instead of providing a single large flat panel display, several smaller flat panel displays have been arranged edge to edge with viewing surfaces angled toward each other to be concave generally about a user's point of view. For instance, several configurations may include two or three flat panel displays arranged in a horizontal fashion with respect to each other to surround a user's workstation. Here, more pixels are provided that are all within a relatively tight range of distances from the user's eyes so that the user's perspective with respect to all portions of the emissive surfaces are acceptable. An added benefit here is that the displays themselves form an alcove about a user's workstation helping to create a private workspace for the user. In some cases, in addition to arranging displays edge to edge in a horizontal line, one or more displays may be arranged in non-vertical planes to increase the immersive feeling. For instance, a second screen may be placed adjacent a top horizontal edge of a first vertical screen and angled toward a workstation space when moving from a lower edge toward a top edge. One problem with smaller adjacent screens has been that screen bezels between emissive surfaces of adjacent screens are distracting to screen users. Bezels that break up emissive surface are also aesthetically unappealing.

In still other cases some companies including Samsung, LG and others have developed organic light emitting diode (OLED) display screens that can be formed into rigid curved emissive surfaces. For instance, these companies have developed screens that gradually curve about a single vertical axis so as to surround a space to be occupied by a user. This solution can be arranged at a workstation to provide a single emissive surface where all portions of the surface are within an acceptable distance range of the location of a user's eyes for viewing. Nevertheless, this solution does not enable a configuration where a screen can include both a curved vertical portion as well as non-vertical portions that may be useful as an overhead display portion, the top of a horizontal desktop, etc.

In addition to enabling construction of rigid curved emissive surfaces, OLEDs have also enabled construction of bendable and flexible emissive surfaces. To this end, OLEDs may be disposed on a flexible substrate comprising fabrics plastic, a foil or some other suitable type of flexible material. These flexible displays are capable of providing the same type of performance as glass-substrate displays, but can be used to arrange additional viewing and display configurations, since they can be formed into shaped surfaces (for example convex, concave, tubular, conical and spherical).

In other cases people have developed projector screens that form a portion of a sphere to surround a user and have provided one or more projectors to project images onto outer surfaces of the spherical screens to facilitate immersive content display. Unfortunately, projectors require projection space and therefore usually require much more space than flat panel devices. In addition, projected images are often not very bright and projectors often have to be used in spaces with low ambient light in order to generate acceptable images.

One other issue related to computer display screens is that many users have specific preferences for how portions of the emissive surface used by the user should be arranged and those preferences may change as the user uses a work station for different purposes. For instance, when a user uses a workstation for focused independent work, the user may want emissive surface structure to tightly surround the user to increase the immersive effect as well as to increase the user's sense of privacy. In contrast, when a user wants to share content on screens with a colleague, the user may want to reduce concavity of a display arrangement so the user and colleague can more easily simultaneously view the content on the screens. Some solutions have been developed for changing the angles between adjacent flat panel display screens to accommodate user preferences.

While there have been efforts to combine touch sensitive technology with workstation displays, most of those efforts have not been well received. For instance, many computers now come equipped with large touch sensitive displays as well as other input devices such mechanical keyboards, mouse type devices, etc. In most cases, while touch capability is technologically impressive, users routinely use the mechanical interface devices instead of the touch sensitive screens for several reasons. First, using a vertical touch sensitive screen is often ergonomically awkward. For instance, when a keyboard is generated on a vertical workstation screen a, use requires a user to position hands awkwardly relative to the keyboard in order to type in text. Second, prolonged use of a vertical touch sensitive interface would result in physical pain in many cases. To understand this point one only needs to hold an arm horizontally for a few minutes and feel the resulting fatigue. Touch screen use requiring a stretched out arm over the course of a day simply is intolerable for most workstation users. Thus, despite the advantages (e.g., reduction in hardware costs, ability to provide many different types of interfaces using a single touch sensitive screen, a more aesthetically pleasing and less cluttered overall workstation appearance, etc.) associated with virtual touch sensitive interfaces, most work stations still include mechanical interface options and most workstation users only use the touch sensitive capabilities sparingly.

Thus, there is a need for an optimized workstation configuration that can provide a continuous emissive surface (e.g., without intermediate bezels) with emissive portions at locations within a range of distance from a user's eyes that is suitable for generally non-skewed viewing and where the emissive surface is concave around more than one non-parallel axis for providing optimized substantially vertical surfaces as well as non-vertical surfaces for privacy, to support other type of work and for presenting virtual interfaces for touch input and control. In some cases there is also a need for a bendable emissive surface having a changeable shape and a structure for supporting the surface in a selected shape that is preferred by a user.

BRIEF SUMMARY OF THE DISCLOSURE

It has been recognized that existing flexible or curved screen technology can be used to configure static workstation structures that are optimized for creating immersive digital environments. To this end, existing screen technology enables a screen to be relatively inexpensively bent or formed about a single axis but not about a single point. For instance, existing technology has been used to bring curved screens to market by several manufacturers where the screens are bent or curved about a vertical axis. That same relatively affordable technology cannot be used to form an emissive sphere about a single point or, for that matter, a portion of a sphere about the general location of a workstation user's eyes or any other shape that has concavity in more than one plane about a single point.

According to some aspects of the present disclosure, flexible or bendable display screens or technology that can be used to create curved screens is used to form a single fixed emissive surface where different portions of the emissive surface curve or bend about different non-parallel axis. Different curved screen portions can be arranged to form different parts of a workstation. In addition to being optimized for function, workstations configured using a single emissive surface structure with two or more portions that curve about different non-parallel axis are often aesthetically very attractive. Other features and aspects of emissive surface workstations are contemplated that facilitate other useful functions.

It has also been recognized that support structure for bendable display screens is needed where the support structure will be able to support bendable screens in an upright orientation and with different relative degrees of bending.

At least some embodiments of the present invention include a furniture assembly including emissive surfaces on which dynamic information may be presented. The assembly may include a first emissive surface section including at least a first straight peripheral portion and at least a first curved portion that curves about at least a first axis. The curved portions of the first emissive surface section curve about an axis that is substantially parallel to the at least a first axis. A second emissive surface section includes at least a second curved portion that curves about at least a second axis, the curved portions of the second emissive surface section curving about an axis that is substantially parallel to the at least a second axis. The second emissive surface section is adjacent to and abuts the first straight peripheral portion along the length of the first straight peripheral portion. The second axis is non-parallel to the first axis. A driver is provided for controlling information presented on the emissive surface sections.

The emissive surface sections can comprise electronic displays. The first and second emissive surface sections can be integrally formed along the first straight peripheral portion. The emissive surfaces can also be contiguous across the first straight peripheral portion. The furniture assembly can also include a support structure for supporting the first and second emissive surface sections.

The first axis can be substantially horizontal and the second axis can form at least some angle with a horizontal plane. The first curved portion can be adjacent the first straight peripheral portion and the first emissive surface section can include a first substantially flat portion adjacent the first curved portion. The second emissive surface can also include a second substantially flat portion adjacent the first straight peripheral portion and that separates the second curved portion from the first straight peripheral portion. The second substantially flat portion can reside in a plane that forms a presentation angle with a vertical plane wherein the presentation angle is between zero degrees and forty-five degrees. The presentation angle can also be between zero degrees and fifteen degrees. The first substantially flat portion can be substantially trapezoidal.

The first straight peripheral portion can be substantially parallel to the first axis. The second axis can be substantially perpendicular to the first axis. The second axis can form one of an acute angle and an obtuse angle with the first axis.

The second emissive surface can further include at least a second straight peripheral portion, and at least a third emissive surface section including at least a third curved portion that curves about at least a third axis, curved portions of the third emissive surface section curving about axis that are substantially parallel to the at least a third axis. The third emissive surface section can be adjacent to and abutting the second straight peripheral portion along the length of the second straight peripheral portion. The third axis can be non-parallel to the second axis. The first straight peripheral portion can be substantially parallel to the first axis. The second axis can be substantially perpendicular to the first axis.

In another aspect of the invention, the emissive surface sections form a workstation, the first emissive surface section forming a substantially horizontal work surface and the second emissive surface section forming at least a partially upright display surface. The partially upright display surface can include at least a flat portion. The flat portion can be substantially vertical. The flat portion can be centrally located with respect to the horizontal work surface, the second emissive surface section including a third curved portion and wherein the second and third curved portions are on opposite sides of the flat portion.

The first emissive surface section and the second emissive surface section can be independently formed and can include a support structure for supporting the second emissive surface section adjacent the first emissive surface section.

In another aspect, the present disclosure provides a furniture assembly including emissive surfaces on which dynamic information may be presented. The assembly comprises a plurality of emissive surface sections, each emissive surface section including at least one curved portion that curves about at least one axis that is unique to the specific emissive surface section, each emissive surface section including curved portions that curve about axes that are substantially parallel to each other. Each emissive surface section abuts at least one other emissive surface section only along a straight line between the abutting emissive surface sections. A driver controls information presented on the emissive surface sections.

The plurality of emissive surface sections can include at least a second emissive surface section that abuts a first emissive surface section and a third emissive surface section that abuts the second emissive surface section. At least one of the emissive surface sections can include a flat emissive surface portion. At least one of the emissive surface sections can include at least a second curved portion. The at least one curved portion and the second curved portion formed by the at least one of the emissive surface sections can be separated by the flat emissive surface portion.

The emissive sections can form a workstation, and the workstation can include a substantially horizontal and flat work surface and at least one heads up display surface that forms an angle with a horizontal plane. The emissive surfaces can also form a cavity. The curved portions can be concave to a first side of the workstation.

In another aspect, the disclosure describes a furniture assembly including emissive surfaces on which dynamic information may be presented. The assembly comprises a plurality of emissive surface sections, each emissive surface section including at least one curved portion that curves about at least one axis that is unique to the specific emissive surface section, each emissive surface section including curved portions that curve about axes that are substantially parallel to each other. Each emissive surface section abuts at least one other emissive surface section only along a straight line between the abutting emissive surface sections. A driver controls information presented on the emissive surface sections, wherein the emissive surface sections form a workstation including at least a substantially flat and substantially horizontal surface, an upright primary display surface and at least a first upright peripheral display surface wherein the primary display surface is located adjacent a rear edge of the horizontal surface and the at least a first peripheral display surface is located along a lateral edge of the primary display surface.

The workstation can further include at least a second upright peripheral display surface wherein the second upright peripheral display surface is located along a lateral edge of the primary display surface opposite the first upright peripheral display surface.

The emissive surfaces can be contiguous between adjacent sections.

In another aspect the disclosure describes a display assembly for presenting information. The display assembly comprises a support arm sub-assembly including a base and a support arm member having proximal and distal ends, the proximal end mounted to the base and the distal end opposite and extending from the proximal end. An electronic screen for presenting the information forms a contiguous emissive surface, and includes at least a portion of the emissive surface that is bendable to adjust concavity of the emissive surface along a cross section through the surface. A screen supporter can engage the screen structure and maintains the instantaneous shape of the emissive surface in the absence of an applied force that exceeds a threshold force, and can be mounted to the distal end of the support arm. The emissive surface can have first and second lateral edges and a distance between the first and second lateral edges can change as the concavity of the emissive surface is adjusted.

The display assembly can include a processor for presenting information on the emissive surface, the processor altering information presented on the emissive surface as a function of the shape of the emissive surface. The information on the emissive surface can include output from an application program including at least one tool bar. At least one feature of the tool bar can be modified as the shape of the emissive surface is adjusted. The display assembly can also include at least one sensor for sensing at least one characteristic of the shape of the emissive surface. The processor can alter information presented on the emissive surface as a function of the shape of the emissive surface.

In another aspect, the disclosure provides a display assembly for presenting information, the display assembly includes an electronic screen for presenting the information, the screen forming a contiguous emissive surface wherein at least a portion of the emissive surface is bendable to adjust concavity of the emissive surface along a cross section through the surface. At least one sensor senses the shape of the emissive surface. A processor can be linked to the sensor, the processor altering information presented on the emissive surface as a function of the shape of the emissive surface.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
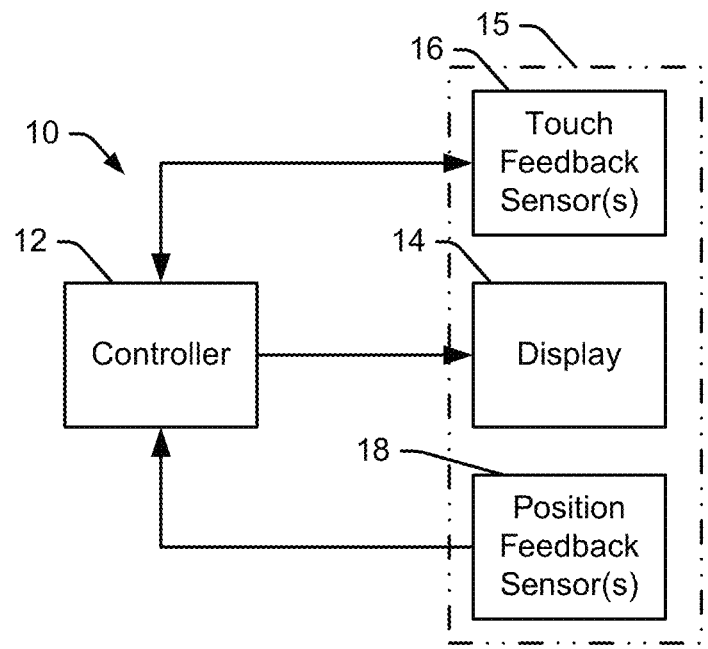
FIG. 1 is a block diagram of a first embodiment of a workstation comprising a flexible display.

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs. Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, a block diagram of a first embodiment of a display system 10 that includes a controller 12 and an emissive surface or display screen assembly 15 is shown. Assembly 15 includes an emissive surface or display screen 14 and, in at least some embodiments, a touch sensor or array of sensors 16. Controller 12 includes a processor, a power supply and one or more input ports (e.g., HDMI cables) for receiving digital content for driving emissive surface 14. Controller 12 can also include an embedded memory system, or be in communication with an external memory port or memory device (not shown), which can be used to store applications, content, and display configurations, among other things. Controller 12 drives screen assembly 15 to display dynamic content on emissive surface 14. In addition, in at least some cases controller 12 receives feedback signals from the screen assembly 15 if the screen assembly includes touch sensor 16.

Referring still to FIG. 1, emissive surface 14 may be formed into any of several different shapes, some of which are described hereafter, and may be constructed using any of several different construction techniques. For instance, in at least some cases surface 14 may include a flexible emissive structure that is applied to or otherwise supported by a rigid substructure that causes the flexible emissive structure to assume and be maintained in a desired shape. Here, for instance, the flexible emissive structure may be formed using any of several different fabrication techniques based on any flexible emissive surface technology including but not limited to organic light emitting diode (OLED) technology, plastic liquid crystal display (LCD) technology, plastic plasma display panel (PDP) technology, electronic ink panel technology, organic thin film transistor (OTFT) technology, etc. OLED technology in particular has developed to the point where curved display screens are now being mass produced for consumer markets by companies like Samsung, LG, and others. To this end, see, for instance, US patent application No. 2011/0273411 (hereinafter "the '411 application") titled "Display Device And Method Of Manufacturing The Same" which was filed on Jan. 5, 2011 and which is assigned to Samsung Mobile Display Company, which is incorporated herein in its entirety be reference. The '411 application describes a method for manufacturing an OLED based flexible emissive surface structure where an emissive surface can be bent around either of and X-axis or a Y-axis. See also U.S. Pat. No. 8,518,285 (hereinafter "the '285 patent") which is titled "Substrate Section For Flexible Display Device, Method Of Manufacturing The Substrate Section, And Method Of Manufacturing Organic Light Emitting Display Device Including The Substrate Display" which was filed on Apr. 21, 2010 and which is also assigned to Samsung Mobile Display Company, which is incorporated herein in its entirety be reference. The '285 patent describes fabrication methods useable to construct flexible OLED based emissive surfaces. Many other Samsung and LG patents and applications as well as patents and applications assigned to other entities have been published that teach various aspects of flexible emissive surface fabrication processes and optimized materials for use in such processes, any of which may be combined to construct a flexible emissive surface used to construct a workstation or other furniture artifact having features consistent with the present disclosure.

US patent application No. 2013/0147727 (hereinafter "the '727 application") titled "Touch Screen Integrated Organic Light Emitting Display Device And Method For Fabricating The Same" which was filed on Aug. 22, 2012 and which is assigned to LG Display Co., Ltd., is also incorporated herein by reference. The '727 application describes an OLED based emissive surface that includes hardware for integrating touch sensitivity into a flexible display screen. Here, the touch sensor technology senses location on a screen where a user touches the screen and provides feedback to a screen controller (see again 12 in FIG. 1). Other technology for combining touch sensing and a flexible or curved screen is also contemplated. In addition, touch sensing may be provided using sensors that are independent of the emissive surface screen structure in at least some embodiments.

In some embodiments the entire emissive surface used to form a workstation or other furniture artifact may be touch sensitive. In other embodiments touch sensing may only be supported on specific portions of the emissive surface that are intended to be used for user input (i.e., portions of the surface where touch should be sensed).

Figure 2:
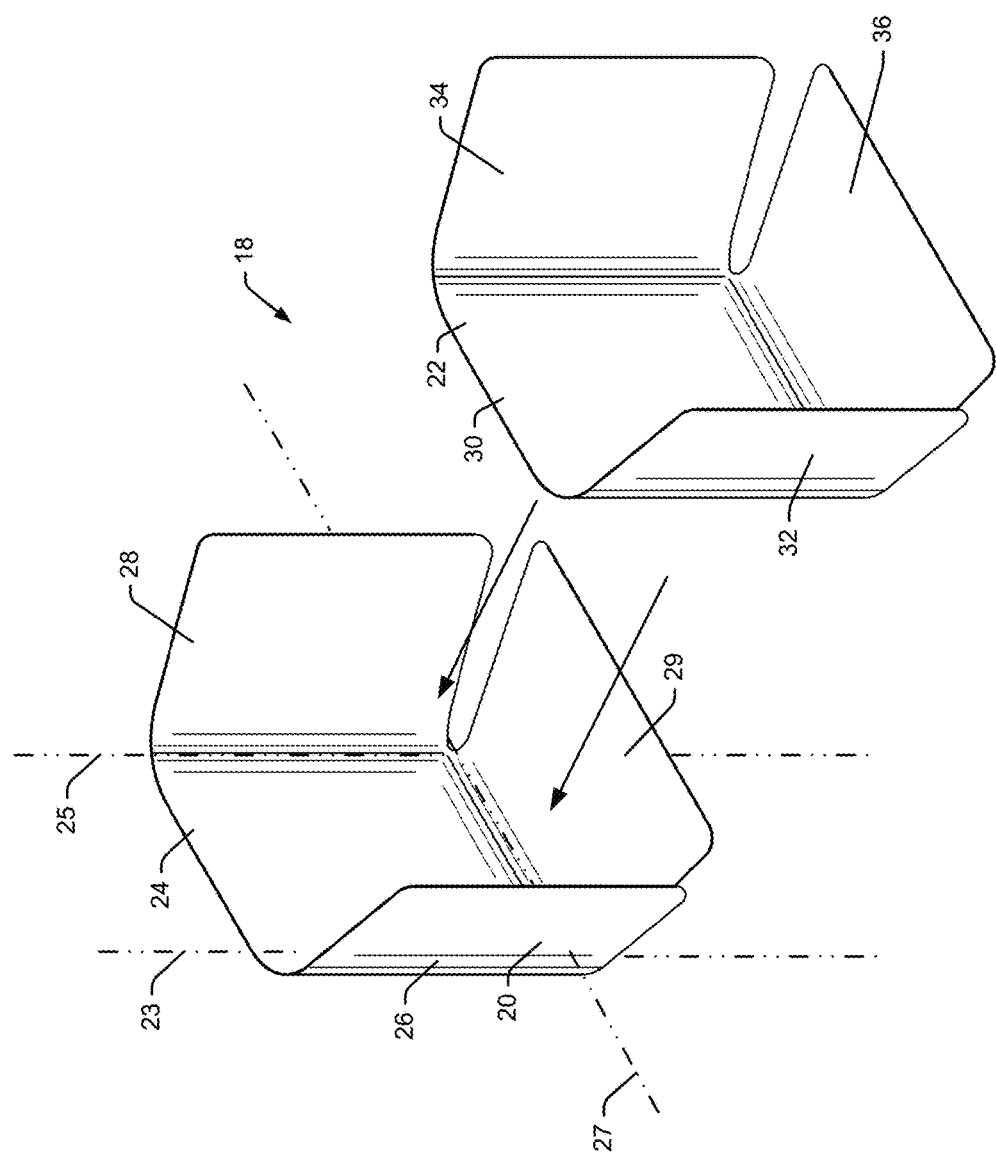
FIG. 2 is an exploded view of an emissive surface and support structure consistent with at least some aspects of the present invention.
Figure 3:
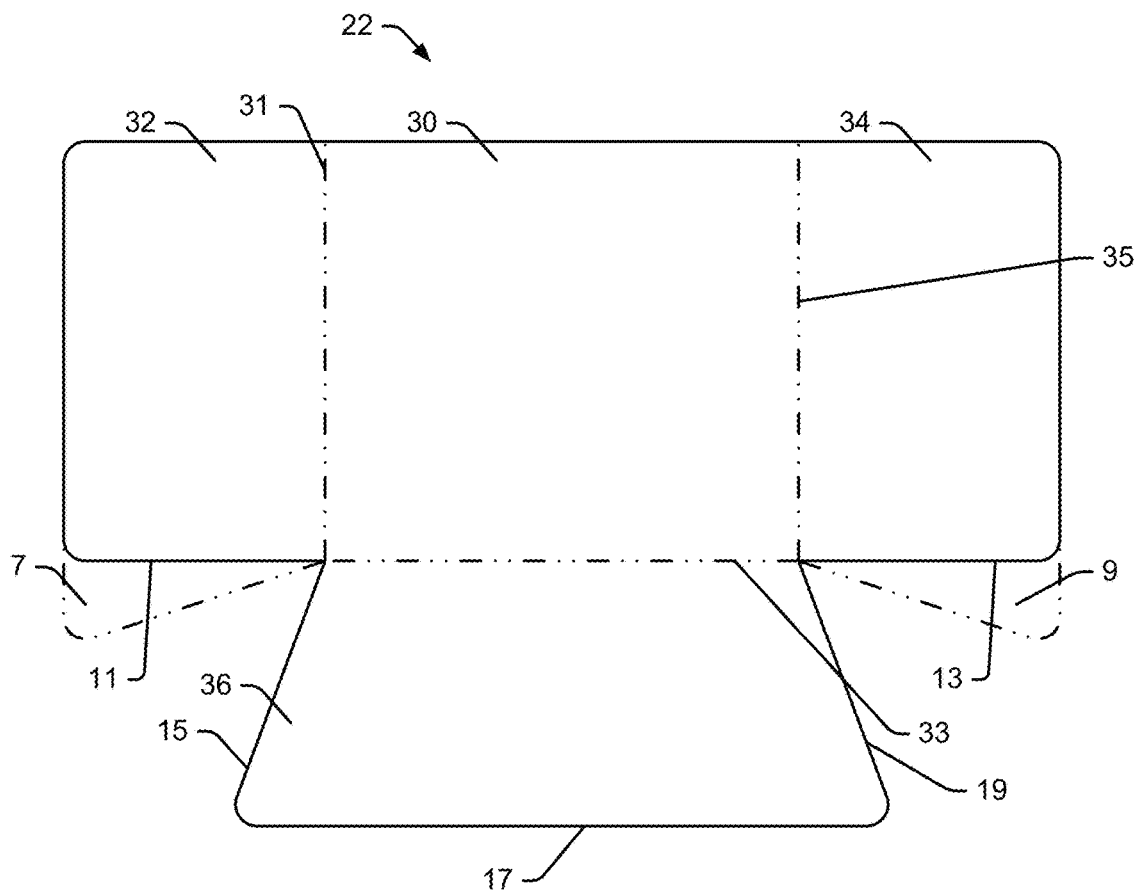
FIG. 3 is a flattened plan view of the emissive surface portion of the structure shown in FIG. 2.

Referring to FIG. 2, a simple exploded view of an exemplary workstation structure 18 is illustrated that includes a rigid supporting substructure 20 as well as a flexible emissive surface structure 22. Referring also to FIG. 3, when laid flat, flexible structure 22 has a T-shape including a central rectangular portion 30 and first and second rectangular side portions 32, 34 as well as a third side portion 36, where first and second side portions 32 and 34 extend from opposite side edges 31 and 35 of central portion 30 and third side portion 36 extends from one of the other side edges 33 of central portion 30. Third side portion 36, as illustrated, is not rectangular and instead has a polygonal shape having an edge adjacent edge 33 that is the length of edge 37, an edge 17 opposite edge 33 that is longer than edge 33 and strait side edges 15 and 19 that angle from opposite ends of edge 33 to opposite ends of edge 17. Thus, each of edges 15 and 19 forms an obtuse angle with edge 33. Bottom edges 11 and 13 of first and second side sections 26 and 28 have length dimensions that are similar to the length dimensions of side edges 15 and 19.

Referring again to FIG. 2, rigid structure 20 may be formed of any rigid material including plastic, glass, metal including aluminum, copper, etc., and may be formed using any of various manufacturing processes. For instance, structure 20 may be formed by bending sheet metal into the illustrated shape or by molding the rigid material into the desired shape. Although shown in its rigid three dimensional form in FIG. 2, if structure 20 were laid flat, in at least the illustrated embodiment structure 20 would have a shape similar to the shape of the emissive structure illustrated in FIG. 3. In other embodiments it is contemplated that a support structure akin to structure 20 may have a shape, when laid flat, that is different than the shape of a flexible emissive surface structure supported thereby. For instance, a support structure 20 may have a laid flat shape that is similar to the shape of an emissive surface to be supported thereby, but that is slightly larger (e.g., one inch in each dimension) so that, after a flexible emissive surface structure is attached to a support, edges of the rigid support protect the flexible emissive surface from impact. In other cases the support structure 20 may include other features built into its shape such as extending plates for mounting other devices such as cameras, speakers, sensors or the like or for supporting the wrists or forearms of a device user. In still other cases, where support structure 20 is molded into a shape, the shape may include some structure that can be easily molded but that cannot be formed by the flexible emissive surface structure 22. For instance, in FIG. 2, the open spaces or slots between section 39 and each of sections 26 and 28 may be completely enclosed during a molding process while still providing support surfaces for the emissive surface structure described here.

In FIG. 2, structure 20 includes a plurality of flat sections that are joined along common edges by a plurality of curved sections. More specifically, structure 20 includes a vertical upright central flat section 24, a substantially horizontal flat section 29 and first and second flat lateral or wing sections 26 and 28, respectively. Between flat sections 24 and 29, structure 20 curves generally about a horizontal axis 27. Here and throughout this specification, while curvature about an axis may require that the degree of curvature about an axis be constant throughout the curved section, it is also contemplated that the degree of curvature may vary along the dimension of the curved section between two adjoined flat sections or between edges of a curved section. Thus, for instance, the degree of curvature about axis 27 in FIG. 2 may be greater proximate flat section 24 than proximate flat section 29 or vice versa. In FIG. 2, because flat sections 30 and 36 are generally vertical and horizontal, respectively, the curved portion about axis 29 curves through approximately 90 degrees.

In addition, it is contemplated that in at least some embodiments where a curved section has a length dimension, the degree of curvature along the length dimension may increase or decrease along the length of the section. For instance, in FIG. 2 where section 29 curves about axis 27, the degree of curvature proximate vertical axis 25 may be greater than the degree of curvature proximate vertical axis 23, In this case, where member 24 is vertical, member 29 would angle downward from the end proximate axis 25 to the end proximate axis 23.

Referring still to FIG. 2, between flat sections 24 and 26, structure 20 curves generally about a first vertical axis 23 and between flat sections 24 and 28, structure 20 curves generally about a second vertical axis 25. Again, the degree of curvature about axis 23 and 25 may not be constant throughout the curved portions of structure 20. In FIG. 2 section 26 is arranged such that a front face thereof forms an obtuse angle with respect to a front face of central flat section 24. In at least some embodiments the obtuse angle formed between sections 24 and 26 is similar to the obtuse angle formed between edges 15 and 33 (see again FIG. 3). Similarly, a front face of section 28 forms an obtuse angle with the front surface of section 24 that may be similar to the obtuse angle formed between edges 19 and 33. Because the angles between facing surfaces 24 and 26 and facing surfaces 24 and 28 are similar to the angles between edges 15 and 33 and edges 19 and 33, respectively, after assembly of structure 18, lower edges 11 and 13 of surface structure 20 should be close to and substantially parallel with side edges 15 and 19, respectively.

After support structure 20 is formed as illustrated in FIG. 2 or in some other fashion so that the structure includes the supporting front surfaces shown, the flexible emissive surface structure 22 may be mounted to the front facing surfaces of structure 20 in any suitable manner. For instance, emissive surface structure 22 may be adhered to the front facing surfaces of structure 20. As another instance, structure 22 may be mechanically clipped into structure 20 via screws, bolts, brackets, or any other known mechanical fasteners.

During assembly, because each portion of emissive surface structure 22 can flex about any one of several different axis, structure 22 will assume the form of support structure 20 when mounted or attached thereto. Thus, for instance, as structure 22 is fitted into the space formed by structure 20, sections 30, 32, 34 and 36 will naturally align with front surfaces of members 24, 26, 28 and 29 and portions of structure 22 between the flat sections will assume the curved shape of the front surfaces of the curved portions of structure 20. To this end, see FIG. 4 that shows structure 22 mounted to structure 20 where structure 22 assumes that shape of the underlying support structure 20.

Here, it should be appreciated that because no portion of flexible emissive surface structure 22 is required to form about a point or to curve about more than one axis, the illustrated emissive surface shape can be provided using current flexible emissive surface technology. Thus, for instance, the portion of surface structure 22 between sections 30 and 36 only curves about a single axis 33, the portion of surface structure 22 between sections 30 and 32 only curves about a single axis 31 and the portion of surface structure 22 between sections 30 and 34 only curves about single axis 35.

Figure 4:
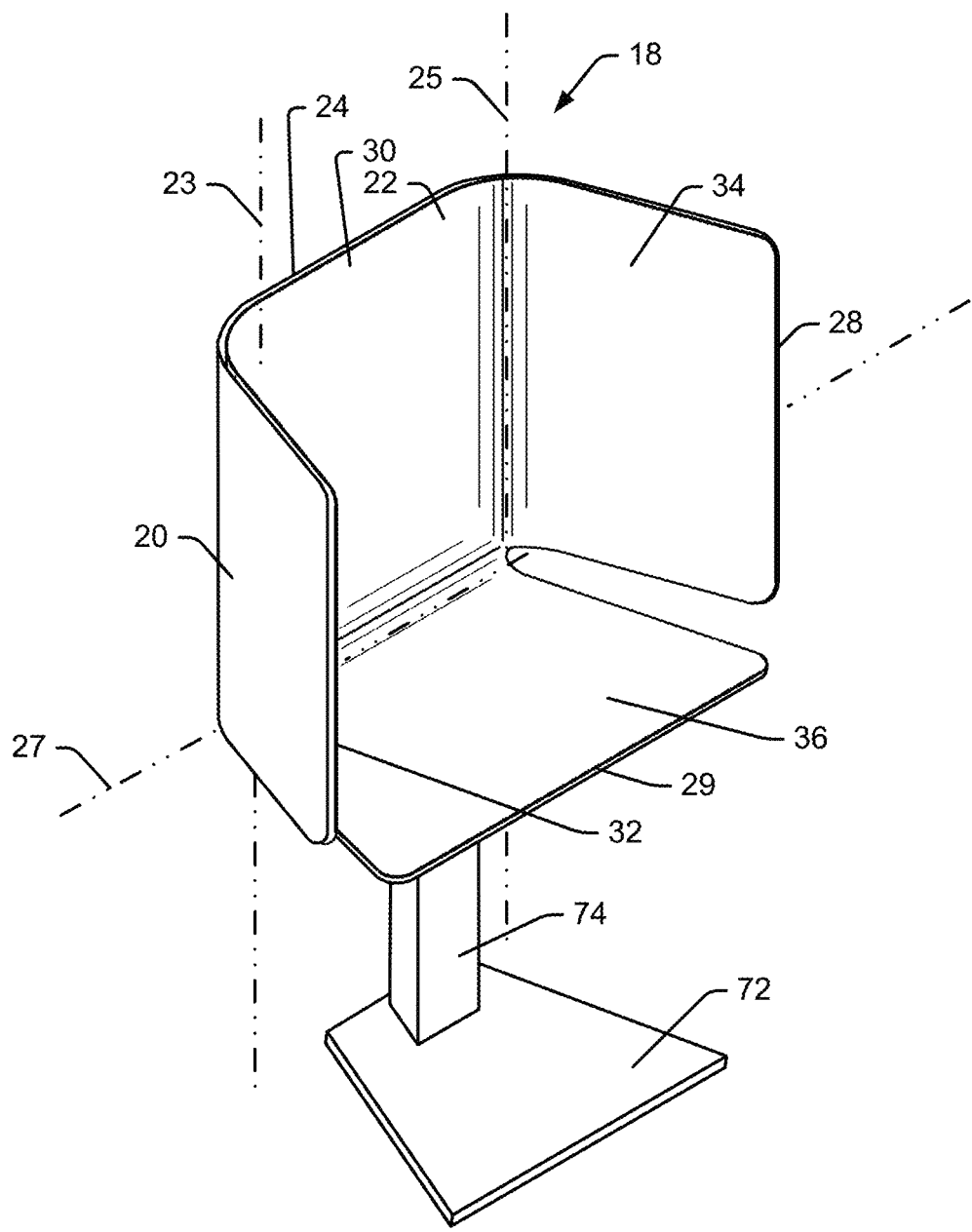
FIG. 4 is a perspective view of the structure of FIG. 2, albeit supported by a support structure.
Figure 5:
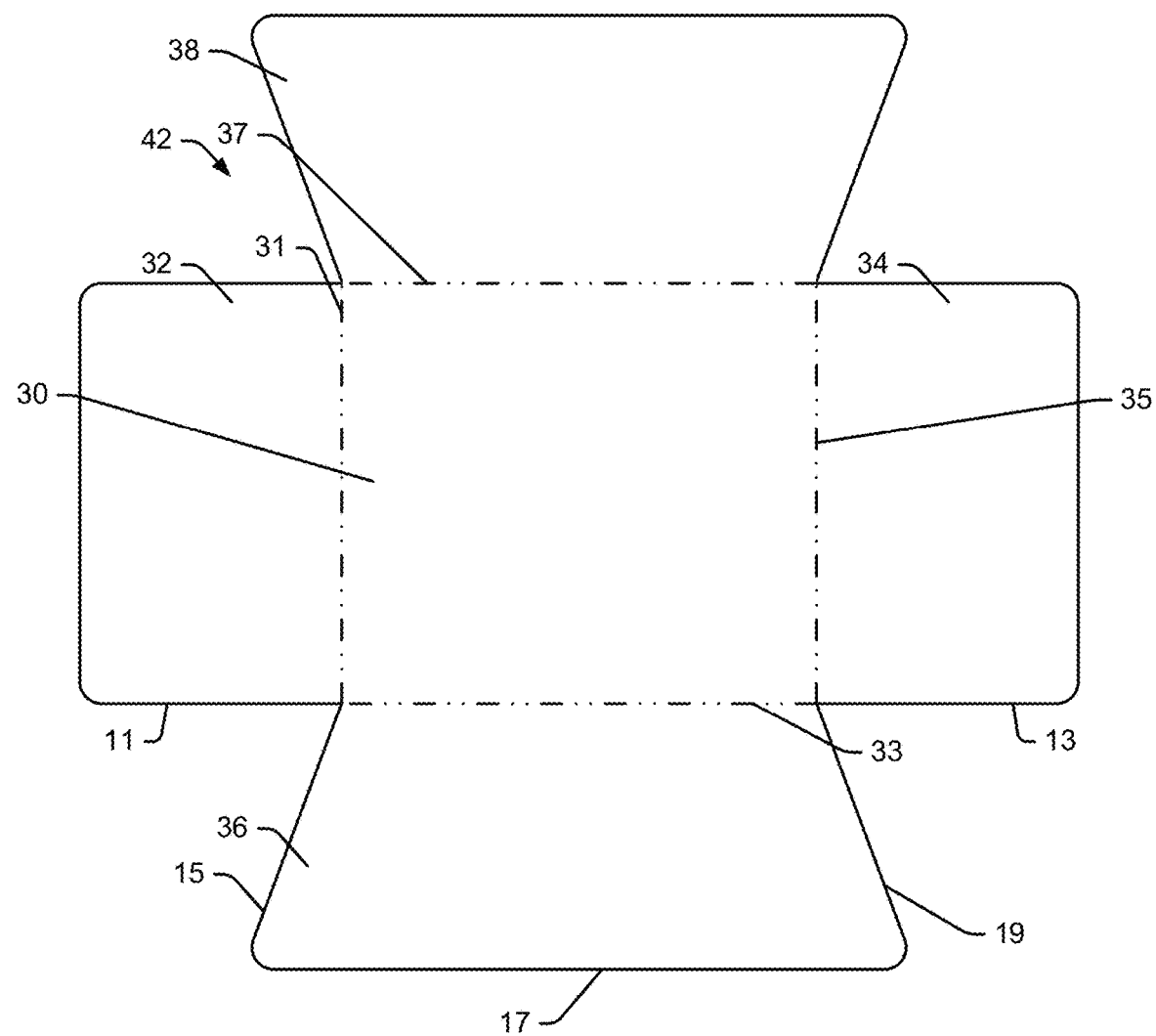
FIG. 5 is a view similar to FIG. 3, albeit showing a second flattened emissive surface structure.

In FIG. 4, a shape that is particularly useful for constructing a workstation is shown. The shaped structure 18 includes generally vertical upright display screen surface formed by emissive surface sections 30, 32 and 34 as well as a horizontal workstation surface formed by section 36. Section 36 and central section 30 are integrated so that there is no seam between those two sections and digital content may be provided on any portion of those two sections including the curved portion between the two flat areas. Similarly, section 30 is integral with sections 32 and 34 so that there is no seam provided between those sections. While there are open slots between section 36 and each of sections 32 and 34, those slots are provided along lower edges of sections 32 and 34 and therefore are generally out of the way of a user's normal field of view. In at least some embodiments a leg or other supporting structure (see 72/74 in FIG. 4) is mounted to an undersurface of support structure 20 to position assembly 18 at a normal workstation height (e.g., so that the top surface of section 36 is at a height between, for instance, 30 and 44 inches).

Referring still to FIG. 4, the top surface of section 36 of structure 22 is an emissive surface and therefore digital content including virtual interface tools can be provided on the top surface of section 36. For instance, a virtual keyboard may be provided via section 36 for entering text or other information. As another instance, a virtual drawing pad, game interface, content control (e.g., for flipping through pictures, power point presentations, etc.), etc., may be provided on the horizontal surface. By providing touch sensitive virtual interfaces on surface 36, the interfaces are being provided at a location that is ergonomically correct for most workstation users and at a location that most users are already familiar with and like. This should be compared to a case where touch sensitive interfaces are provided on the vertical upright portions of structure 18 that would require a user to routinely outstretch an arm to use. In addition to being awkward to use, vertical virtual touch interfaces tend to cause physical discomfort when used over extended periods. This is not the case with horizontally arranged virtual interfaces where the surface that provides the interface can also be used to provide support for a system user's wrists, forearms, etc.

Thus, while the entire emissive surface in FIG. 4 may be touch sensitive in some embodiments, in other embodiments only the top surface of section 36 may be emissive and in still other embodiments the top surface of section 36 and the curved portion between sections 30 and 36 may be touch sensitive. By providing a surface where only a portion of the surface is touch sensitive, costs associated with fabricating an assembly consistent with the present disclosure may be reduced.

In addition to being used with virtual interfaces, in at least some embodiments workstation structures may include wireless transceivers or mechanical ports for linking with other user input deices such as, for instance, mechanical keyboard, mouse devices, trackball devices, pad type devices, etc.

Referring still to FIG. 4, it should be appreciated that in the illustrated embodiment only portions of the emissive surface structure 22 are required to curve upon installation. Another way to reduce overall cost of an assembly may be to construct the structure 22 to include non-flexible portions as well as flexible portions that connect the non-flexible portions along the locations where the final structure requires curvature. For instance, referring again to FIG. 2, structure 22 may be fabricated so that only portions of sections 32, 34 and 36 proximate section 30 are flexible and where the balance of structure 22 includes four flat non-flexible sections.

Referring still to FIG. 4, while sections 32 and 34 are shown as including curved portions proximate edges 31 and 35 (see also FIG. 3), in other embodiments sections 32 and 34 may also have at least some curvature along their entire dimensions between edges 31 and 35 and the edges opposite edges 31 and 35. Here, the curvature along section 32 between edge 31 and the opposite edge of member 32 may be appreciably greater adjacent edge 31 and tapper off near the distal opposite edge. Similarly, the curvature along section 34 between edge 35 and the opposite edge of member 34 may be appreciably greater adjacent edge 35 and tapper off near the distal opposite edge.

In addition, while section 30 is described above as being substantially vertical, section 30 may in some embodiments be angled rearward from lower edge 33 to the opposite top edge of section 30. Where section 30 is angled rearward, sections 32 and 34 may extend as shown in phantom in FIG. 3 at 7 and 9 to better fill the gaps between section 32 and section 36 and between sections 34 and 36.

Referring now to FIGS. 5 through 12, other emissive surface structures are shown in laying flat orientations and in orientations that the structures would assume after being mounted to or otherwise attached to supporting substructures which are not shown. Thus, for instance, in FIGS. 5 and 6, a single emissive surface structure 42 is shown in its laying flat orientation and in a shape that the structure 42 would assume after being mounted to a support structure (not shown), receptively.

Figure 6:
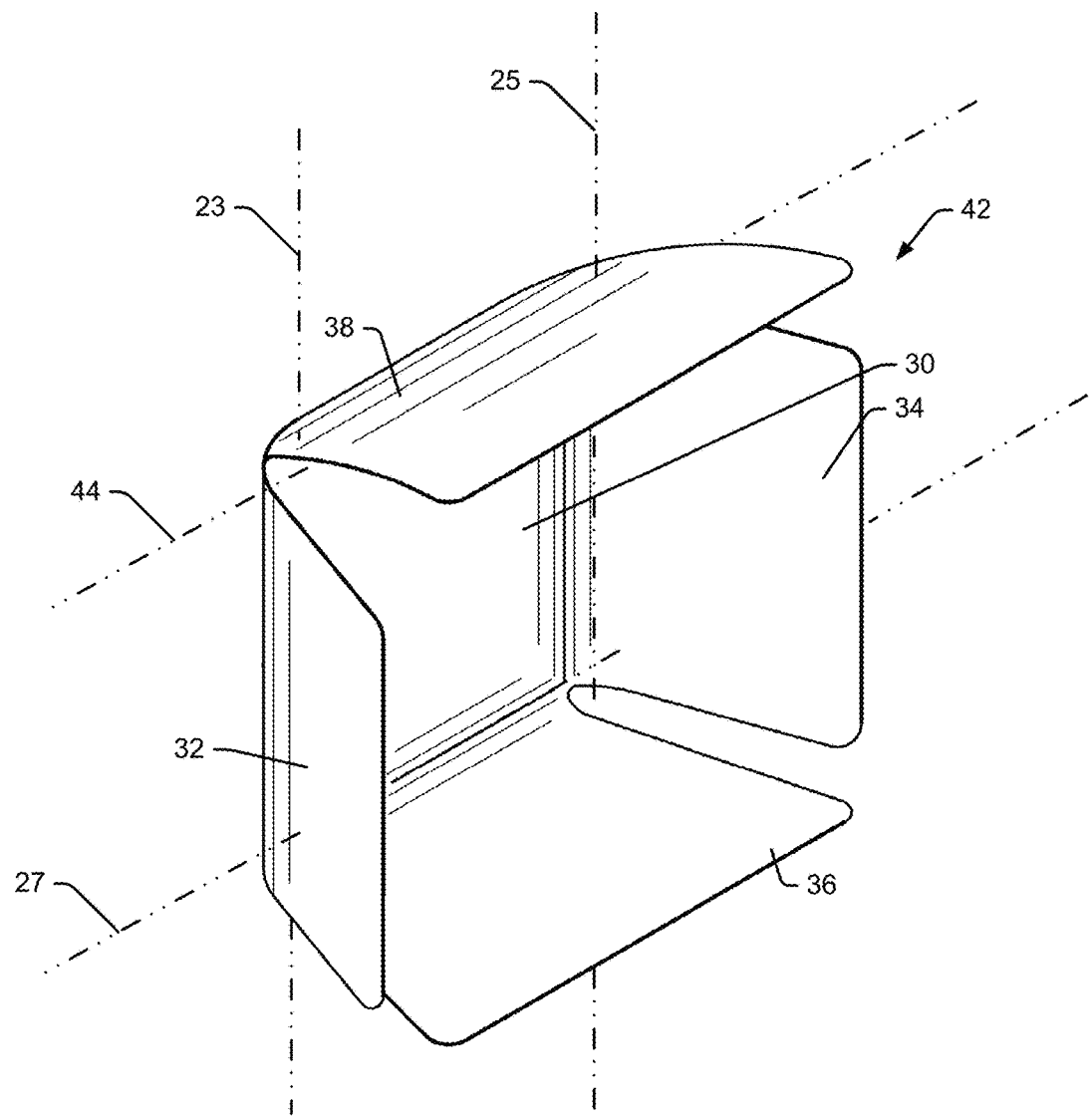
FIG. 6 is a plan view of the structure shown in FIG. 5, albeit bent into a workstation configuration.

Referring again to FIGS. 5 and 6, a lying flat shape of an emissive surface structure 42 and the shape of structure 42 after mounting to a support substructure are shown, respectively. Emissive surface structure 42 is similar to the emissive surface structure 22 described above with respect to FIG. 3, albeit where structure 42 includes a fourth side section or portion 38 along an edge 37 of central portion 30 opposite section 36. The shape of section 38 is similar to the shape of section 36, albeit having side edges that angle outward from edge 37 to a distal opposite edge in directions opposite the directions in which edge 15 and 19 when structure 42 is laying flat. In FIG. 6 it can be seen that after substructure support, sections 30, 32, 34 and 36 are all juxtaposed with respect to each other in similar relative orientations to the way sections 30, 32, 34 and 36 are juxtaposed in FIG. 4 above. In addition, section 38 includes a curved portion proximate edge 37 that curves about a single axis 44 so that section 38 generally resides above substantially horizontal section 36. Again, the degree of curvature about axis 44 may not be constant and instead may change along the curved portion of section 38. Section 38 is shown forming an obtuse angle with section 30 and therefore, if section 30 is generally vertical, section 38 may angle upward from edge 37. In other embodiments a flat portion of section 38 may be substantially horizontal.

Referring again to FIG. 6, in this embodiment, in addition to providing a generally overhead emissive surface section 38 for displaying additional content, section 38 and an associated supporting substructure also provide additional privacy for a workstation user. The gaps between section 38 and section 32 and between section 38 and section 34 may be advantageous in some applications as a user of a station, while having a sense of privacy, would also have the ability to perceive others within the user's space by visually sensing movement on a side opposite the side of a workstation structure used by the user through the gaps.

Again, here, any of sections 32, 34 or 38 may include substantially flat portions or may have curvature substantially along a dimension (e.g. between edges of the section. Thus, see that section 38 in FIG. 6 has a slight downward concavity about a horizontal axis.

Figure 7:
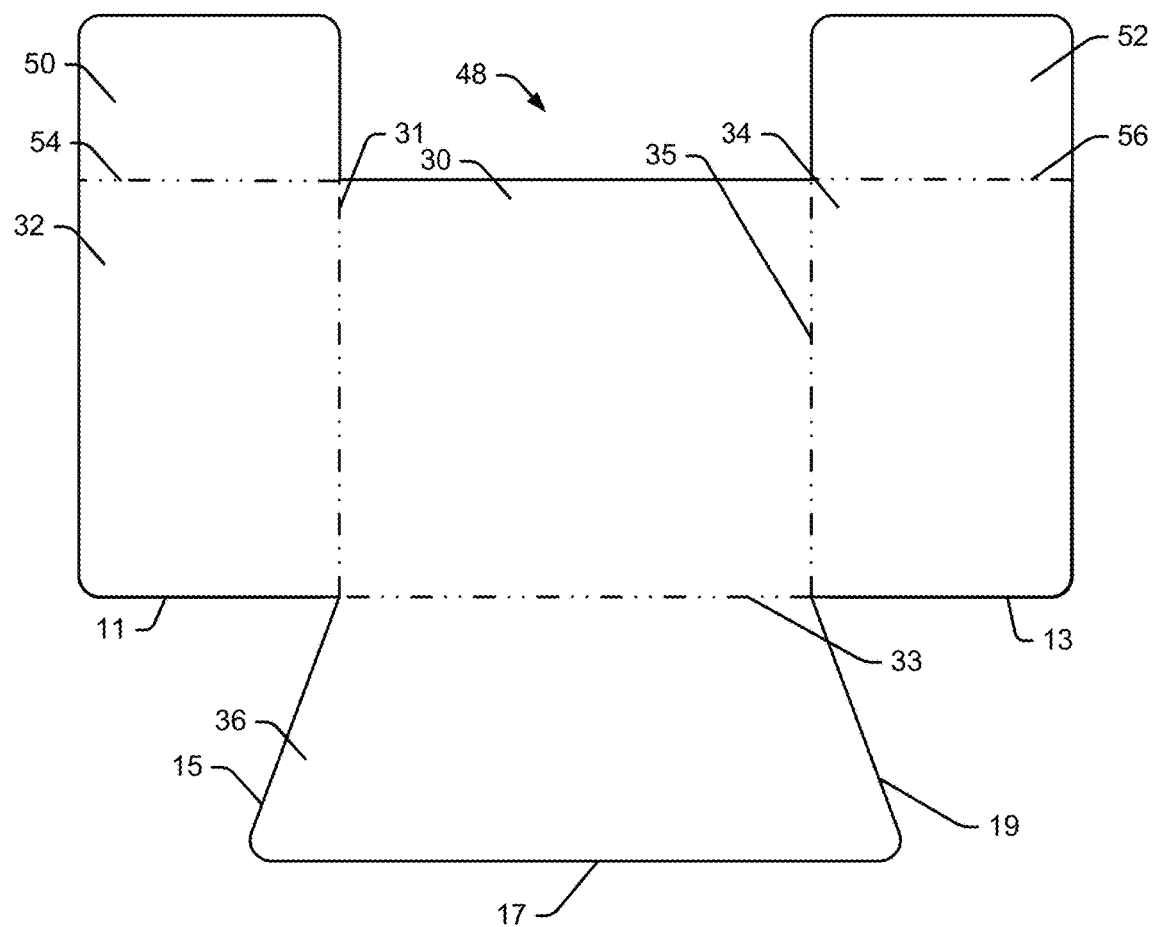
FIG. 7 is similar to FIG. 3, albeit showing a third flattened emissive surface.
Figure 8:
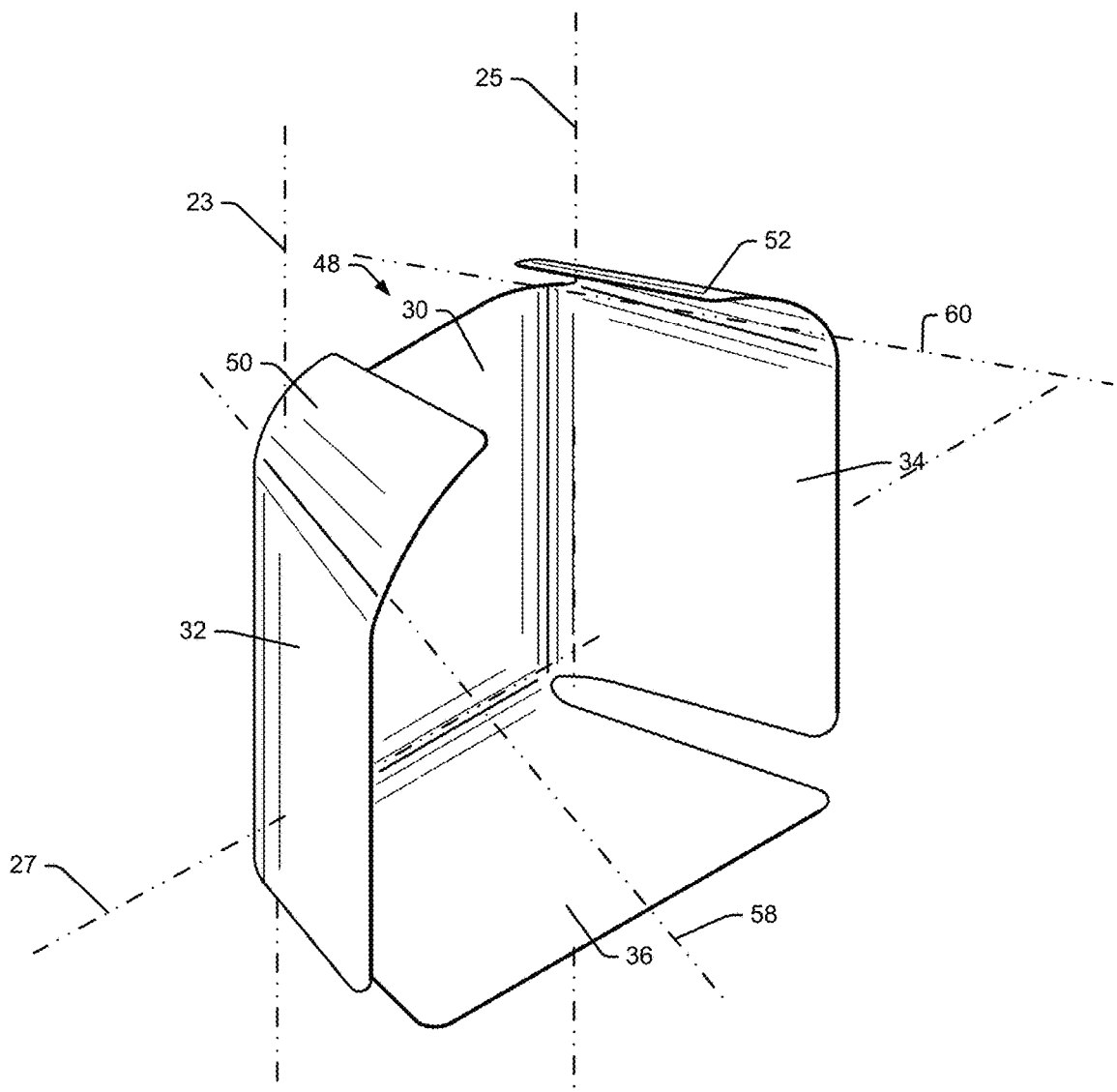
FIG. 8 shows the surface of FIG. 7 bent and supported to form a workstation configuration.

Referring to FIGS. 7 and 8, a lying flat shape of an emissive surface structure 48 and the shape of structure 48 after mounting to a support substructure are shown, respectively. Emissive surface structure 48 is similar to the emissive surface structure 22 described above with respect to FIG. 3, albeit where structure 48 includes first and second upper wing sections 50 and 52 that extend upward from sections 32 and 34 along edges shown in phantom at 54 and 56, respectively. Sections 50 and 52 are shown as rectangular, although other shapes are contemplated. In FIG. 8 it can be seen that after substructure support, sections 30, 32, 34 and 36 are all juxtaposed with respect to each other in similar relative orientations to the way sections 30, 32, 34 and 36 are juxtaposed in FIG. 4 above. In addition, section 50 includes a curved portion proximate edge 54 that curves about a single axis 58 so that section 50 generally extends above a left lateral side portion of substantially horizontal section 36 while section 52 includes a curved portion proximate edge 56 that curves about a single axis 60 so that section 52 generally extends above a right lateral side portion of substantially horizontal section 36. Again, the degrees of curvature about axis 58 and 60 may not be constant and instead may change along the curved portions of sections 50 and 52. Sections 50 and 52 are shown forming obtuse angles with sections 32 and 34 and therefore, if sections 32 and 34 are generally vertical, sections 50 and 52 may angle upward from edges 54 and 56.

Referring again to FIG. 8, in this embodiment, in addition to providing a generally overhead emissive surfaces sections 50 and 52 and an associated supporting substructure also provide additional privacy for a workstation user. Here, any of sections 50 or 52 may include substantially flat portions or may have curvature substantially along the dimension between one of the edges 54 and 56 and the opposite distal edge.

Figure 9:
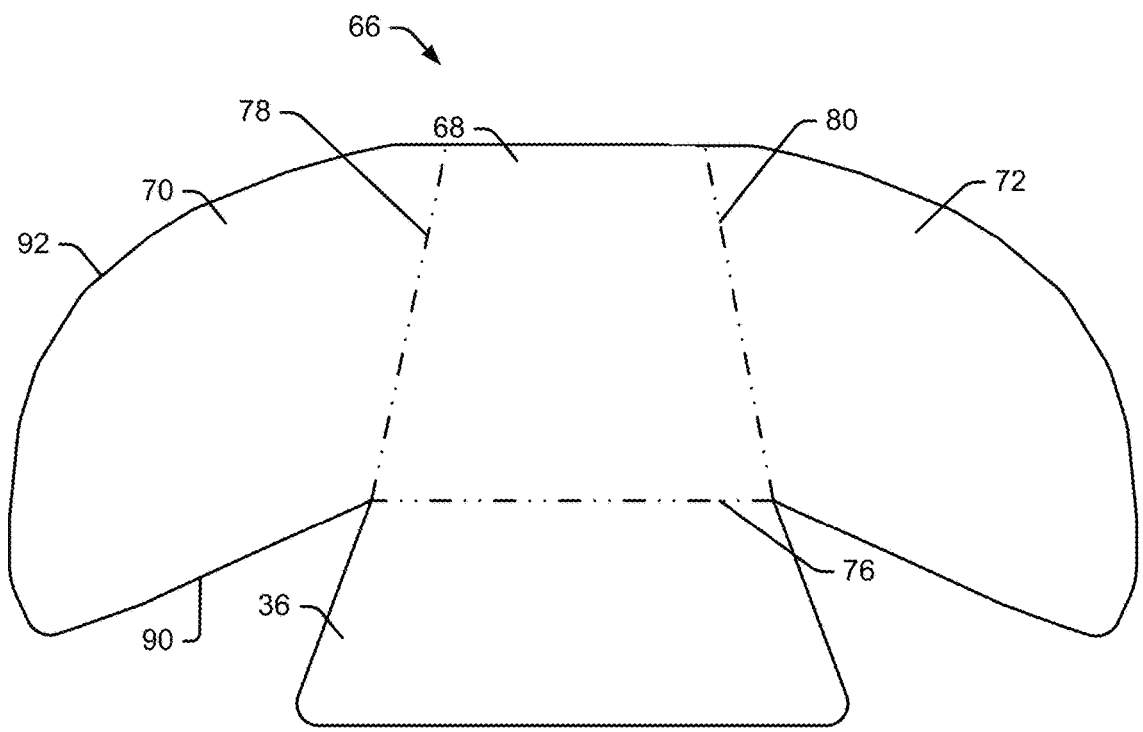
FIG. 9 is similar to FIG. 3, albeit showing another flattened emissive surface structure.
Figure 10:
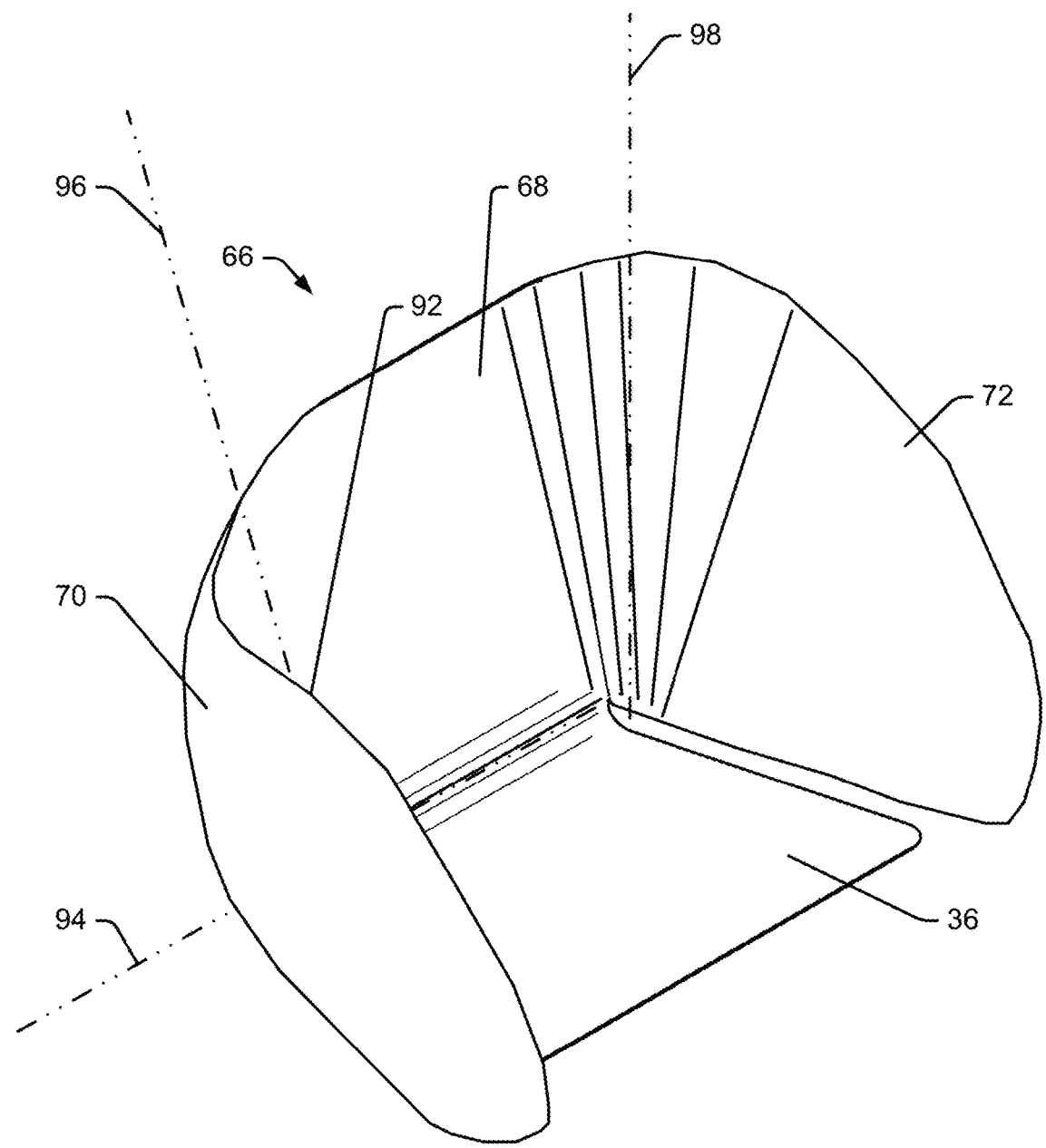
FIG. 10 shows the structure of FIG. 9 bent and supported to form a workstation.

Referring to FIGS. 9 and 10, a lying flat shape of an emissive surface structure 66 and the shape of structure 66 after mounting to a support substructure are shown, respectively. Emissive surface structure 66 includes a central portion 69 and first, second and third side section 70, 72 and 32, respectively. Third side section 32 is similar to the side sections described above that are also labeled numeral 32. Central section 68 is polygonal including substantially parallel top and bottom edges 74 and 76 where bottom edge 76 is longer than top edge 74 and straight side edges 78 and 80 that angle outwardly from top edge 74 to bottom edge 76. Section 32 is integrally formed with section 68 along bottom edge 76. Each of the first and second side sections 70 and 72 has a similar shape and section 70 is integrally formed with section 68 along side edge 78 while section 72 is integrally formed with section 68 along side edge 80.

Section 70 includes a straight lower edge 90 and a curved upper edge 92 that extends from a top end of edge 78 to the distal end of edge 90. The curvature of edge 92 may be constant or may taper from gradual to more severe or vice versa depending the affect to be achieved in the ultimate workstation design.

In FIG. 10 it can be seen that after substructure support, section 32 is substantially horizontal and section 68 is substantially vertical or angles rearward slightly from bottom to top with a section between sections 68 and 32 that curves or bends about a horizontal axis 94. Section 70 extends from edge 78 and curves generally about an axis 96 that is substantially vertical. Here, the degree of curvature may be gradual proximate edge 74 and more severe proximate edge 76 with the degree of curvature increasing between edges 74 and 76. Thus, for instance, while section 70 may start curving along line 78, the curvature at the intersection of edges 74 and 78 may be slight such that the front surface of section 70 appears to simply continue the front surface of section 68 while the curvature at the intersection of edges 78 and 76 may be relatively tighter. As seen in FIG. 10, an open cup shaped workstation shape results.

Figure 11:
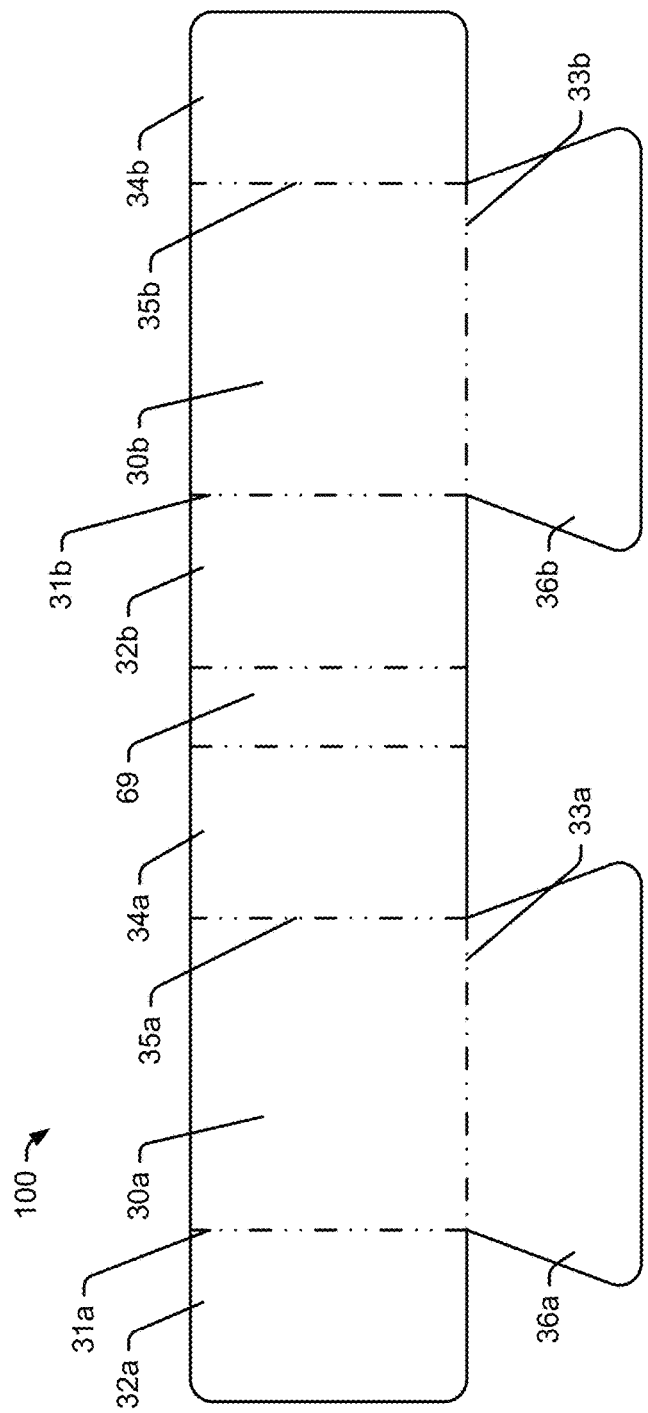
FIG. 11 is similar to FIG. 3, albeit showing another emissive surface structure in a flattened condition.
Figure 12:
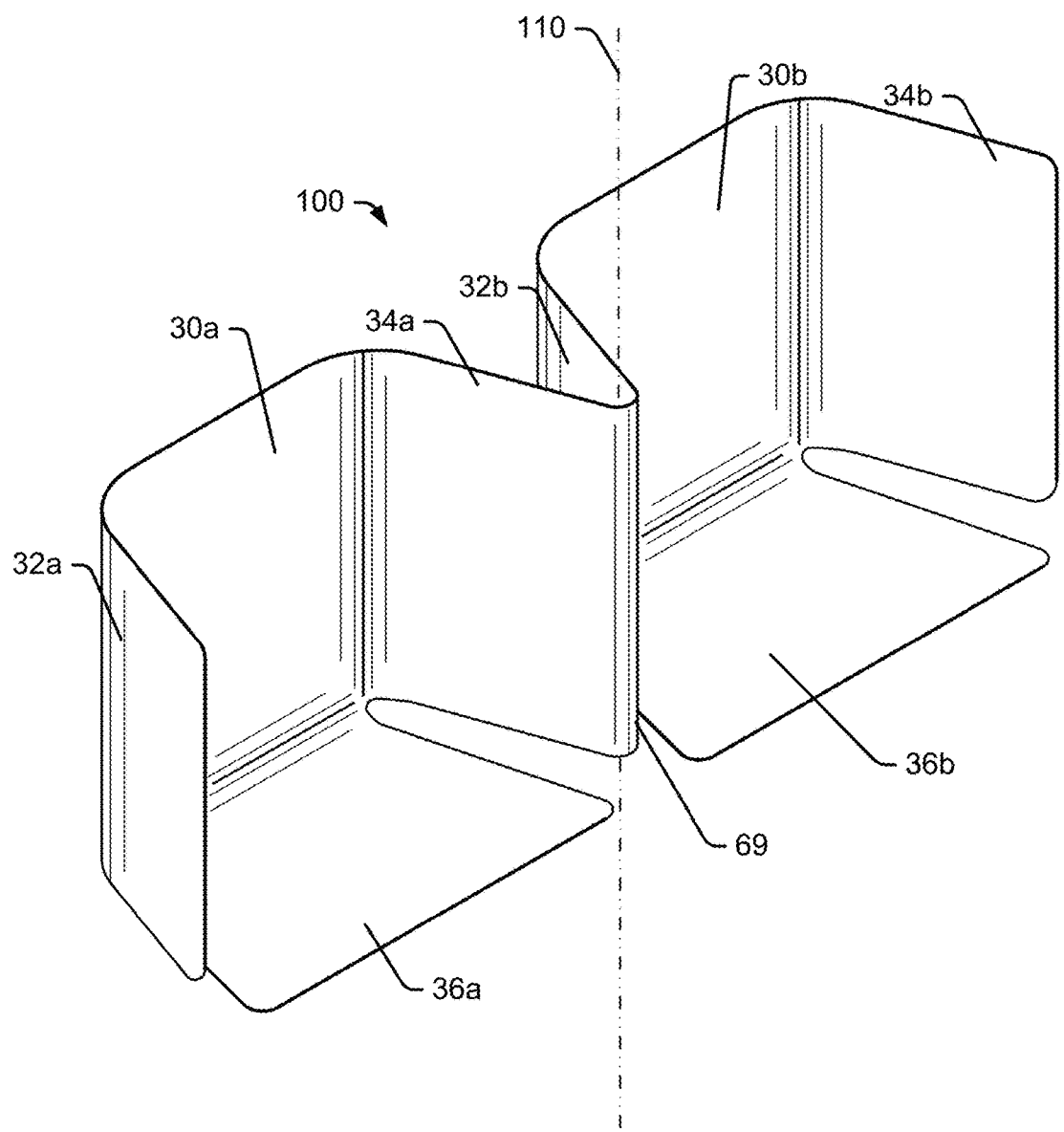
FIG. 12 shows the structure of FIG. 11 bent and supported in a form to provide two side-by-side workstations.

Referring to FIGS. 11 and 12, a lying flat shape of an emissive surface structure 100 and the shape of structure 100 after mounting to a support substructure are shown, respectively. Emissive surface structure 100 is provided to construct two adjacent workstations (see FIG. 12 specifically). To this end, structure 100 includes first and second instances of the emissive surface structure 22 shown in FIG. 3 where adjacent side sections of the first and second instances are integrally formed along a line 102. The first and second instances include sections that are labeled with numbers similar to the numbers used to label sections in FIG. 3 above, albeit followed by the letter "a" to indicate the first instance and "b" to indicate the second instance, For example, in FIG. 11, section 30a is the first instance section akin to section 30 in FIG. 3, section 30b is the second instance section akin to section 30 in FIG. 3, section 32a is the first instance section akin to section 32 in FIG. 3 above, and so on.

Referring still to FIG. 12, after being mounted to a suitable substructure support (not illustrated), the emissive surface structure 100 assumes the illustrated form where the emissive surfaces form two workstation surrounds and where sections 34a and 32b are integrally linked with a curved portion there between that is bent about another substantially vertical axis 110. Although not shown, it should be appreciated that the structure shown in FIGS. 11 and 12 could be extended to configure additional third, forth or more workstation spaces in a fashion similar to that illustrated. In addition, it is contemplated that one or more other workstation spaces may be integrally formed in a similar fashion by extending other sections such as section 30a in FIG. 12 to connect to stations that open in a direction opposite the direction in which the stations in FIG. 12 open.

Figure 13:
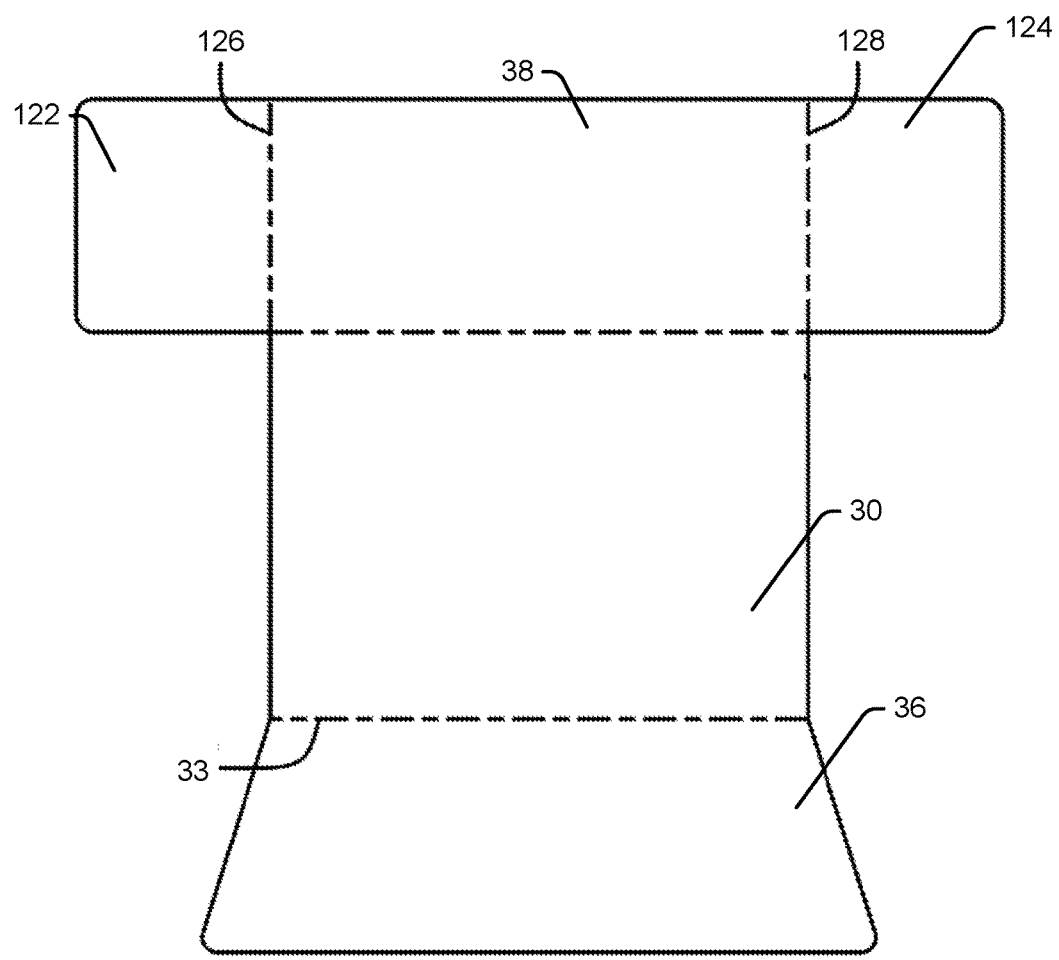
FIG. 13 is similar to FIG. 3, albeit showing yet another flattened emissive surface structure.
Figure 14:
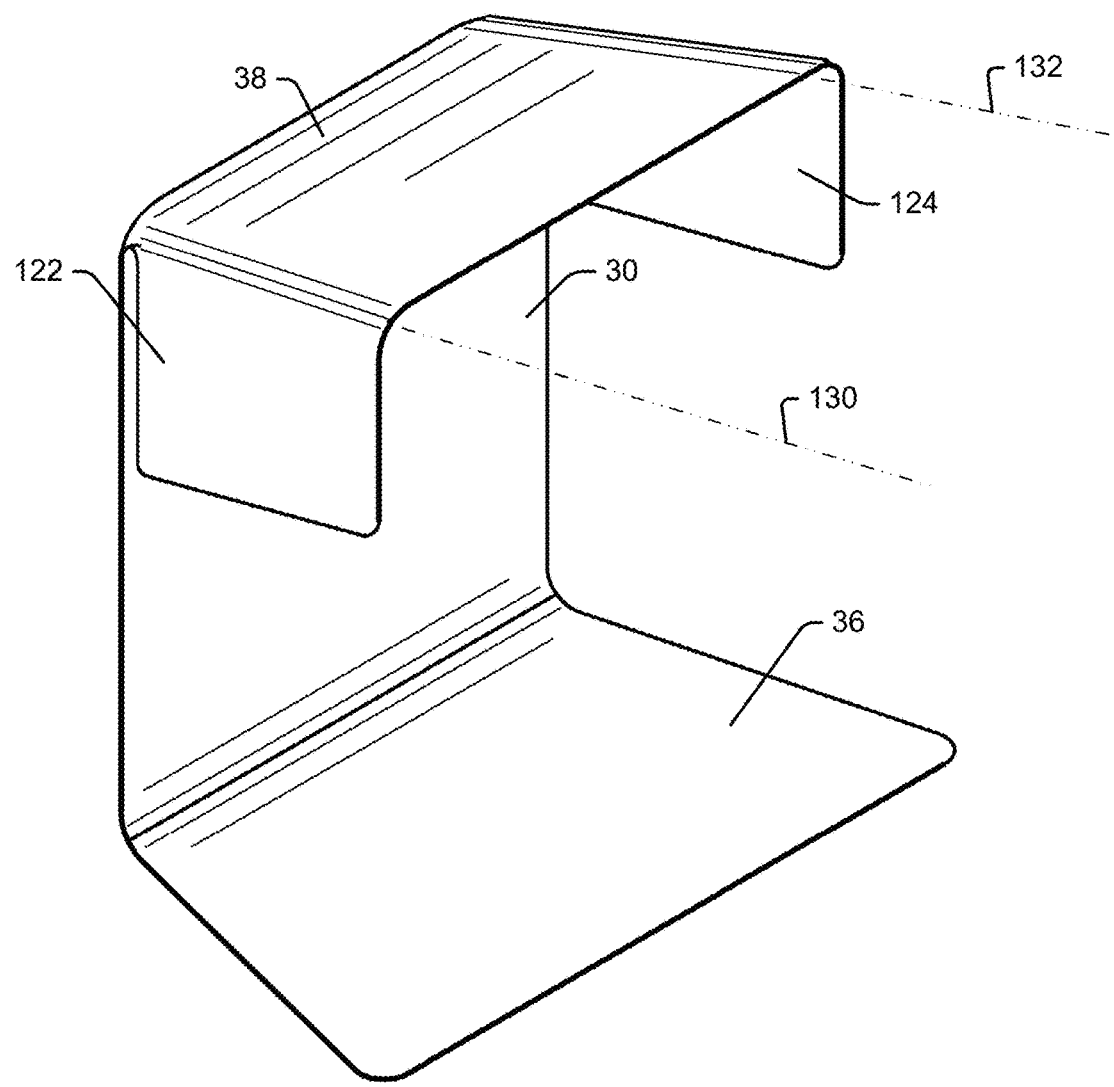
FIG. 14 shows the structure of FIG. 13 bent to form a workstation.

Referring to FIGS. 13 and 14, a lying flat shape of an emissive surface structure 120 and the shape of structure 120 after mounting to a support substructure are shown, respectively. Emissive surface structure 120 is similar to the emissive surface structure 42 described above with respect to FIG. 5, with a central section 30, a lower side section 36, an upper side section 38 and first and second wing sections 122 and 124. Here, central section 30 is rectangular while section 36 is polygonal with a portion proximate lower edge 33 of section 30 shorter than the opposite edge and where section 38 is rectangular and integrally formed to extends from edge 37 of section 30. Wings 122 and 124 extend laterally from opposite edges 126 and 128 of section 38.

In FIG. 14 it can be seen that after substructure support, sections 30, 36 and 38 are all juxtaposed with respect to each other in similar relative orientations to the way sections 30, 36 and 38 are juxtaposed in FIG. 6 above. In addition, section 122 includes a curved portion adjacent edge 126 that is bent about a substantially horizontal axis 130 while section 124 includes a curved portion adjacent edge 128 that is bent about a substantially horizontal axis 132. Again, the degrees of curvature about axis 130 and 132 may not be constant and instead may change along the curved portions of sections 122 and 124.

Figure 15:
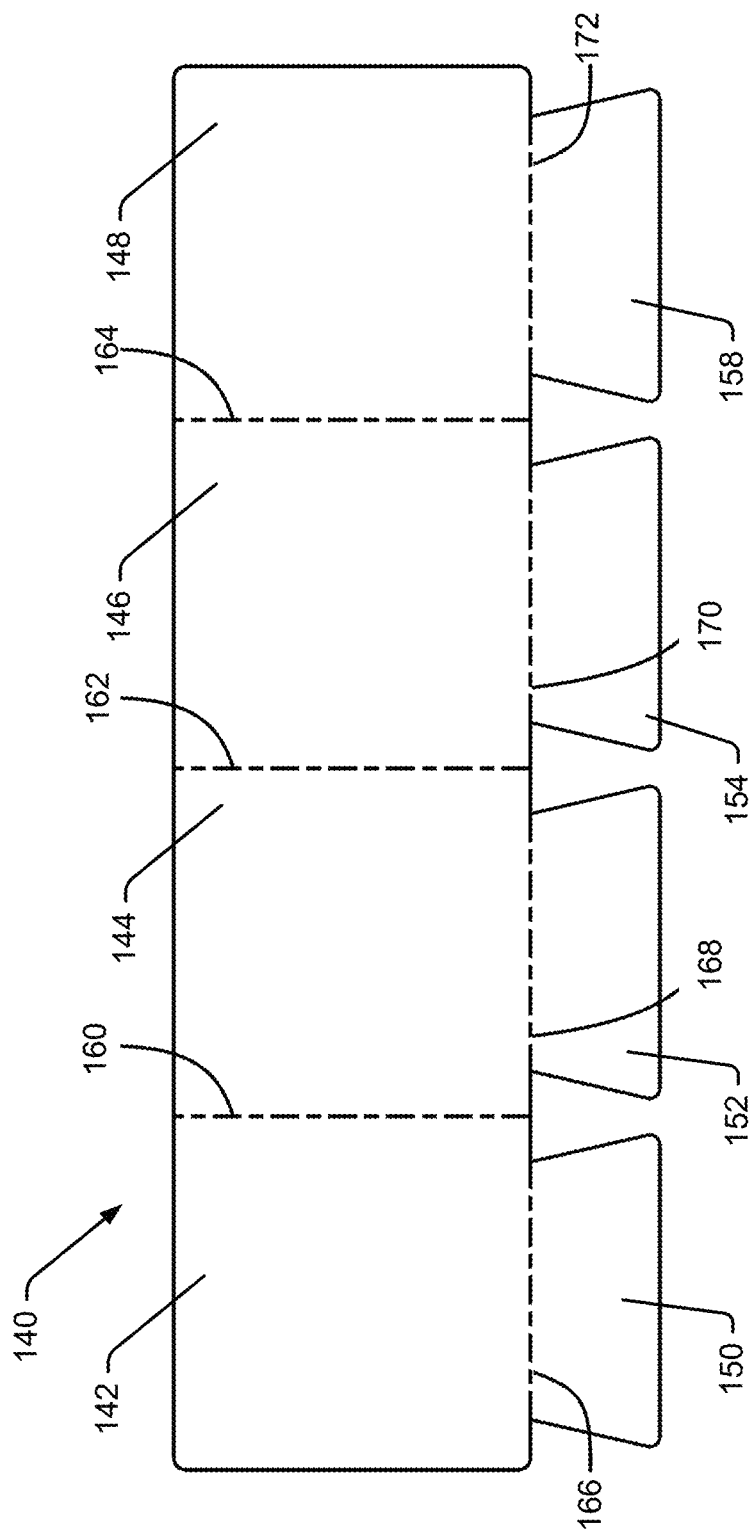
FIG. 15 is similar to FIG. 3, albeit showing another flattened emissive surface structure.
Figure 16:
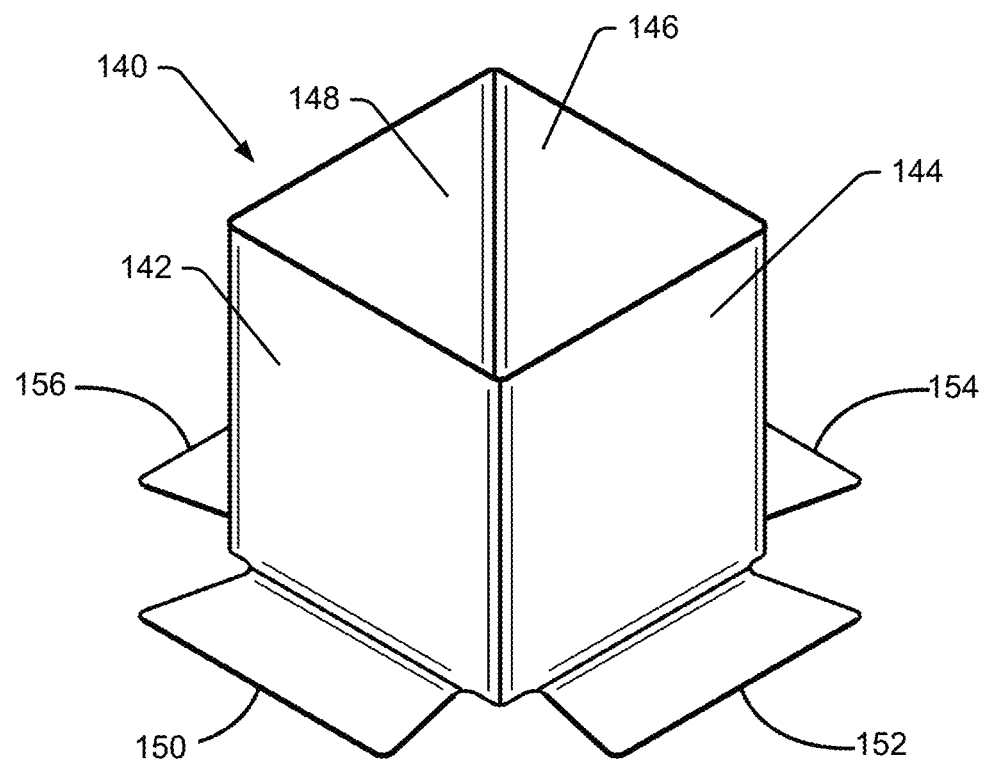
FIG. 16 shows the structure of FIG. 15 bent into a useful form to support four workers.

Referring to FIGS. 15 and 16, a lying flat shape of an emissive surface structure 140 and the shape of structure 140 after mounting to a support substructure are shown, respectively. Emissive surface structure 140 includes four rectangular sections or portions 142, 144, 146 and 148 and four trapezoidal sections 150, 152, 154 and 156. Sections 142 and 146 are integrally formed along opposite edges 160 and 162 of section 144 and section 128 is integrally formed along an edge 164 of section 146 opposite section 144. Section 150 is formed along a lower edge of section 142 while each of sections 152, 154 and 156 is formed along a lower edge of sections 144, 146 and 148, respectively.

In FIG. 16 it can be seen that after substructure support, sections 142, 144, 146 and 148 form four sides of a box or cube like structure and sections 150, 152, 154 and 156 form substantially horizontal emissive surface sections adjacent and generally below each of sections 142, 144, 146 and 148, respectively. Here, the final structure may be used to support four persons working on the four different sides of the structure. Again, here, each part of the emissive surface structure 140 curves or bends around at most a single axis and at least two different parts of the emissive surface structure curve about at least two non-parallel axis.

Figure 17:
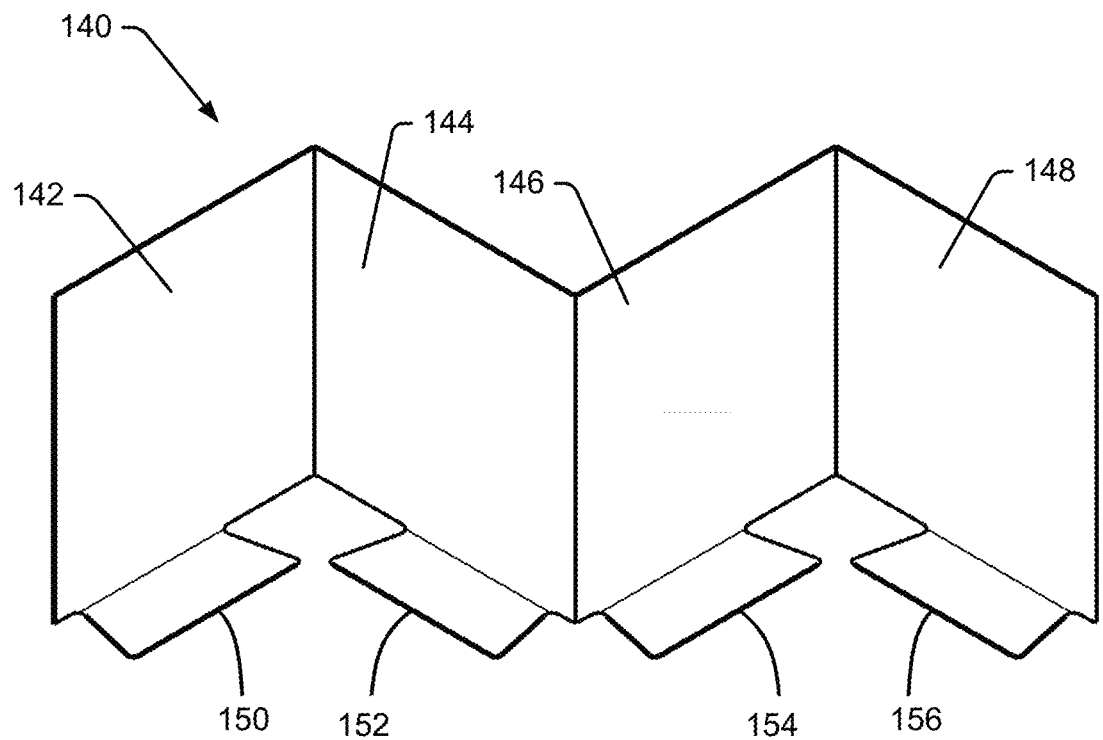
FIG. 17 shows the structure of FIG. 15 bent and supported in yet another configuration.

Referring still to FIG. 15 and also to FIG. 17, the FIG. 15 emissive surface structure 140 may also be supported by support substructures having other shapes. Thus, in FIG. 17 the surface structure 140 is shown in a different final rigid configuration forming two alcoves, each to support one or two different system users.

Figure 18:
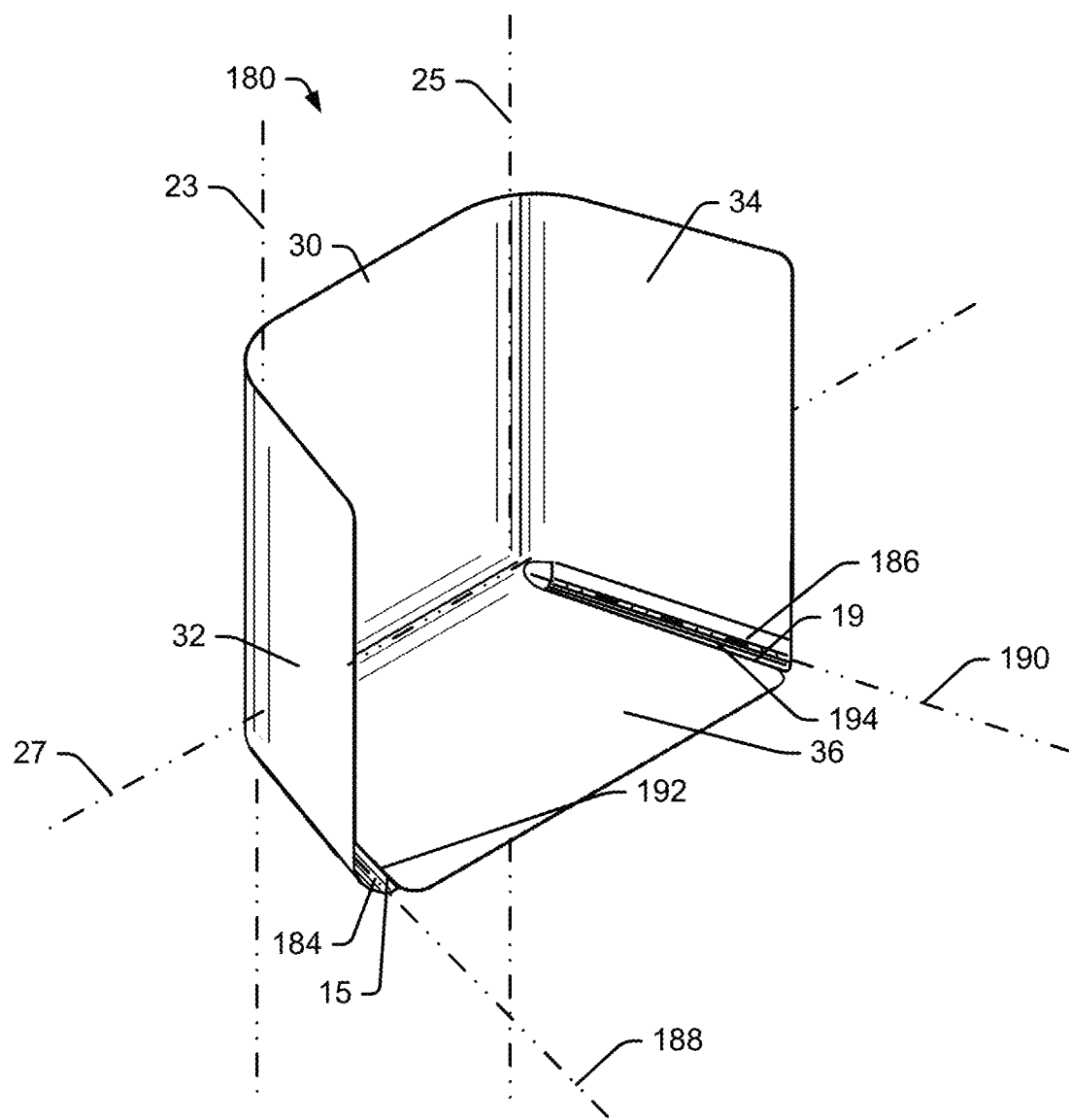
FIG. 18 is similar to FIG. 4, albeit showing yet another workstation configuration.

Referring now to FIG. 18, yet another emissive surface configuration 180 is shown that, upon substructure support, has a shape similar to the shape shown in FIG. 4 above. In configuration 180, however, the flexible emissive surface structure 182 includes additional sections 184 and 186 that extend downward from lower edges of sections 32 and 34 and that curve around additional substantially horizontal axis 188 and 190 so that distal ends or edges 192 and 194 thereof are substantially immediately adjacent distal edges 15 and 19 of horizontal section 36 and so that emissive surfaces of sections 184 and 186 are substantially flush with the emissive surface of section 36. In this way the gaps between sections can be appreciably reduced so that the entire emissive surface has a feeling of substantially complete continuity.

It has been contemplated that at least some flexible emissive surface structures require components that need to be located in a bezel adjacent the emissive portion of the structure such that the lateral edges of the structure cannot emit any light (e.g., is not emissive). It has also been recognized that technology has been developed that is in part based on flexible emissive surfaces to place the bezel hardware (e.g., components that need to be in a bezel) in a plane that is essentially hidden from view when a surface is viewed from a normal use vantage point. In the case of a workstation or other furniture artifact, the workstation or other artifact can be designed to restrict viewing angles to emissive surfaces such that bezels can be hidden from view and a more attractive and better functioning artifact can be constructed.

Figure 19:
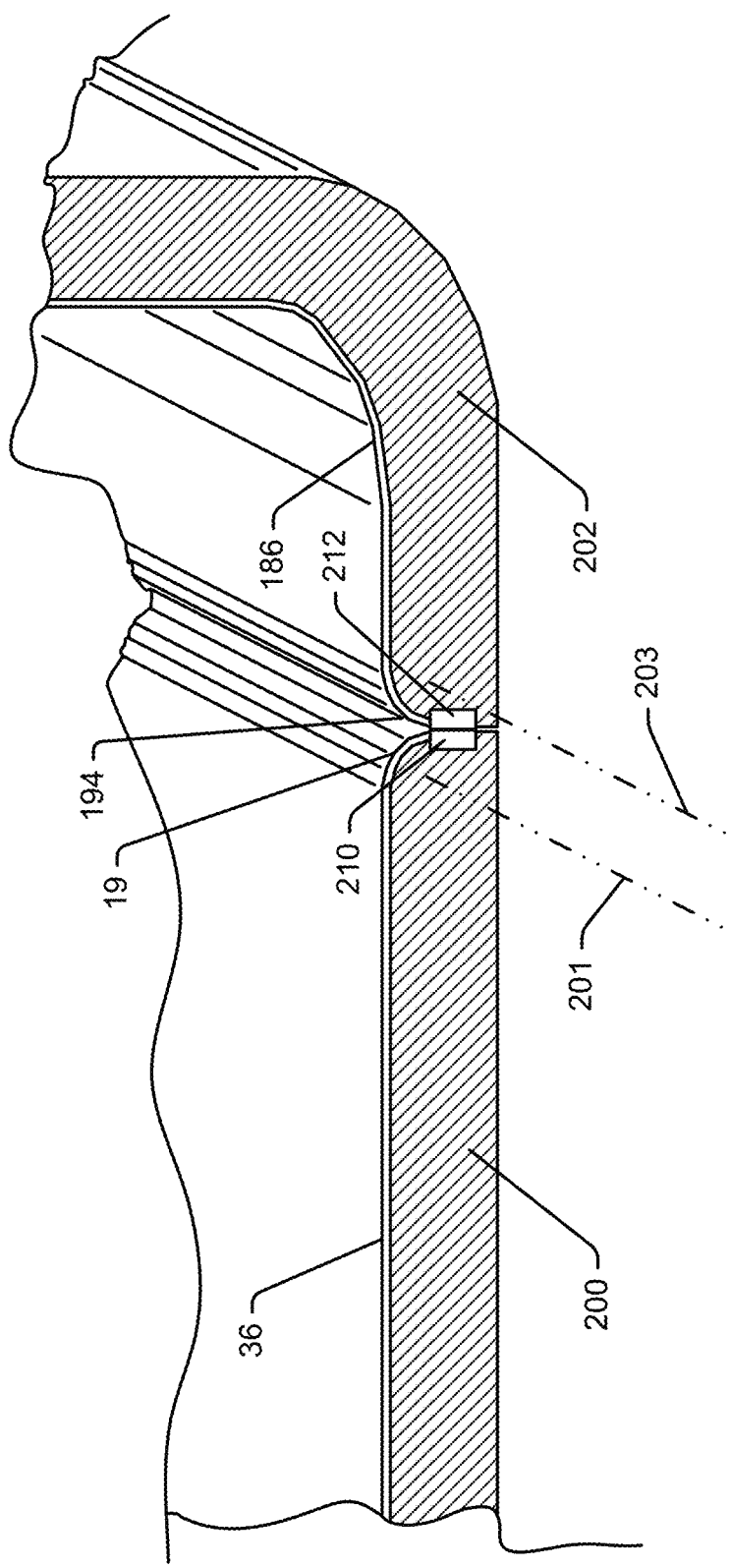
FIG. 19 shows a partial cross-sectional view of a portion of the structure shown in FIG. 18.
Figure 20:
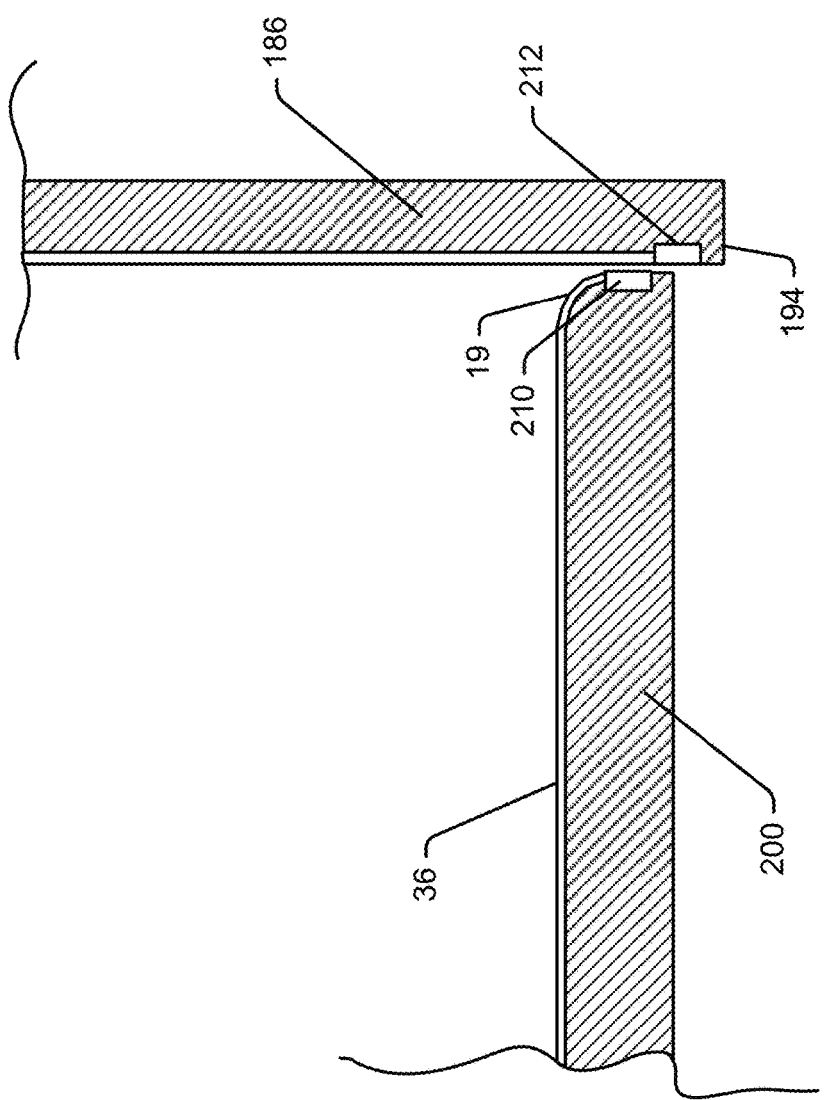
FIG. 20 shows another partial cross-sectional view similar to FIG. 19, albeit showing a different structure.

See FIG. 19 that shows an enlarged portion of sections of the FIG. 18 configuration where adjacent non-integral edges 19 and 194 of an emissive surface structure 140 are illustrated and are supported by a rigid substructure including sections 200 and 202. Here, emissive surface section 36 curves or is bent downward about an axis 201 so edge 19 actually terminates downward. Similarly, the edge 194 of emissive surface section 186 is bent about an axis 203 and terminates downward. Adjacent surfaces of sections 36 and 186 are close to each other and, in some embodiments may even contact each other. Here, the bezel for section 36 is shown at 210 while the bezel for section 186 is shown at 212. As shown, the bezels 210 and 212 are hidden at locations where the bezels cannot be viewed by a user of a resulting station. To achieve an affect similar to the effect shown in FIG. 19, one of two adjacent edges may be constructed using the hidden bezel technology and the other edge may simply run past the hidden bezel edge. For instance, see FIG. 20 where section 36 includes a hidden bezel edge while section 186 simply runs past and very close to the edge of section 36. Again, the bezels 210 and 212 are hidden from view after construction.

In at least some embodiments an emissive surface structure similar to the structure shown in FIG. 3 may be arranged in a different fashion to provide additional advantages. For instance, see FIG. 21 where an emissive surface structure including a central portion 30 and three side portions 32, 34 and 36 is arranged with the central portion 30 supported by a support substructure 20 in a substantially horizontal orientation where portions 32, 34 and 36 extend generally vertically upward to form a work station. Here, bent portions exist between section 30 and sections 32, 34 and 36 where each bent portion curves about a single axis 173, 171 and 169, respectively. The gaps 240 and 242 afford a station user the ability to perceive other people proximate the station and on a side of the station opposite the station user via movement sensed visually there through.

Figure 22:
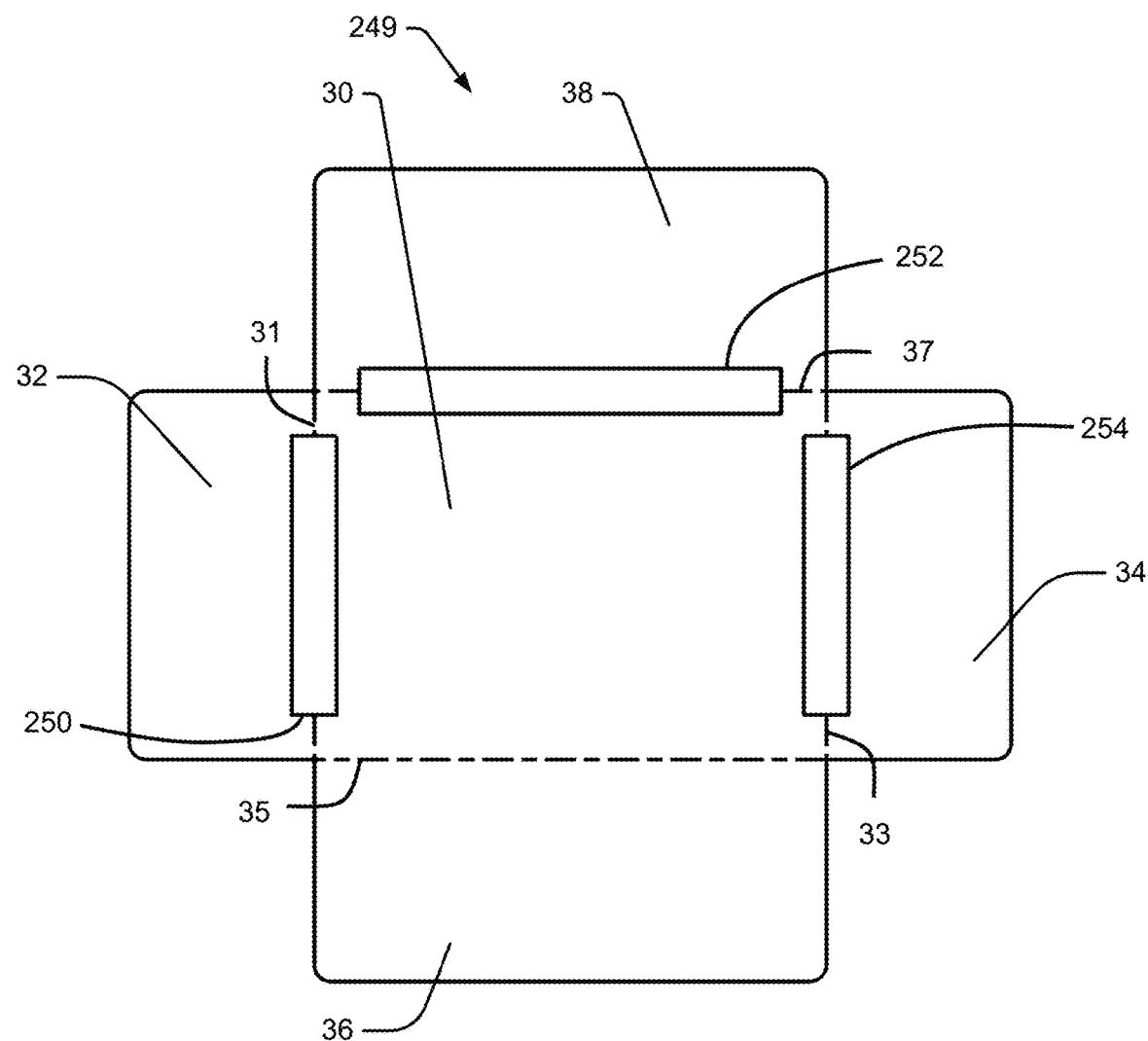
FIG. 22 is similar to FIG. 3, albeit showing another flattened emissive surface structure.
Figure 23:
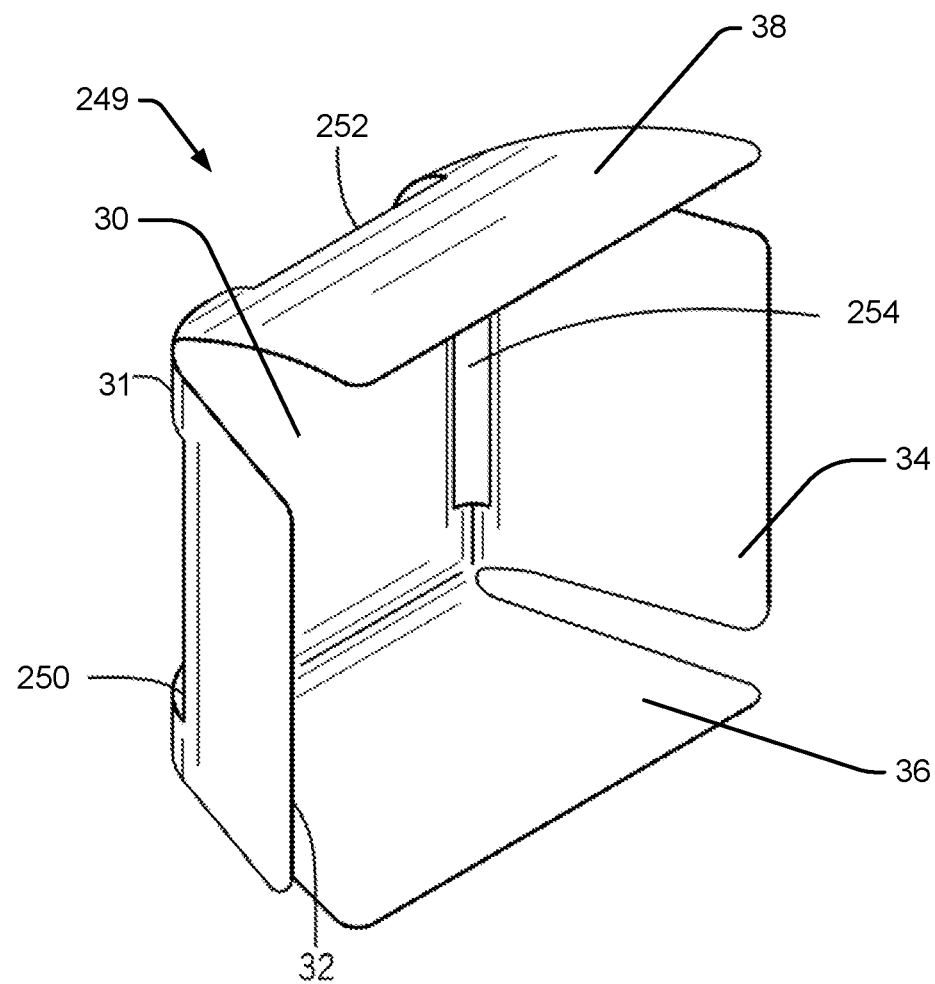
FIG. 23 shows the structure of FIG. 22 bent to form a workstation configuration.

Referring to FIGS. 22 and 23, a lying flat shape of an emissive surface structure 249 and the shape of structure 249 after mounting to a support substructure are shown, respectively. Emissive surface structure 249 has a shape that is similar to the shape of the structure shown in FIG. 5 above, except that structure 249 forms three openings 250, 252 and 254 at the edges of central section 30 between section 30 and sections 32, 38 and 34, respectively. In FIG. 13 it can be seen that after substructure support, a workstation for a single user may be constructed where openings 250, 252 and 254 afford a station user the ability to perceive persons within the user's vicinity but that are located on a side of structure 249 opposite the user. Here, while the workstation affords the user appreciable privacy, the user sill has the ability to sense when others are in the area of the user's station.

Figure 24:
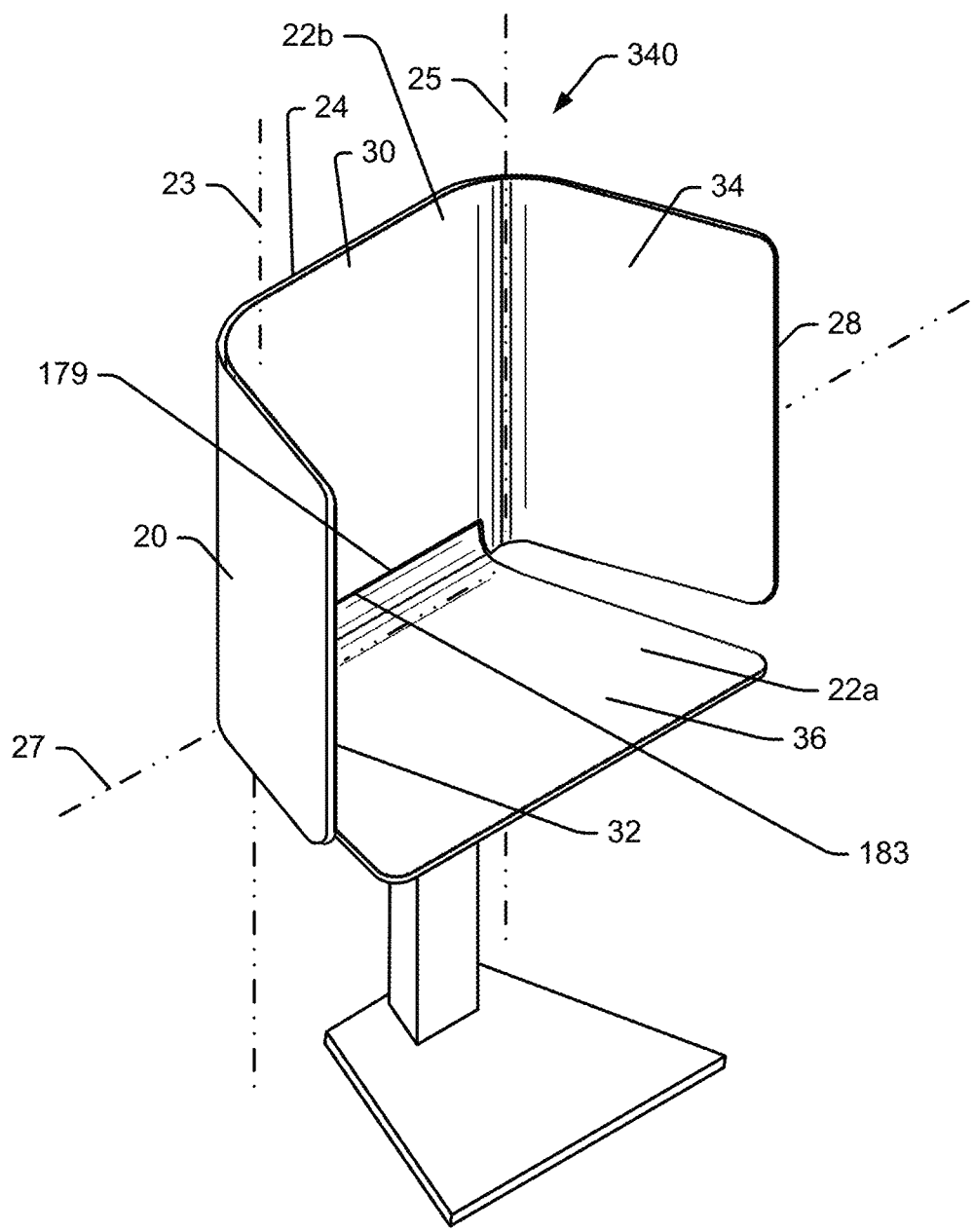
FIG. 24 is similar to FIG. 4, albeit showing two separate emissive surface sub-structures that are combined to form a single workstation.

While the embodiments above describe emissive surface structures where all emissive surface area is created using a single emissive surface structure (e.g., a single flexible emissive surface structure), other embodiments are contemplated where two or more emissive surface structures may be arranged together to form a single workstation assembly along with a support substructure. To this end, affects similar to the affects described above can be achieved with two or more emissive surface structures. For instance, see FIG. 24 wherein a configuration 340 similar to the FIG. 4 configuration includes a single support substructure 20 and first and second emissive surface structures 22a and 22b. First surface structure 22a includes a single trapezoidal emissive surface portion having a shape similar to the shape of section 36 described above in relation to FIGS. 2 through 4 while second surface structure 22b includes sections that have a combined shape similar to the combined shape of sections 30, 32 and 34 in FIGS. 2 through 4. In this case, while structure 22a is separate from structure 22b, each has a straight edge (see 179 and 183) and sections 22a and 22b can be mounted to the supporting substructure 20 with the straight edges immediately adjacent each other. To reduce the effects of the gap between the structures 22a and 22b (e.g., to reduce the space between the emissive surface portions of structures 22a and 22b), hidden bezel technology like that shown in FIG. 19 may be employed.

Figure 21:
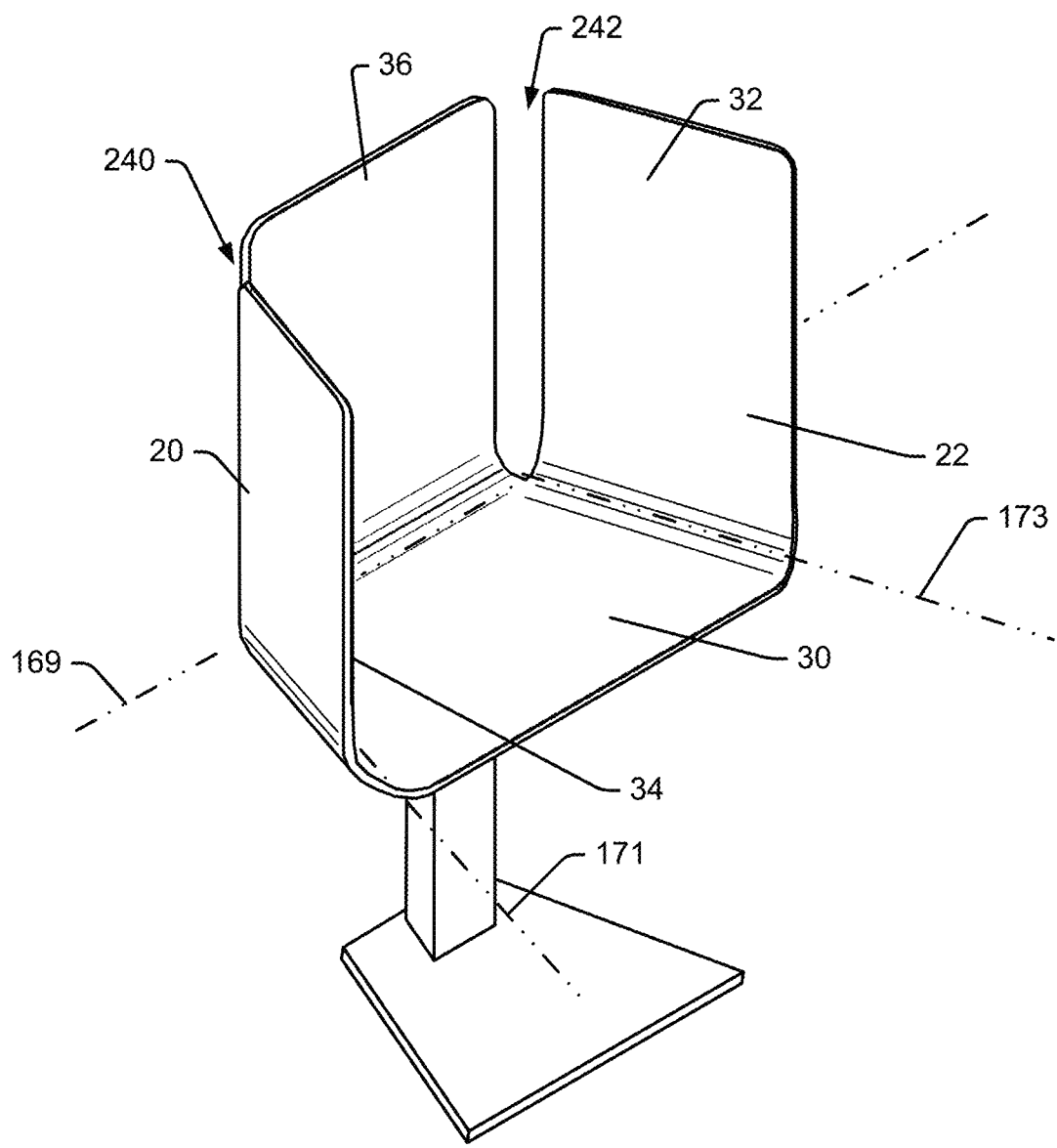
FIG. 21 is similar to FIG. 4, albeit showing another workstation configuration.
Figure 25:
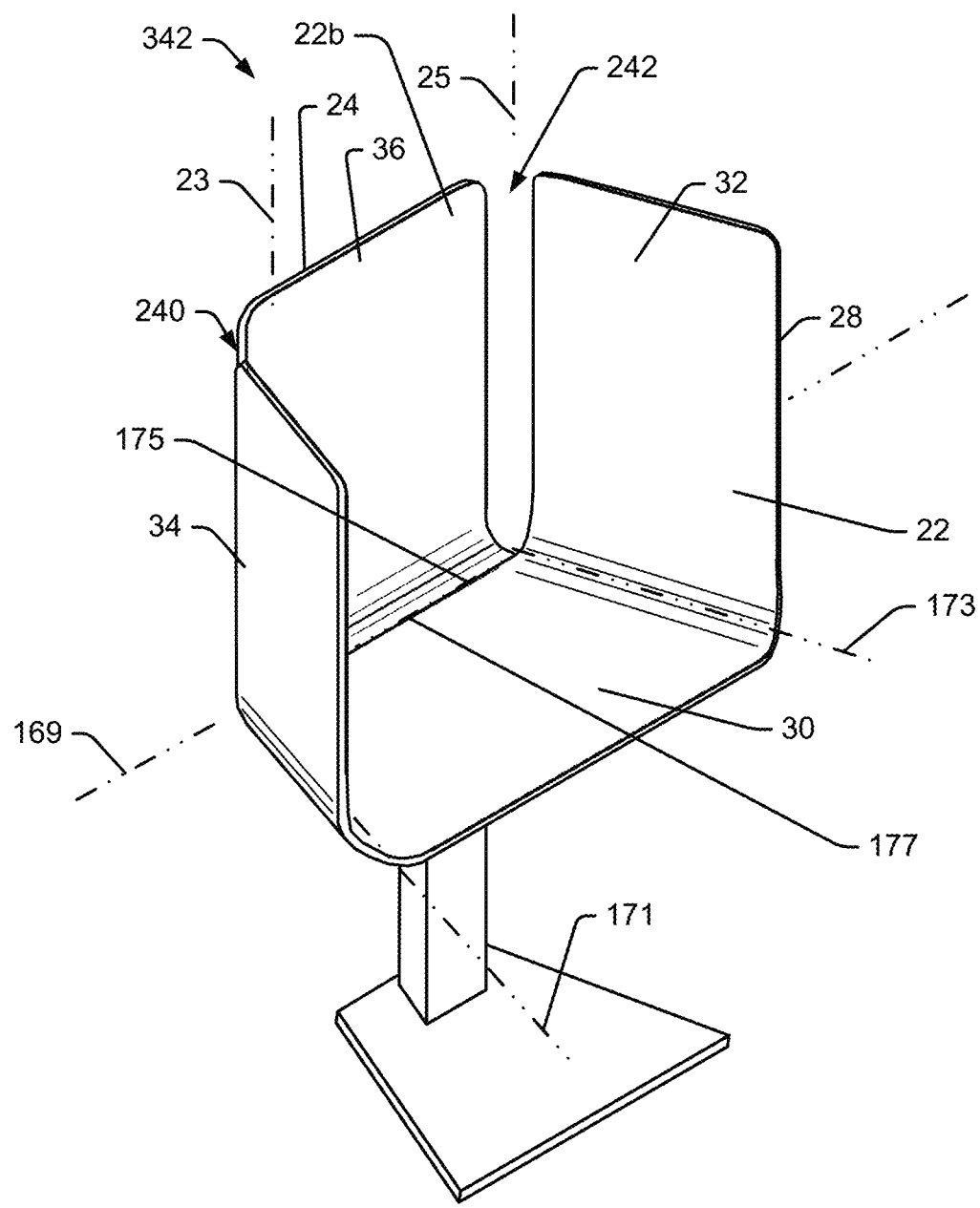
FIG. 25 is similar to FIG. 24, albeit showing two other emissive surface sub-structures that together form a workstation.

Referring to FIG. 25, another station configuration 342 is shown that, after assembly, has a shape that is substantially similar to the shape of the structure shown in FIG. 21, albeit where structure 342 is constructed using two emissive surface structures 22a and 22b. In this case, structure 22a has a shape that is similar to the combined shape of sections 30, 32 and 34 of the FIG. 21 embodiment while structure 22*b* has the shape of section 36 of the FIG. 21 embodiment. Again, each of structures 22*a* and 22*b* has a straight edge (see 175 and 177) immediately adjacent the other of the structures 22*a* and 22*b* so that the affect can be that the emissive surface portions of the structures 22*a* and 22*b* are very close to each other. As in the FIG. 24 embodiment, in the FIG. 25 embodiment the hidden bezel technology of FIG. 19 may be employed to further reduce the affects of the seem between the two emissive surfaces.

While the two surface structure may not be needed in the case of some flexible screen technology where different screen sections of a single surface structure may be able to easily flex along different axis, it is contemplated that some flexible screen technology may only facilitate bending about parallel axis. In these cases dual or more surface structures may be necessary to construct configurations that are optimized for privacy and display screen juxtapositions.

While flexible display technology can be used to provide emissive surfaces that are at least somewhat flexible, many such emissive surfaces still have at least some rigidity and therefore can provide at least some of the structure required to hold themselves up for viewing. For instance, some flexible screens will have the feel of a sheet of paper that has been laminated in plastic so that, while the screen can flex, the screen has some rigidity and resiliency and therefore tends to morph back into a non-bent steady state configuration when bending force is removed. Where a screen is at least somewhat rigid and resilient, some embodiments of the present disclosure contemplate support structures for holding emissive surfaces in use positions where stiffness of the screens themselves is used in conjunction with the support structures to maintain position and orientation. More specifically, consistent with the description above, support structures may be provided that are designed to maintain a flexible screen in a position in which any portion of the screen that is bent only bends about a single axis and where different parts of the screen are bent about different axis.

Figure 26:
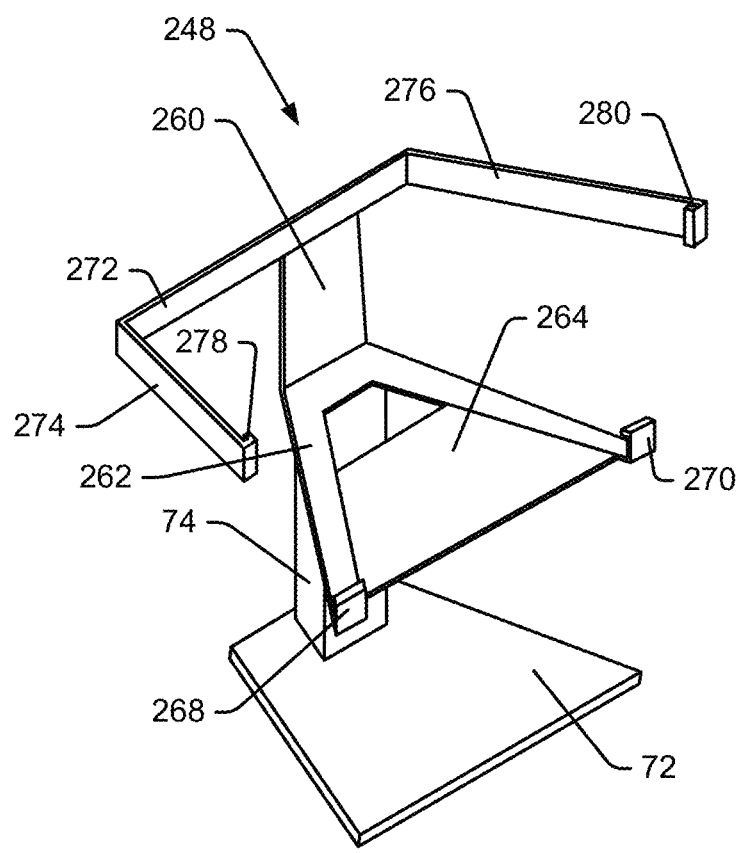
FIG. 26 shows a support structure for a bendable emissive surface sub-structure.

To this end, see FIG. 26 where a support structure 248 includes a base 72, a pedestal or leg 74, a tray structure 262, a vertical extension members 260 and a support arm 272. Base 72 is a horizontal member that may include feet on a bottom surface for contacting an ambient floor and supporting other structure 248 components there above. Pedestal 74 extends vertically upward from base 72. Tray 262 is mounted at the top end of pedestal 74 and includes two arm members 265 that extend forward as well as a central support member 264 that extends between arm members 265 to provide a flat top support surface (not labeled). The flat support surface substantially fills the space between arm members 265 and includes a top surface that is flush with the top surface of the arm members 265. Stops 268 and 270 are formed at distal ends of the arm members 265 and are designed to receive an edge of an emissive surface structure (see also FIG. 26). To this end, each of stops 268 extends upward from the top surface of an adjacent arm members 265 and includes a finger that extends back in the direction of the opposite end of the arm members 265. Here, the channel formed between each finger member and a facing top surface of an arm member 265 will have a dimension that is similar to (e.g. slightly larger than) the thickness of an emissive surface structure to be received therein. In at least some cases a resilient and flexible rubber, plastic or other type pad may be placed on the surface of each finger in the channel to retain the edge of an emissive surface structure received in the channel.

Referring still to FIG. 26, extension member 260 extends upward from a rear end of tray 262 and support arm 272 is mounted to the top end of member 260. Support arm 272 includes a rigid and elongated central member (also 272) and forward extending members 274 and 276 that extend forward from first and second ends of member 272. Each member 274 and 276 forms an obtuse angle with a front surface of member 272 where the angle is selected so that portions of an emissive surface structure aligned generally therewith will be at optimal orientations with respect to a station user. For instance, the obtuse angles may be anywhere from 95 degrees to 150 degrees and, in some useful embodiments, may be between 110 and 125 degrees. Stops 278 and 280 akin to the stops 268 and 270 described above are provided at distal ends of members 274 and 276, respectively. Again, rubber or plastic pads may be located in the channels formed by stops 278 and 280 for helping to retain edges of an emissive surface structure.

Figure 27:
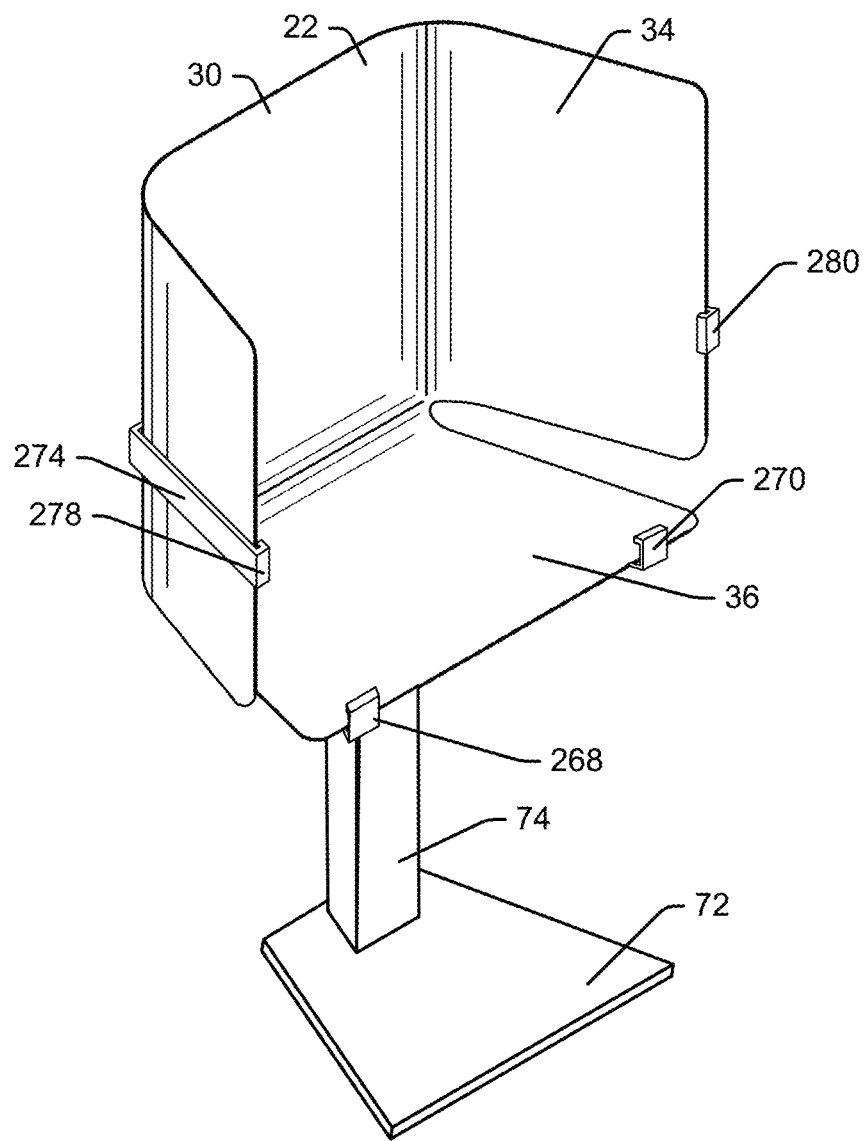
FIG. 27 shows the structure of FIG. 26 supporting a bendable emissive surface sub-structure.

Referring now to FIG. 27, an emissive surface structure 22 akin to the structures described above with respect to FIG. 3 is shown mounted to the support structure of FIG. 26. Here, members 32, 34 and 36 are bent about axis in a fashion similar to that described above and the structure 22 is slid into the supported position shown with front edges of members 32, 34 and 36 received in the stop channels. After mounting, the top surface of member 264 (see again FIG. 26) provides full support to the portions of structure that a user will usually contact during station use. While support for other emissive surface sections on structure 22 will be less, the forces applied to the other structure sections will be substantially less and in fact may be minimal if software only requires touch input on the top surface of section 36.

An emissive surface user may want to change the relative juxtapositions of at least portions of a flexible display screen to accommodate different needs or desired effects at different times. For instance, in some cases a workstation user may want to focus and work independently of others and in that case the relatively enclosed workstation structure described above with respect to FIGS. 2 through 4 may be optimal as the structure affords a good deal of privacy to a station user. In other cases the station user may want to share emissive surface content with one or more other persons. In this case, the user may want to open up an emissive surface structure into a more open configuration so that others can view content in a less crowded environment.

For cases where a user may want to change relative juxtapositions of different portions of an emissive surface structure, at least some embodiments of the present disclosure include articulable support structures. To this end, see the exemplary support structure 310 in FIG. 28. Structure 310 is similar to the structure 248 described above with respect to FIGS. 26 and 27, except that structure 310 includes three pivot joints or hinges, a first joint 290 between tray 262 and the top end of leg member 74, a second pivot joint between arm members 272 and 274 and a third joint between arm members 272 and 276. Pivot 290 is substantially horizontal so that pivot 290 enables rotation of tray 262 as indicated by arrow 296 while pivots 292 and 294 are substantially vertical so that arm members 274 and 276 can rotate as indicated by arrows 298 and 300, respectively. Here, the components of the pivot structures would, in at least some embodiments, cause at least some friction so that once the components are forced into position, the position would be maintained by the joint friction until a subsequent force is applied so that the rigidity of the emissive surface structure would not be the deciding factor on where the structure portions would be aligned.

Figure 28:
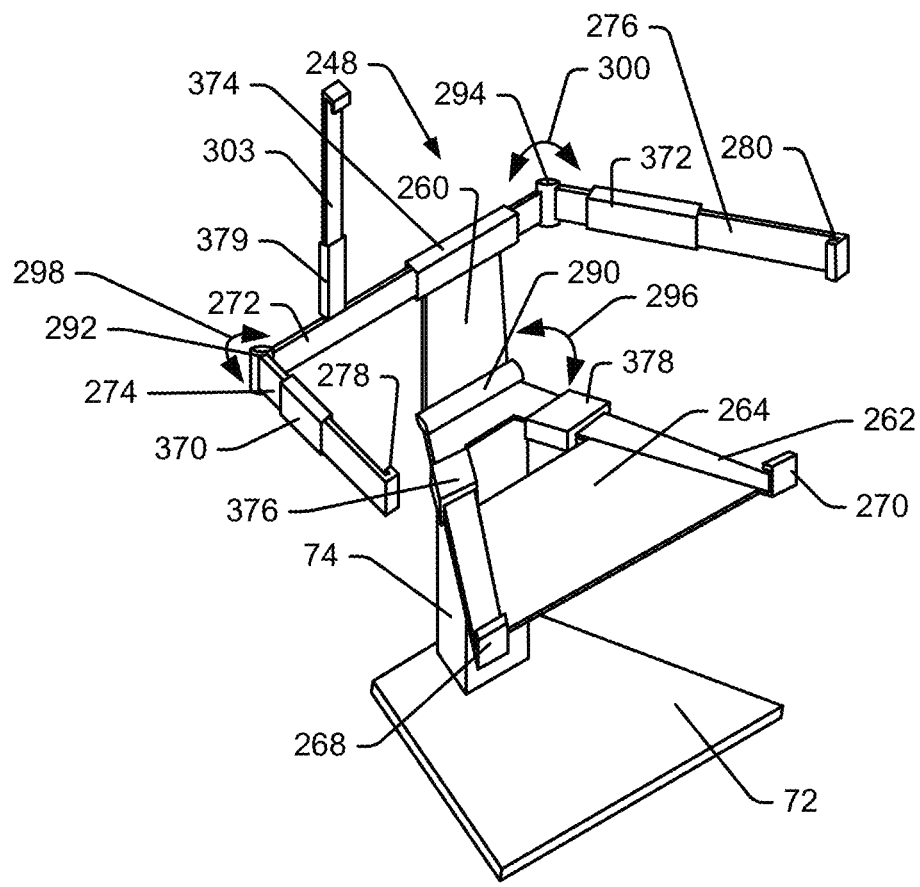
FIG. 28 is similar to FIG. 26, albeit showing another emissive surface support structure.

In FIG. 28, the structure 248 is shown including an optional vertically extending support arm 303 that includes yet another stop structure akin to the stop structures 268 and 270 described above for retaining a top edge of an emissive surface structure. In addition the support structure of FIG. 28 may include supporting members that telescope. For instance, leg member 74 may include a telescoping structure for adjusting the height of a supported emissive surface structure. As other instances, member 272 may include a telescoping structure as at 374, member 303 may include a telescoping structure as at 379, each of the arm members included in the tray 262 as at 376 and 378 and members 274 and 276 may include telescoping structure as a 370 and 372, respectively. In this manner, the structure 248 may be adjusted to accommodate different sizes and required shapes of an emissive surface structure. In at least some cases each of the telescoping mechanisms may include friction so that once a telescoped position is set, the force applied by a resilient emissive surface structure cannot overcome the friction of the mechanism and the mechanism remains in a set extended position. In other cases some type of mechanical locking mechanism may be provided in any of the pivot mechanisms and in any of the telescoping mechanisms so that once a configuration is set, the configuration can be locked.

Figure 29:
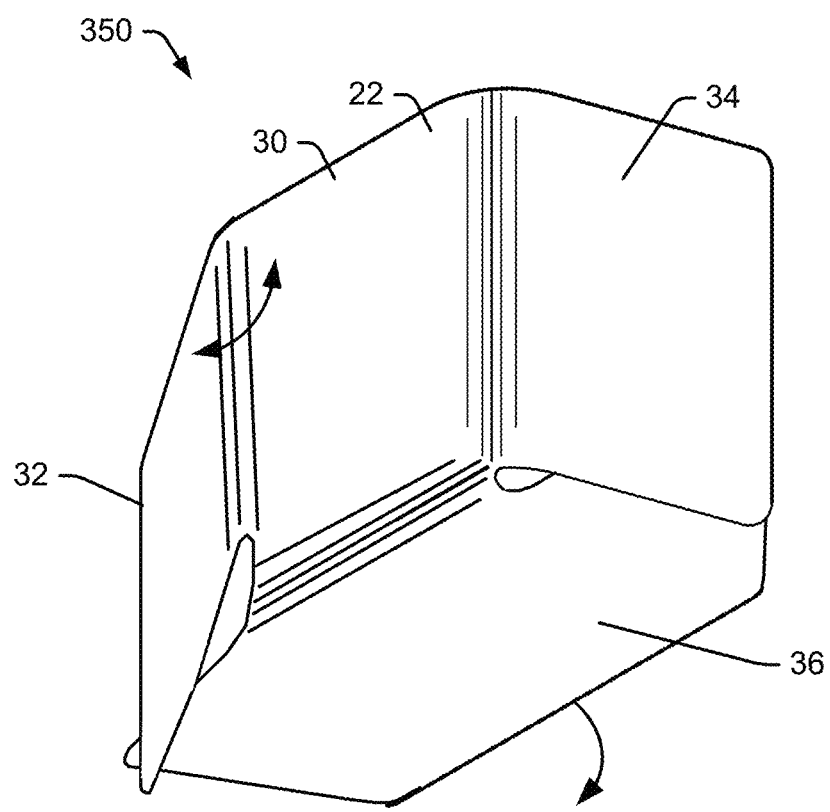
FIG. 29 shows a bendable emissive surface sub-structure.

FIG. 29 shows an emissive surface structure 350 without a supporting substructure, where portion 32 has been rotated outward into a more open configuration. Section 34 may likewise be supported by a supporting substructure for rotation about a vertical axis. Section 36 would be moveable to change the angle of a top surface thereof to accommodate users that like to use angled work surfaces. Referring still to FIG. 29, it should be recognized that in the illustrated embodiment section 36 has an enlarged top surface area so that, even when sections 32 and 34 are rotated into the open workstation configuration, the top surface of section 36 generally fills the workstation space defined by surface sections 32, 36 and 34.

Figure 30:
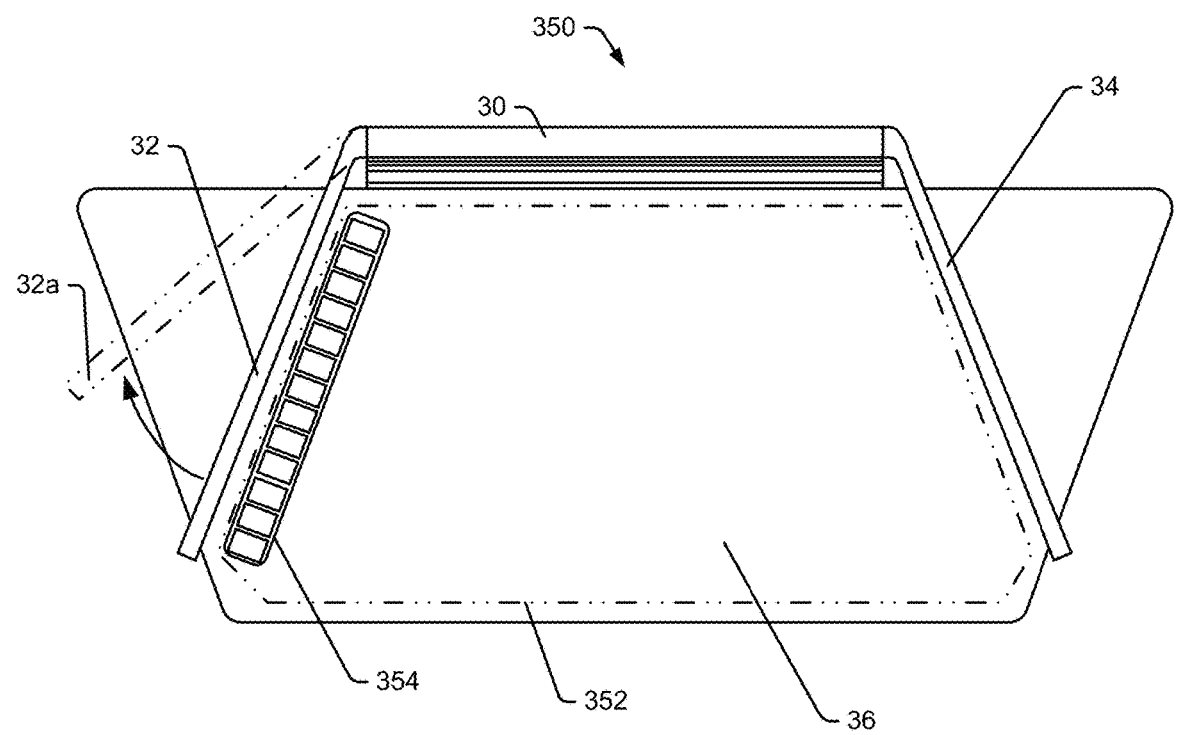
FIG. 30 shows a top plan view of the structure of FIG. 29 with portions of the emissive surface sub-structure in a first relative juxtaposition.
Figure 31:
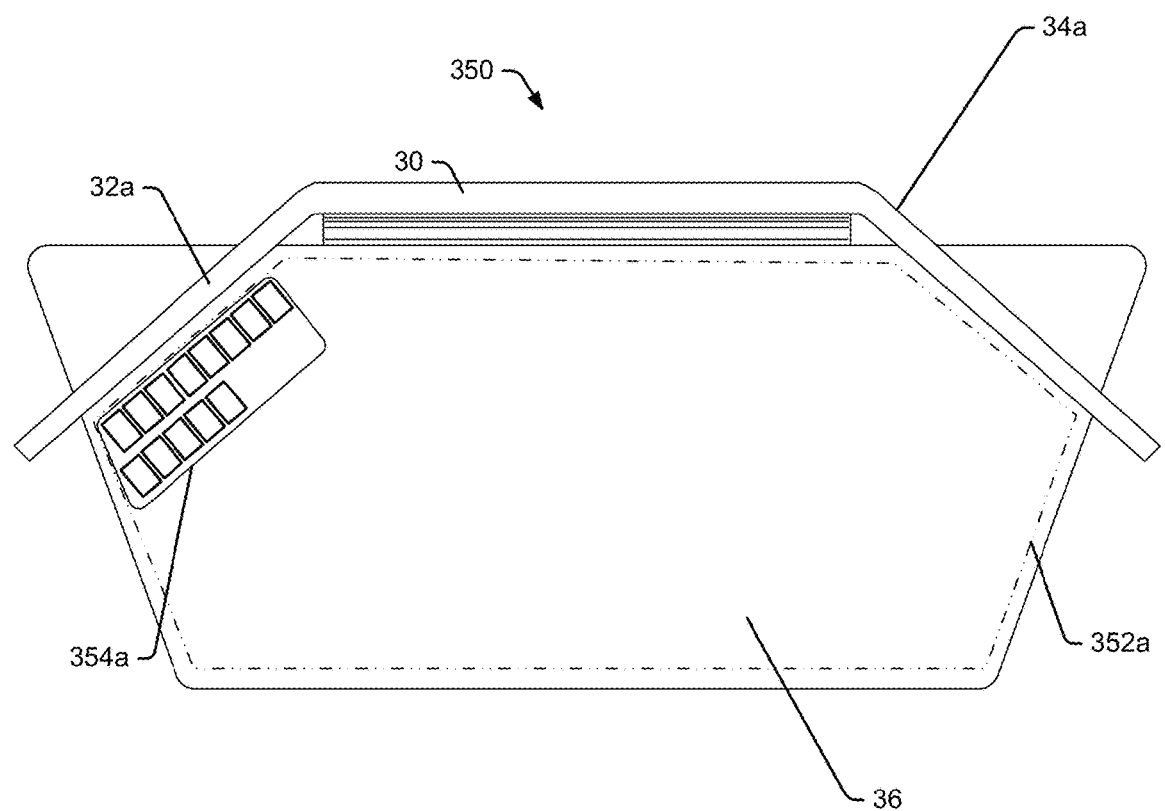
FIG. 31 is similar to FIG. 30, albeit showing portion of the emissive surface sub-structure in a second relative configuration.

In at least some embodiments where the juxtapositions of one or another emissive surface sections of an emissive surface structure can be altered, it has been recognized that relative movement of the sections can result in different portions of the emissive surfaces being viewable and blocked from view at different times. To this end, see FIGS. 30 and 31 that show a top plan view of the emissive surface structure of FIG. 29. In FIG. 30, sections 32 and 34 are in relatively closed positions that may be suitable for focused single person activities. Section 32 is shown in phantom at 32*a* in a relatively open position in FIG. 30. In FIG. 31, sections 32 and 34 are shown at 32*a* and 34*a* in relatively open positions. Comparing FIGS. 30 and 31, it can be seen that a larger portion 352*a* of the top surface of section 36 is viewable in FIG. 31 when sections 32*a* and 34*a* are in the open positions than is viewable at 352 in FIG. 30 when sections 32 and 34 are in the relatively closed positions.

Because viewable surface area of section 36 changes as sections 32 and 34 are moved, the content presented on the top surface of section 36 may be altered automatically to optimize content presentation. For instance, in FIG. 30, see that a virtual window 354 with 13 images is shown along a lateral portion of the viewable part 352 of section 36. This window 354, for instance, may present images corresponding to thirteen separate most recently accessed documents for use by a workstation user. In FIG. 30, when screen section 32*a* is moved to the open position, the content including the images and surrounding window may be automatically moved and rearranged as shown at 354*a* so that the content continues to be located at the peripheral edge of the viewable section 352*a* of the top surface of section 36.

While the example of automatic reformatting of content here is simple, it should be appreciated that other automatic reformatting is contemplated.

Referring again to FIG. 1, in at least some embodiments a system will include a position feedback sensor or sensors 18 linked to the controller for sensing the locations of different portions of emissive surface structures. Here, as the relative juxtapositions of different sections of a surface are changed, the positions are sensed and controller 12 uses that position information to determine how to change the content displayed on the different sections in an optimized or user preferred manner. Any type of position sensors may be used including but not limited to sensors within the pivot joints, cameras (e.g., a camera above a workstation or attached thereto to generate images useable to assess relative positions, proximity sensors, etc.).

Figure 32:
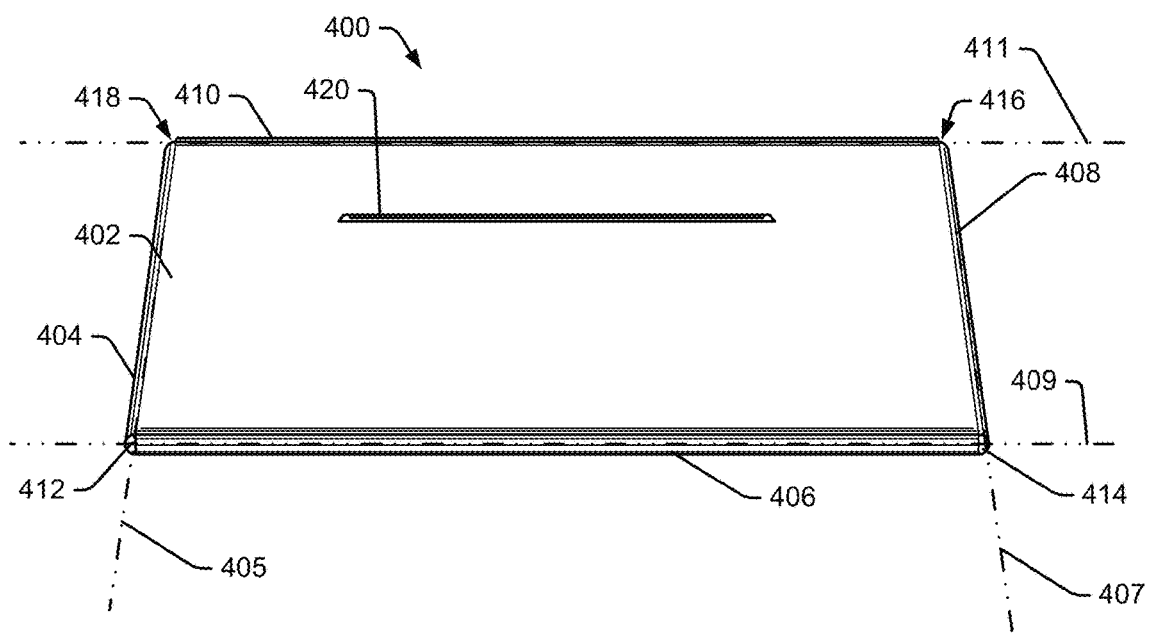
FIG. 32 shows a perspective plan view of an emissive surface structure that is consistent with at least some aspects of the present invention.
Figure 33:
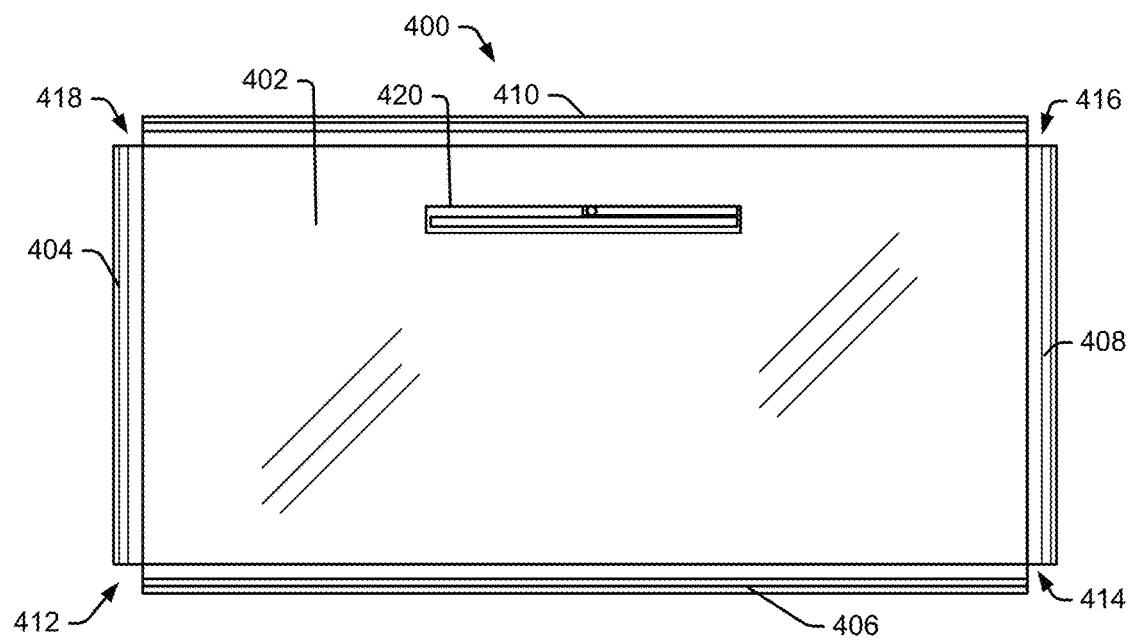
FIG. 33 shows the structure of FIG. 32 in top plan view.

Other useful emissive surface configurations can be constructed by limiting curvature of flexible emissive surface structures such that any part of the structure only curves about a single axis. For instance, see FIGS. 32 and 33 where an emissive surface table top structure 400 is shown where the structure includes curved emissive edges 404, 406, 408 and 410 and a flat emissive top surface 402. Here, by leaving corner portions of the flexible emissive structure cut out at 412, 414, 416 and 418, the edges can be bent about axis 405, 407, 409 and 411 as illustrated to form the curved edges where bezel structure is located proximate an undersurface of the structure 400. To this end, see also FIG. 35 where a hidden bezel and associated functional components are shown at 466. Although not shown it is contemplated that hidden bezels like 466 would be located along the edge portions of the undersurface of structure 400.

Figure 34:
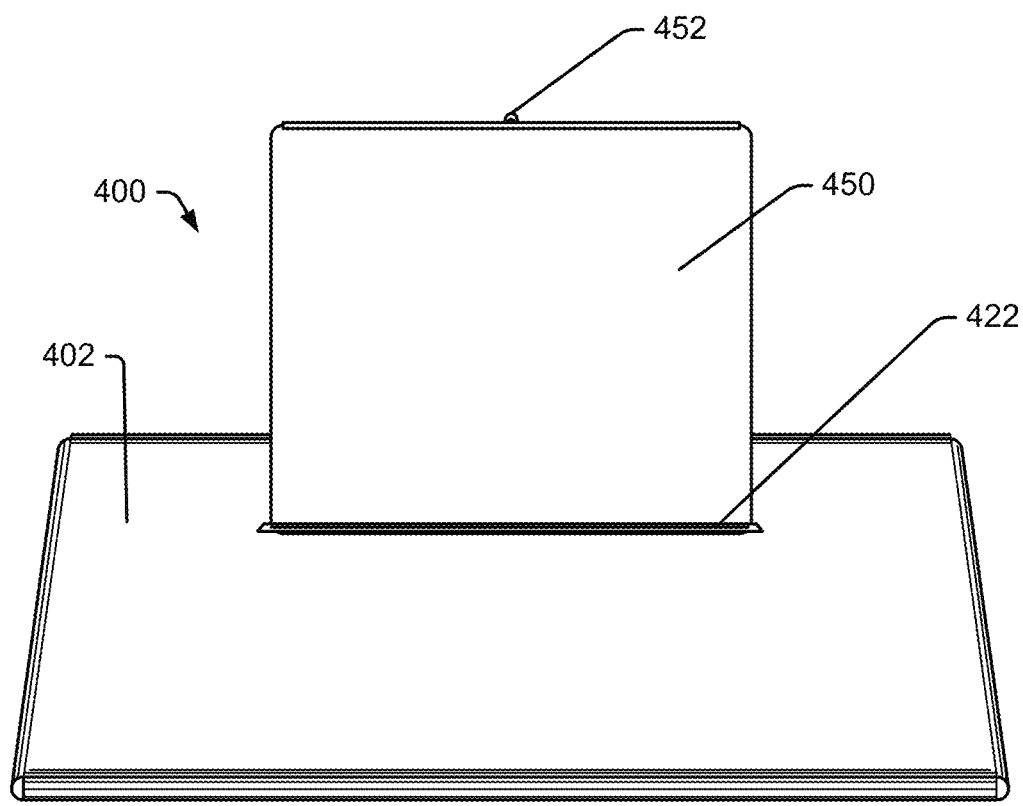
FIG. 34 shows the structure of FIG. 32 with a generally upright emissive surface pulled up into a used position.
Figure 35:
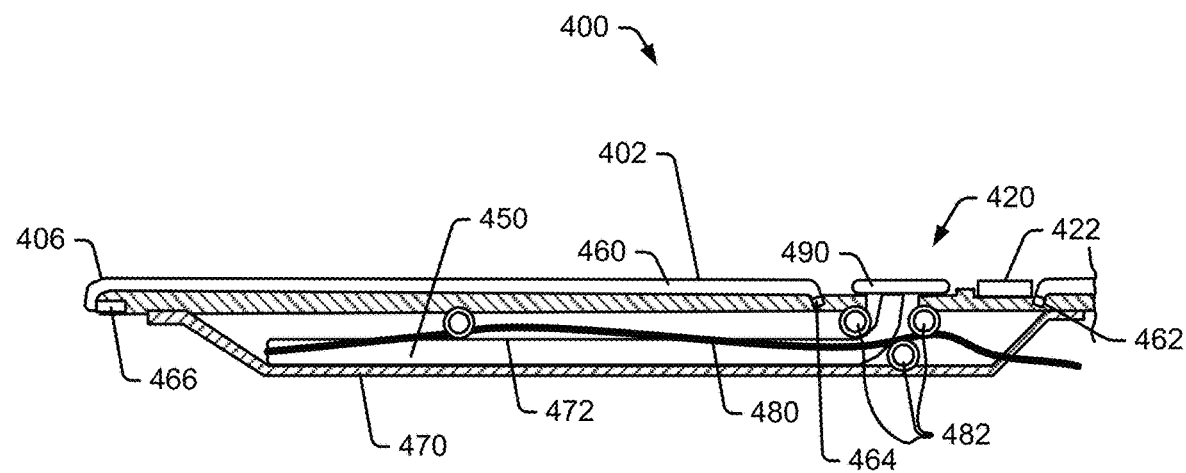
FIG. 35 shows a cross-sectional view of the assembly of FIG. 34.
Figure 36:
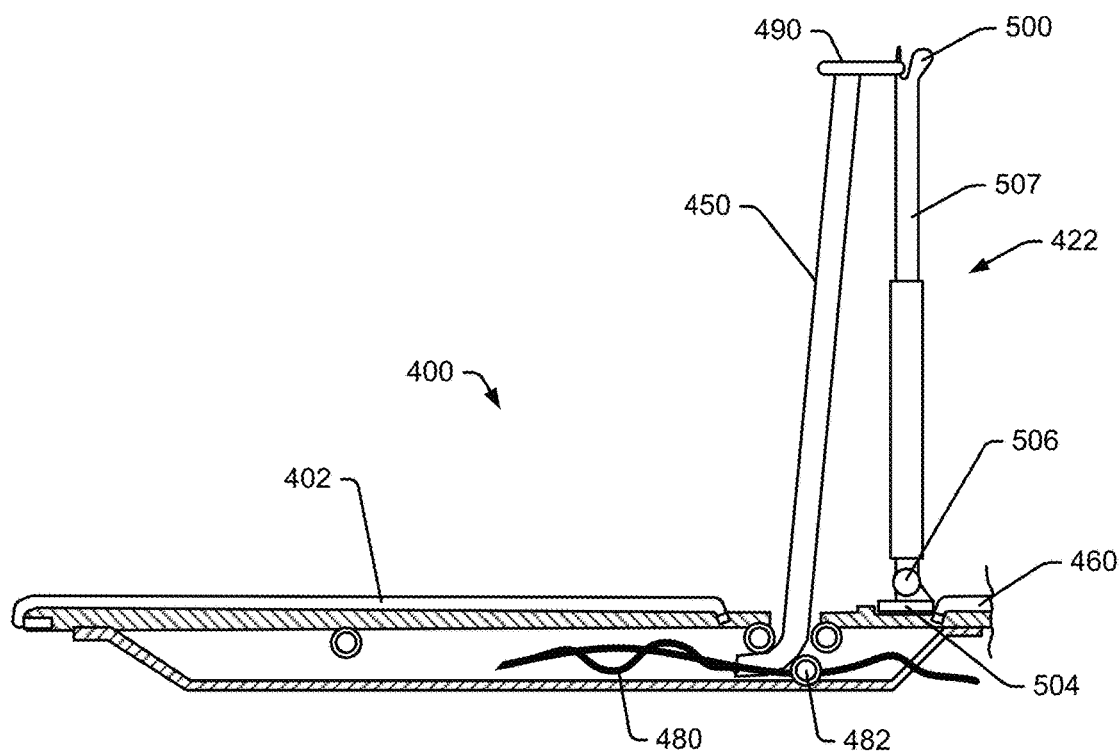
FIG. 36 shows the assembly of FIG. 35 with an emissive surface pulled up into a used position.

Referring again to FIGS. 32 and 33 and also to FIGS. 34 through 36, in at least some embodiments a slot 420 may be formed in the emissive surface 402 through which an extendable flexible emissive surface 450 can be pulled up and generally vertical for use as shown in FIGS. 34 and 36. As shown, in at least some embodiments hidden bezels 464 and 466 may be provided within slot 420 for terminating portions of top emissive surface structure 402. Here, as in the case of the corners shown in FIGS. 33 and 34, the corners of the emissive surface about slot 420 would also be missing so that curvature of structure 402 into the slot may be about a single axis at any point along the edge of the slot. Exemplary structure for providing an extendable emissive surface is shown in FIG. 35. The exemplary structure includes a housing member 470 that mechanically fastens (e.g., via screws) to the undersurface of a support substructure and that forms a cavity below slot 420. Guide wheels or rollers 482 are provided proximate slot 420 and may also be provided along other portions of the cavity 472 for guiding surface 450 during extension and storage movements. Power cord 480 is located in the cavity or channel 472 ands links to structure 450 to provide power and perhaps data thereto. A thin flat handle 490 is mounted to a top edge of structure 4540 for pulling the structure into the extended position. A recess is formed about slot 420 so that the flat handle can rest therein and be essentially flush with the top surface 402 when the structure 450 is stored. A support arm assembly 422 is located within slot 420 and can rotate upward into a supporting position when needed. When stowed, the support arm 422 is substantially flush with the top surface 402.

Referring to FIG. 36, arm structure 422 includes, in at least some embodiments, two pivots or hinges 504 and 506, a hook 500 at a distal end and a telescoping mechanism 507 along its length. Hinge 504 allows arm assembly 422 to rotated about a horizontal axis into a substantially vertical supporting position as shown in FIG. 36. Once the assembly 422 is rotated into a vertical position, hinge 506 enables rotation about a second horizontal axis perpendicular to the axis of hinge 504 so that the arm assembly 422 can rotate into an adjustable tipped position for changing the angle of an emissive structure supported thereby. Telescoping structure 507 enables a user to adjust the length of assembly 422 and thereby the height of a supported emissive surface. Hook 500 is designed to cooperate with a coupling mechanism (e.g., an opening in member 490) formed by member 490 to secure a structure 450 in an extended position. In at least some embodiments structure 507 and hinges 504 and 506 are designed to have friction so that once placed in a specific orientation, the arm assembly 422 components maintain that position until affirmatively moved by a user.

In operation, referring again to FIGS. 32 and 33, a station user may simply use the top surface 402 of structure 400 to review content or share content with one or more other persons proximate structure 400. If the user wants a heads up emissive surface, referring to FIGS. 35 and 36, the user can simply rotate arm assembly 422 upward and extend the assembly to a desired height. Next, the user can pull up on handle 490 and clip the handle onto hook 500. Once pulled into the use position, the FIG. 1 controller may be programmed to sense that the emissive surface of structure 450 is viewable and may modify content accordingly and automatically. The content arrangement may be changed as a function of the height at which a user arranges the top of surface structure 450. Thus, if the user only pulls the top edge of structure to an weight inch height the content may be differently arranged than if the user pulls the structure 450 to a 24 inch height. Here, where structure 450 is relatively stiff, the structure itself will maintain its generally flat shape and form and will resiliently assume its relaxed form after being pulled out of the stored position.

Figure 37:
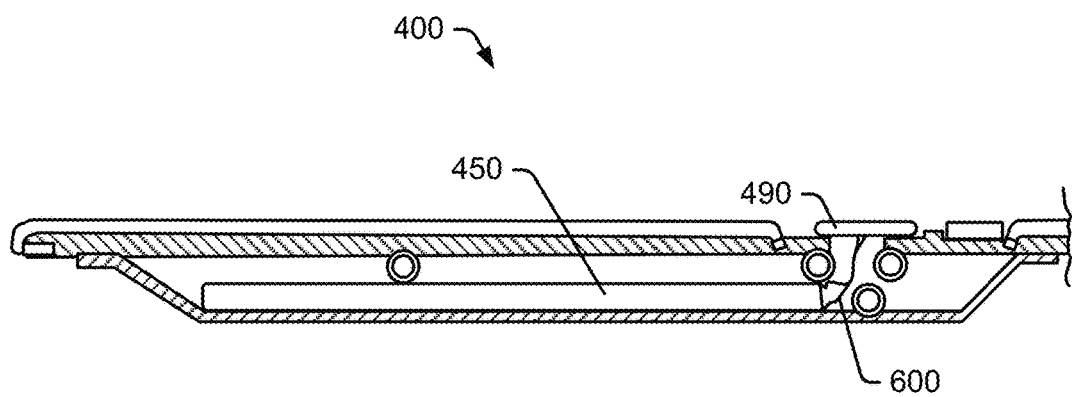
FIG. 37 is similar to FIG. 35, albeit showing another embodiment.

In at least some embodiments it may be that long term storage of a screen in a bent or rolled position may cause the structure to require substantial time to move back into its flat steady state. For this reason, in at least some embodiments it is contemplated that, while an emissive surface structure is flexible, the structure will nevertheless be stored in a generally flat orientation and the screen will only bend or curve during short periods when the structure is being moved between stored and use positions. To this end, see the exemplary assembly in FIG. 37 where a flexible intermediate fabric member 600 is disposed between flexible emissive surface structure 450 and handle 490. Here, fabric member 600 is extremely flexible. Structure 450 is flat when stored and would also be flat when in the extended use position. In this case, in at least some embodiments, the FIG. 1 controller may be programmed so that content is not provided to the pull out emissive surface structure 450 until the structure has been completely pulled out into the extended position so that the user does not keep the emissive surface structure in a bent orientation for a substantial amount of time.

Figure 38:
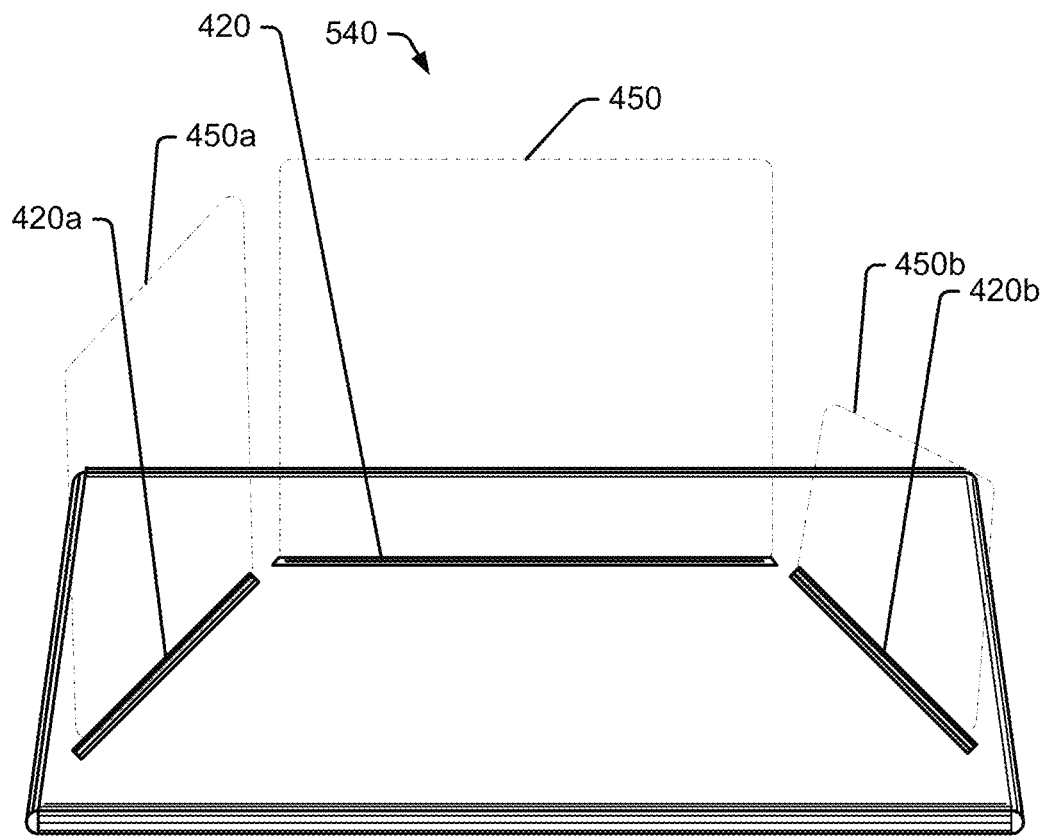
FIG. 38 is similar to FIG. 32, albeit showing an emissive surface structure that includes three bendable emissive sub-structures that can be pulled up into used positions.

In some embodiments it is contemplated that a workstation may include several extendable display screens. To this end, see fog instance FIG. 38 where a top member of an emissive surface forms three slots 420, 420a and 420b arranged about a location at which a station user may be seated. In FIG. 38 three pull out emissive surface structures 450, 450a and 450b are shown in phantom. In addition to enabling a user to provide more heads up display or screen space, the three extendable structures enable a user to configure a station that affords a greater sense of privacy. In FIG. 38 note that screen 450b is shown in a partially extended position which screen 450 and 450a are shown in positions where they have been extended to a greater degree.

Figure 39:
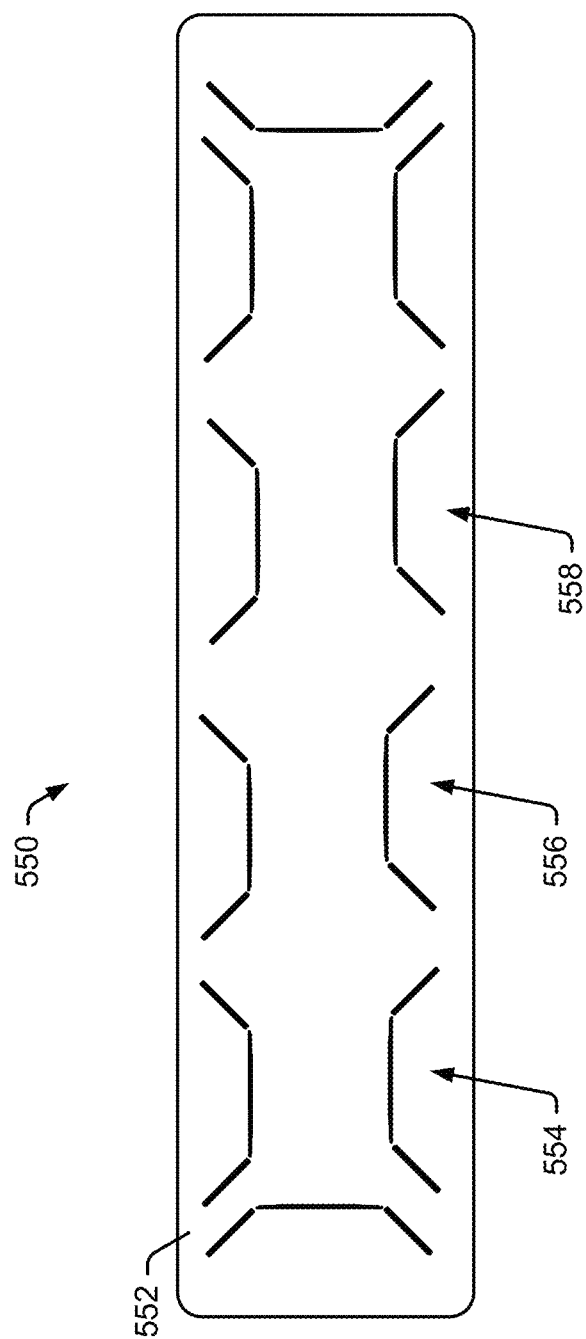
FIG. 39 is a top plan view of a conference table assembly that includes a plurality of emissive surfaces that can be pulled up into used positions when desired.

Some embodiments of the present disclosure contemplate a larger conference table that includes subsets of pull out display screens or emissive surfaces about several different user spaces. To this end, see FIG. 39 that shows a large emissive table assembly 550 that includes a top emissive surface 552 and groups of three pullout screens 554, 556 and 558 and others arranged about an edge of the top 552. Here, top 552 may be formed as was the station structure in FIGS. 33 and 34 to include rolled emissive edges as well as the top emissive surface. Each bank of three pull out screens 554, 556, 558, etc., may include screens akin to the three screens contemplated in FIG. 38. Here, in operation, if users want to work independently of others at table 550, the user can simply extend screens about the user to afford greater privacy. If users are working together, the users can retract the screens at the user spaces and carry on a larger conference. In some cases users ma want to extend screens half way or lower while conferencing so the users can see each other and still have some vertical heads up access to content (e.g. sort of like a laptop).

Figure 40:
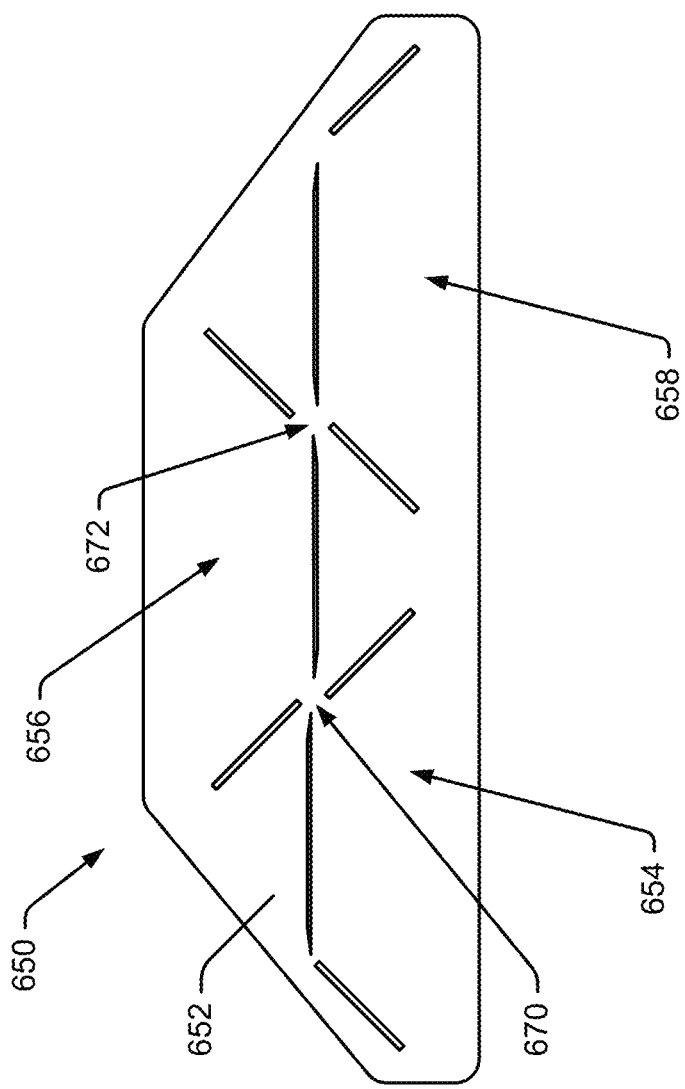
FIG. 40 is similar to FIG. 39, albeit showing a second shaped configuration.

Another large table based structure 650 is shown in FIG. 40. Structure 650 includes an emissive surface top member 652 as well as three banks of extendable display screens 654, 656 and 658 arranged about the top surface edge to support three users. Here, the extendable screens are arranged so that spaces or gaps there between when all of the screens are in the extended positions leave sight paths to spaces about the top member associated with locations of other users. For instance, see the gap 670 that enables users associated with screen banks 654 and 656 to see into each others spaces when at certain locations in their own spaces as well as gap 672 that enables users in spaces associated with banks 656 and 658 to see into each others spaces.

Figure 41:
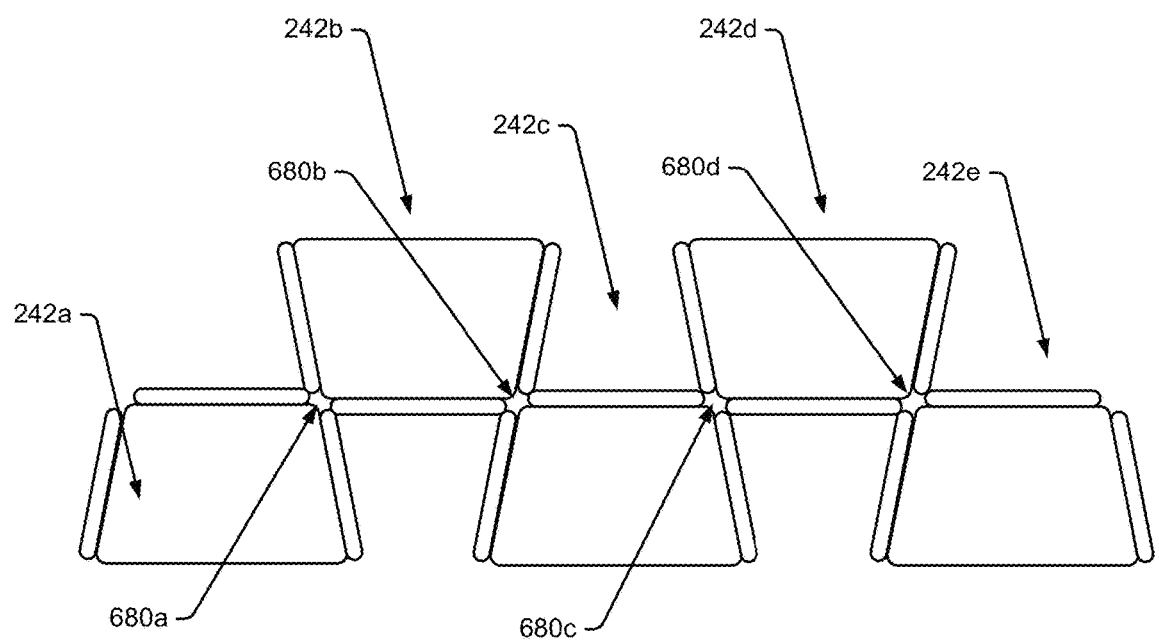
FIG. 41 is a top plan view of a plurality of emissive surface workstations like the one shown in FIG. 21 arranged so that open slots formed by the workstations are aligned with each other.

This concept of arranging screen to afford privacy while still enabling users of different spaces or stations to see each other is also applicable to other stations described above. For instance, see FIG. 41 where stations 242a through 242e akin to station 242 described above with respect to FIG. 21 are shown arranged so that sight paths 680a through 680d are formed through screen gaps at the separate stations.

Figure 42:
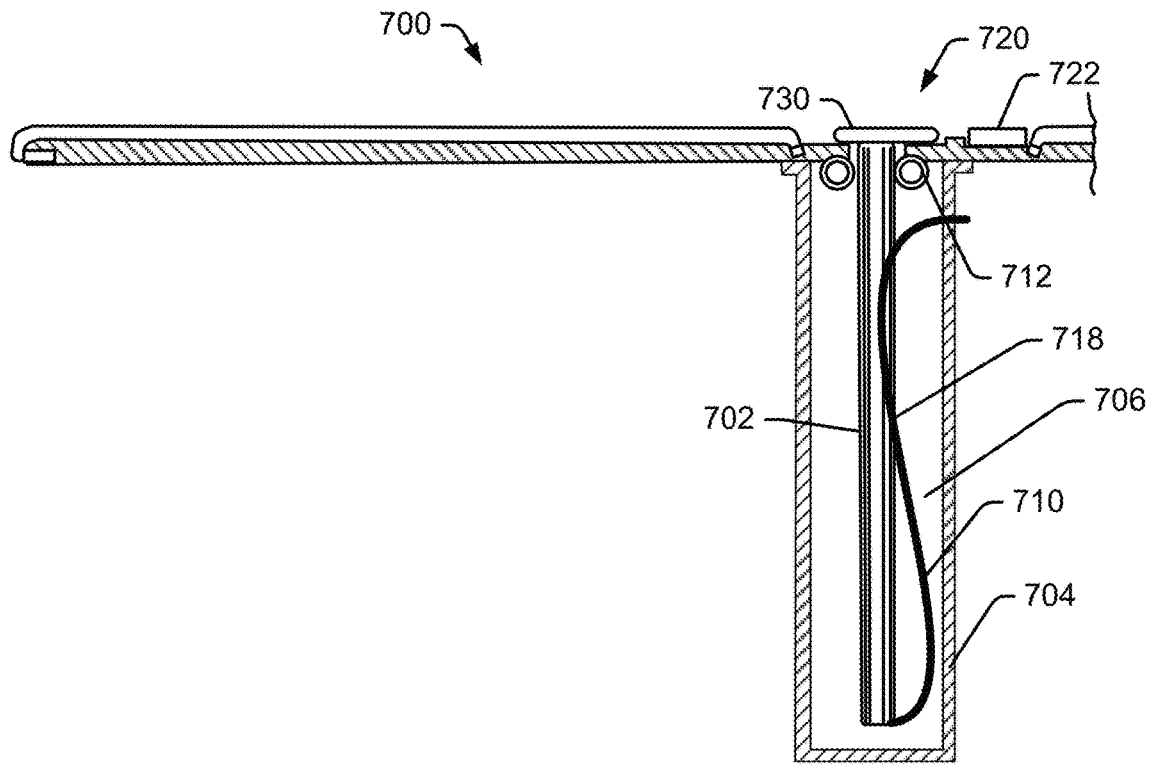
FIG. 42 is similar to FIG. 35, albeit illustrating yet another emissive surface structure where a portion of an emissive surface can be pulled into an upright position when desired.
Figure 43:
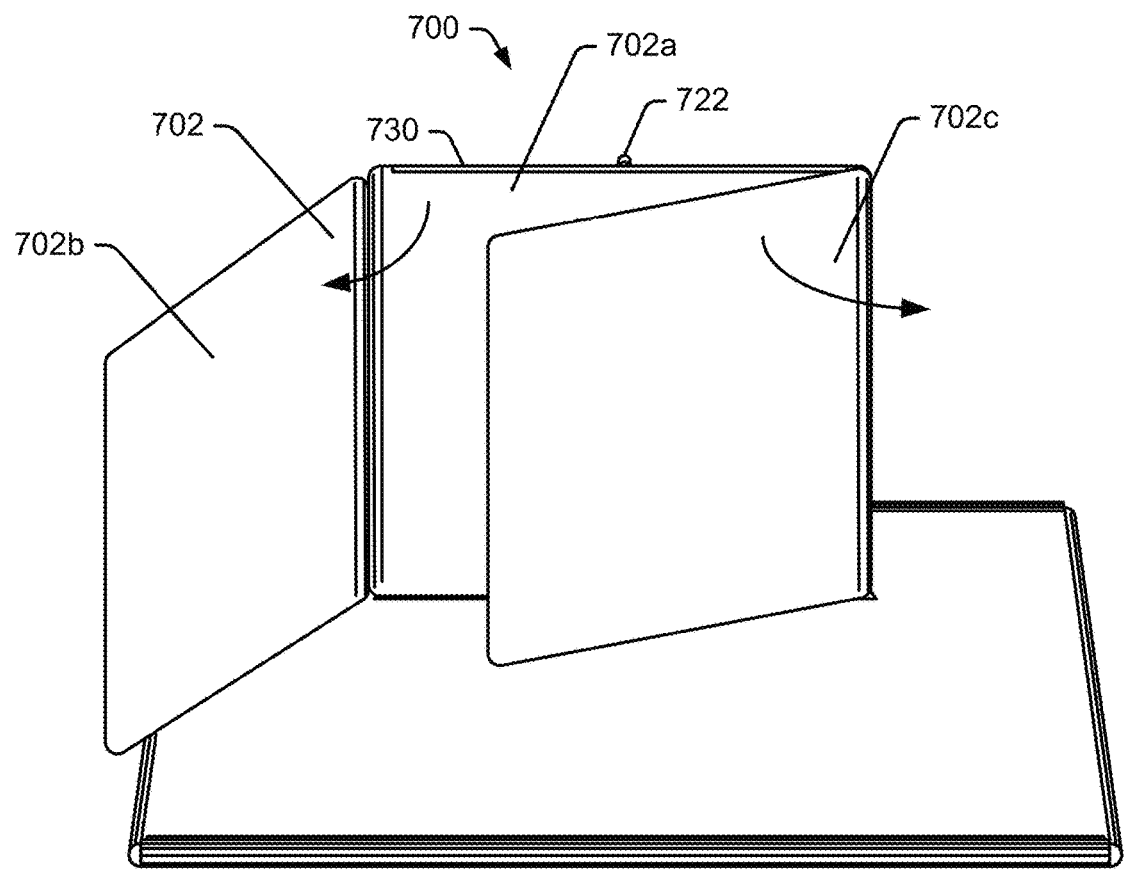
FIG. 43 shows the structure shown in FIG. 42, albeit where a portion of an emissive surface has pulled upward and is being folded outward for use.

Referring to FIGS. 42 and 43, another embodiment of an extendable emissive surface structure or display screen system 700 is shown that includes an extendable foldout screen assembly 702. The system 700 is shown in the context of an emissive table top structure akin to the ones described above that forms a slot 720 in which the extendable screen can be stored. The system includes a housing structure 704 mounted below the slot where, in this case, the housing structure is vertically oriented and forms a channel or cavity 706. Here, vertical (or at least angled) orientation may be needed in order to provide a screen assembly where each section or portion only needs to bend or curve about a single axis. A power and data cord is shown at 710 that is linked to assembly 702. Rollers 712 are provided to help guide assembly 702 between stored and retracted positions. A support arm assembly 722 akin to the arm assembly described above is hingedly linked in slot 720. Referring to FIG. 43, a handle 730 can be pulled upward to lift assembly 702 into a position generally above the slot 720 and handle 730 can be mounted to a hook at the distal end of the arm assembly 722. As seen in FIG. 43, assembly 702 includes emissive surface portions 702a, 702b and 702c that are attached by bent and flexible portions of the assembly 702 where portions or section 702ab and 702c can be rotated outward as shown into use positions.

In at least some embodiments movement of an emissive surface portion may cause the FIG. 1 controller to automatically log a user out of a computer system, and lock the workstation or to log a user onto a workstation.

Figure 44:
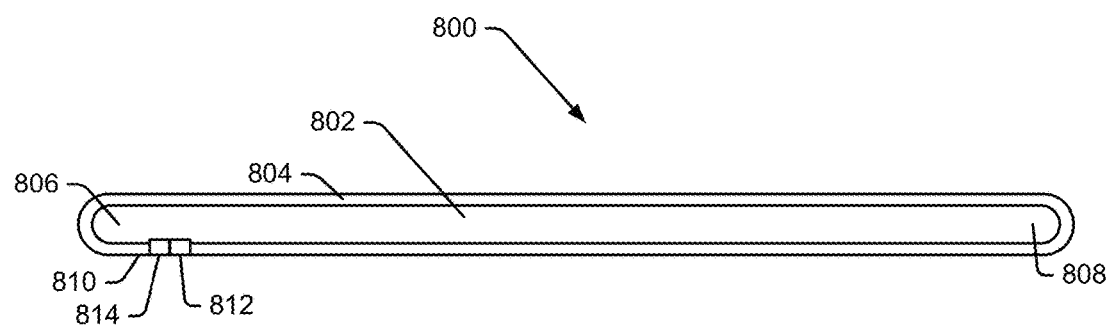
FIG. 44 is a schematic showing an emissive surface structure where an emissive surface is formed on two sides of a support structure.

Referring now to FIG. 44, another embodiment 800 that is consistent with at least some aspects of the present invention includes an integral emissive surface member that bends or curves about edges of a support structure and where the surface member substantially covers opposite sides of the support structure. To this end, embodiment 800 includes a rigid rectilinear support structure 802 show in FIG. 44 in cross section where emissive surface member 804 wraps about opposite edges 806 and 808 of support structure 802 and has adjacent edges 810 and 812 that are straight, substantially parallel and adjacent each other. In FIG. 44, the adjacent edges 810 and 812 terminal in bezel members 814 and 816, respectively, that are substantially immediately adjacent each other, so that the non-emissive portion of the structure 800 is slim and minimal. In FIG. 44 the structure 800 is shown in cross section and therefore only showing two edges. It should be appreciated that other edges of the support structure 802 may also be wrapped in emissive surface.

Figure 45:
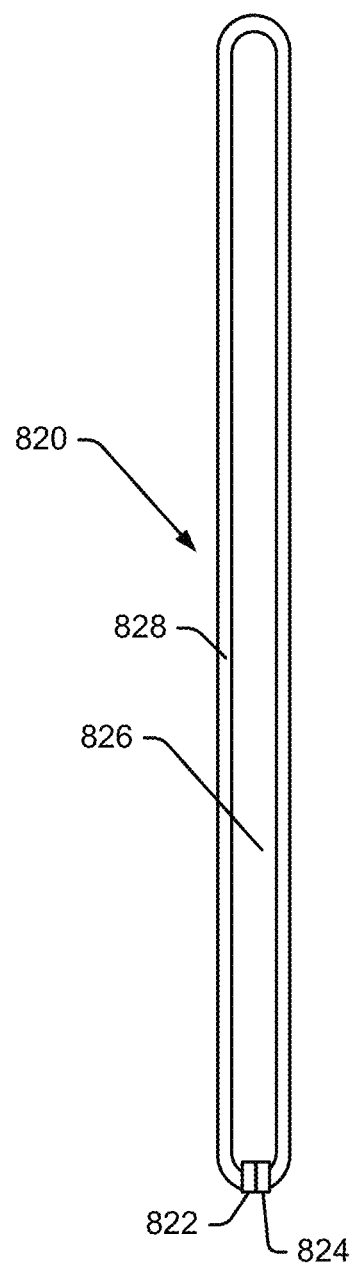
FIG. 45 is similar to FIG. 44, albeit where bezels for an emissive surface are arranged along a lower edge of an emissive surface structure.
Figure 46:
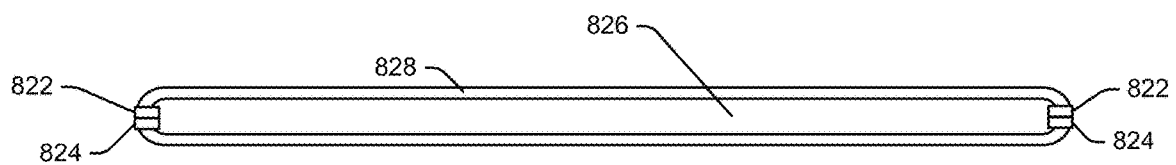
FIG. 46 is similar to FIG. 45, albeit where bezels are provided along two edges of a support structure.

FIG. 45 shows a structure 820 that is similar to the structure 800 shown in FIG. 44, albeit where the a seam formed by adjacent bezel members 822 and 824 is along an edge of a support structure 826 as opposed to along a broad side of the structure 826. In this case both broad sides and the top edge of the structure 820 are completely emissive 828. In addition, from vantage points adjacent either side of structure 820 the bottom edge of structure 820 should appear emissive. Here, the lateral or side edges of structure 820 may also include curved emissive surfaces that terminate in bezels 822 and 824 that run along the side edges of support structure 826 as shown in FIG. 46. Again, here, from a perspective adjacent each broad side of structure 820, the side edges appear completely emissive.

Figure 47:
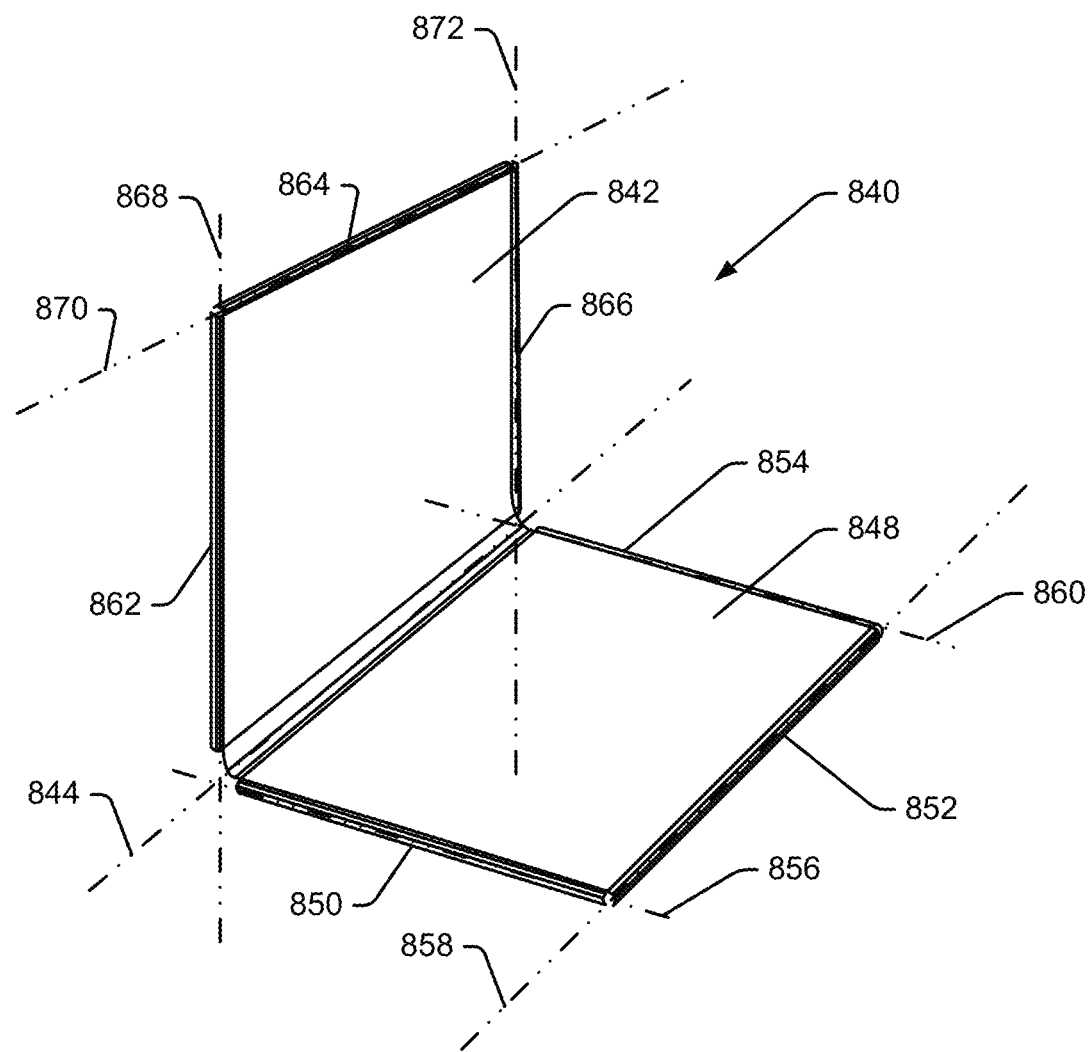
FIG. 47 shows an emissive surface structure arranged to form a workstation where all straight edges of an emissive surface are curved.

Referring to FIG. 47, another emissive surface structure 840 that may provide a work station for a single user is illustrated. The structure 840 includes a single integrated emissive surface member 842 that is supported by a rigid support structure (not illustrated). Member 842 includes two substantially flat or planar rectangular portions 846 and 848, portion 846 substantially vertically oriented and portion 848 substantially horizontally oriented. A curved portion that curves about a substantially horizontal axis 844 is located between portions 846 and 848.

Referring still to FIG. 47, rectangular portion 846 includes a top edge opposite the portion that curves about axis 844 and first and second substantially parallel lateral edges. The top edge of portion 846 includes a curved portion 864 that curves about a second horizontal axis 870 so that the top edge appears to be emissive from a vantage point facing surface 846. Similarly, side or lateral edges of portion 846 curve downward to form curved side edge portions 8850 and 854 that curve about substantially horizontal axis 856 and 860, respectively.

In FIG. 47, although not shown, straight bezel members would be provided along free edges of the emissive surface member 842 rearward of portion 846 and below portion 848. Corners between adjacent straight edge sections of emissive surface member 842 are cut out or left open so that there is no need for emissive surface portions that curve about more than one axis. In embodiments where an emissive surface includes one or more mechanical buttons or switched (e.g., on/of buttons, volume buttons, etc.), the mechanical buttons/switches may be placed in the open corners.

Figure 48:
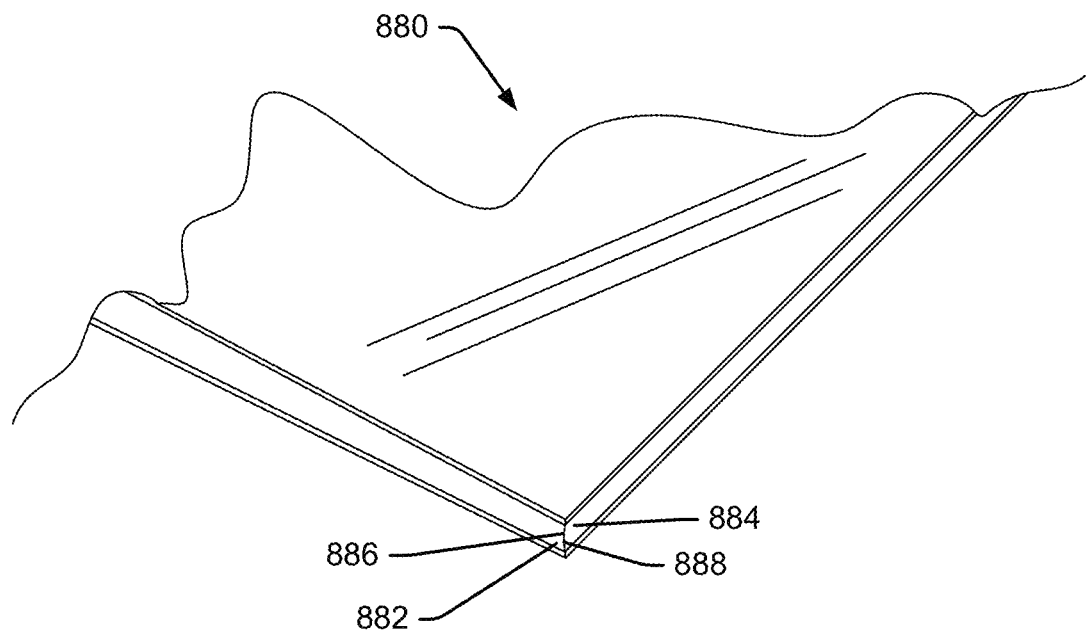
FIG. 48 shows the corner of a emissive surface structure where adjacent portions of the emissive surface are mitered to provide a relatively thin corner gap.

In still other embodiments where adjacent straight edges of a single integrated emissive surface structure are curved, adjacent edges of the curved portions may be immediately adjacent each other so that there are no open corners on a resulting structure. To this end, see, for instance, FIG. 48 where an embodiments 880 includes edges 882 and 884 of adjacent curved portions that are immediately adjacent (e.g., have immediately adjacent bezel sections 886 and 888. This arrangement can result in a more finished appearance that may be preferred by some.

Figure 49:
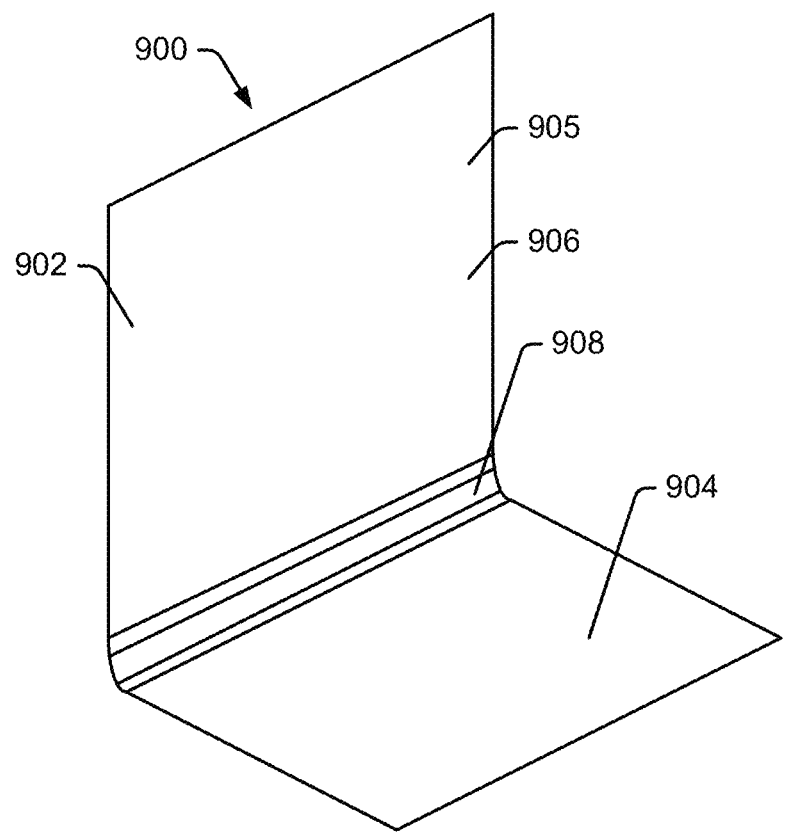
FIG. 49 shows an emissive surface sub-structure in a generally upright position.
Figure 50:
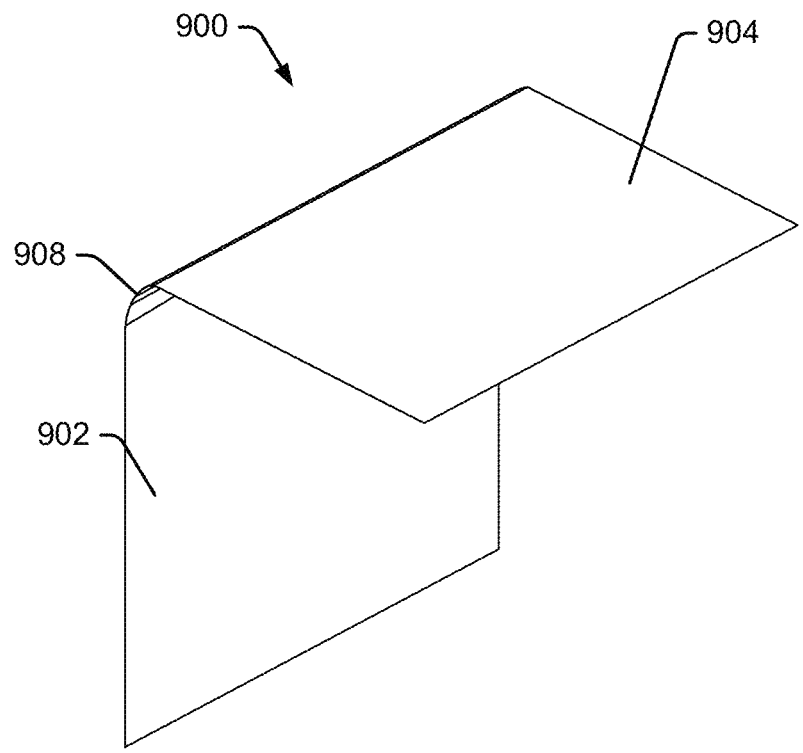
FIG. 50 is similar to FIG. 49, albeit showing the emissive surface sub-structure in a generally downward position.
Figure 51:
FIG. 51 shows two emissive structures like the one in FIG. 49 arranged to form a well therebetween where the two structures are to be used by two different persons.

Referring to FIG. 49, another emissive surface configuration 900 includes a single and integrated emissive surface member 902 that includes first and second substantially flat and planar rectangular portions 904 and 906 that are separated by a curved and bendable portion 908 there between. Member 902 forms an emissive surface 905. In the illustrated embodiment portion or section 904 is substantially horizontally oriented and section 906 is substantially vertically oriented (e.g., may be slightly angled to extend rearward from a bottom portion to a top edge). In this embodiment a support structure may include features that can be arranged to support the emissive member 902 in at least two different positions. For instance, in a personal use orientation as in FIG. 49, portion 906 extends upward and the portion of surface 905 formed by portion 906 faces in a first direction and can be viewed from one side of configuration 900. In a sharing or open position member 902 may bend downward at 908 so that the portion of emissive surface 905 formed by portion 906 faces in a second direction opposite the first direction shown in FIG. 50. In this regard, see also FIG. 51 where two structures 900a and 900b akin to the structure 900 shown in FIG. 49 are illustrated in a back to back relationship in the personal use positions where two persons may work independently of others. See also FIG. 52 where structures 900a and 900b are in sharing positions. See that in the personal use positions, in addition to providing heads up emissive surfaces, portions 906 (see also FIG. 49) provide some privacy for a user. When structures 900a and 900b are in the sharing positions as in FIG. 52, the structures 906a and 906b provide only minimal privacy but portions of surface 905 that face each other are viewable in a "well" between structures 906a and 906b by persons across from the structures 906a and 906b. In this case surfaces 905 that face each other in FIG. 52 can be used to share content with others across from a structure 900a or 900b.

Figure 52:
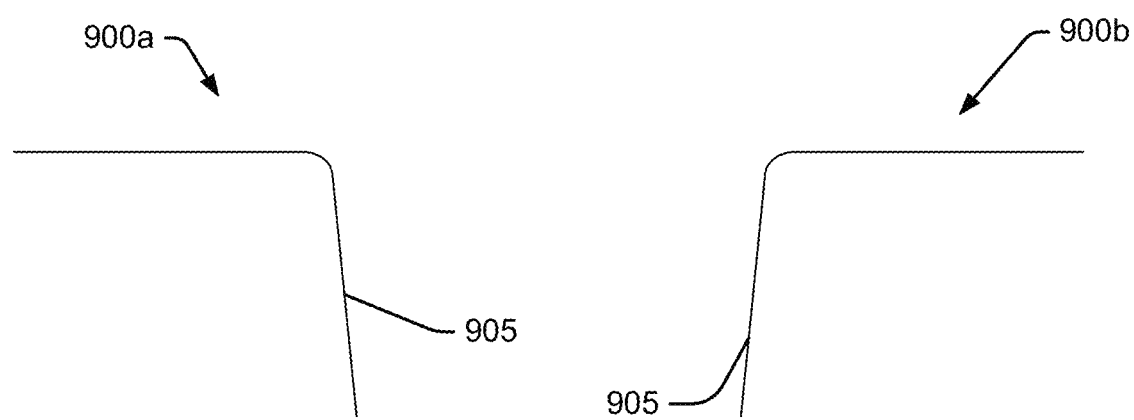
FIG. 52 is similar to FIG. 51, albeit showing portions of the sub-structures bent down into the well.
Figure 53:
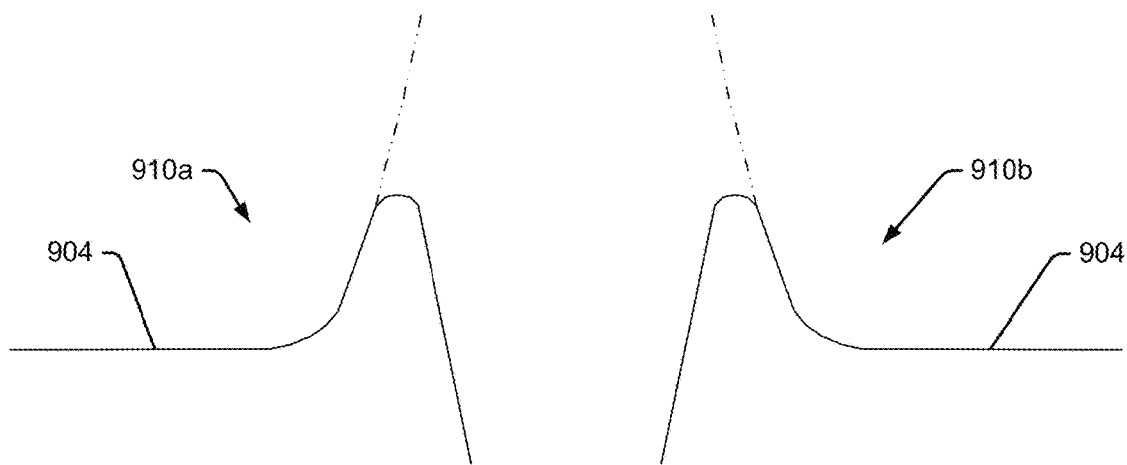
FIG. 53 is similar to FIG. 51, albeit showing two other sub-structures that may be used to provide workstations for two people.

FIG. 53 is similar to FIG. 52, albeit showing first and second emissive surface structures 910a and 910b in a sharing position. Here, each structure 910a and 910b includes a horizontal rectangular portion 904 and a curved portion 908 that leads into another portion there above. In this case, however, about one third of the way up the another portion, the another portion is bendable about a horizontal axis to assume a personal use-upright position (see phantom) and a downward extending position (shown in solid lines) wherein a portion of the upper portion of the emissive surface can be used on either side of the structure for viewing information.

Although a number of exemplary display and emissive surface structures are shown and described, it should be apparent that the features illustrated can be combined and interchanged in a number of different configurations, and combined with other features known in the art. To apprise the public of the scope of this invention, the following claims are made:

What is claimed is:

1. A furniture assembly including emissive surfaces on which dynamic information may be presented, the assembly comprising:
a first emissive surface section including at least a first straight peripheral portion and at least a first curved portion that curves about at least a first axis, curved portions of the first emissive surface section only curving about axis that are substantially parallel to the at least a first axis;
a second emissive surface section including at least a second curved portion that curves about at least a second axis, curved portions of the second emissive surface section only curving about axis that are substantially parallel to the at least a second axis, the second emissive surface section adjacent to and abutting the first straight peripheral portion along the length of the first straight peripheral portion, the second axis non-parallel to the first axis; and
a driver for controlling information presented on the emissive surface sections.

2. The furniture assembly of claim 1 wherein the first and second emissive surface sections are integrally formed along the first straight peripheral portion.

3. The furniture assembly of claim 2 wherein the emissive surfaces are contiguous across the first straight peripheral portion.

4. The furniture assembly of claim 2 wherein at least portions of the emissive surface sections that are integrally formed are flexible so that the relative juxtapositions of the surface portions can be modified.

5. The furniture assembly of claim 4 including a support structure that supports the emissive surfaces in a use position.

6. The furniture assembly of claim 5 wherein the support structure is adjustable to support the emissive surfaces in a plurality of relative juxtapositions.

7. The furniture assembly of claim 4 wherein at least some of the curved portions are flexible so that relative juxtapositions of the emissive surface sections can be modified.

8. The furniture assembly of claim 1 wherein the emissive surface sections comprise electronic displays.

9. The furniture assembly of claim 1 wherein the first axis is substantially horizontal and wherein the second axis forms at least some angle with a horizontal plane.

10. The furniture assembly of claim 9 wherein the first curved portion is adjacent the first straight peripheral portion and wherein the first emissive surface section includes a first substantially flat portion adjacent the first curved portion.

11. The furniture assembly of claim 10 wherein the second emissive surface section further includes a second substantially flat portion adjacent the first straight peripheral portion and that separates the second curved portion from the first straight peripheral portion.

12. The furniture assembly of claim 11 wherein the second substantially flat portion resides in a plane that forms a presentation angle with a vertical plane wherein the presentation angle is between zero degrees and forty-five degrees.

13. The furniture assembly of claim 12 wherein the first straight peripheral portion is substantially parallel to the first axis.

14. The furniture assembly of claim 13 wherein the second axis is substantially perpendicular to the first axis.

15. The furniture assembly of claim 13 wherein the second emissive surface section includes a third curved portion spaced from the second curved portion by the second substantially flat portion.

16. The furniture assembly of claim 15 wherein the second emissive surface section includes at least a third substantially flat portion that is separated from the second substantially flat portion by the second curved portion.

17. The furniture assembly of claim 16 wherein the second emissive surface section includes at least a fourth substantially flat portion that is separated from the second substantially flat portion by the third curved portion.

18. The furniture assembly of claim 17 wherein the first substantially flat portion extends in a forward direction from the first curved potion and the second substantially flat portion extends upward from the first curved portion.

19. The furniture assembly of claim 18 wherein the third substantially flat portion extends in the forward direction from the second curved portion and the fourth substantially flat portion extends in the forward direction from the third curved portion.

20. The furniture assembly of claim 18 wherein the third substantially flat portion and the fourth substantially flat portion are non-parallel.

21. The furniture assembly of claim 1 wherein the second emissive surface further includes at least a second straight peripheral portion, the assembly further including at least a third emissive surface section including at least a third curved portion that curves about at least a third axis, curved portions of the third emissive surface section only curving about axis that are substantially parallel to the at least a third axis, the third emissive surface section adjacent to and abutting the second straight peripheral portion along the length of the second straight peripheral portion.

22. The furniture assembly of claim 21 wherein the third axis is non-parallel to the second axis.

23. The furniture assembly of claim 1 wherein the emissive surface sections form a workstation, the first emissive surface section forming a substantially horizontal work surface and the second emissive surface section forming at least a partially upright display surface.

24. The furniture assembly of claim 23 wherein the partially upright display surface includes at least a flat portion.

25. The furniture assembly of claim 1 wherein the first emissive surface section and the second emissive surface section are independently formed and further including a support structure for supporting the second emissive surface section adjacent the first emissive surface section.

26. The furniture assembly of claim 1 wherein the first substantially flat portion forms a trapezoid.

27. The furniture assembly of claim 1 wherein the first axis is substantially horizontal and wherein the second axis is also substantially horizontal.

28. The furniture assembly of claim 27 wherein the first emissive surface section includes a first substantially flat portion adjacent the first curved portion and wherein the second curved portion is adjacent the first curved portion.

29. The furniture assembly of claim 28 wherein the second emissive surface section further includes a second substantially flat portion adjacent the second curved portion where the second curved portion separates the first substantially flat portion from the second substantially flat portion.

30. The furniture assembly of claim 29 wherein the second substantially flat portion resides in a plane that forms a presentation angle with a vertical plane wherein the presentation angle is between zero degrees and forty-five degrees.

31. The furniture assembly of claim 30 further including a third emissive surface section including at least a third curved portion that curves about at least a third axis, curved portions of the third emissive surface section only curving about axis that are substantially parallel to the at least a third axis, the third emissive surface section adjacent to and abutting the first straight peripheral portion along the length of a second straight peripheral portion, the third axis non-parallel to the first axis.

32. The furniture assembly of claim 31 wherein the third axis is non-parallel to the second axis.

33. The furniture assembly of claim 32 wherein each of the first, second and third axis are substantially horizontal.

34. The furniture assembly of claim 1 wherein the first emissive surface section includes a first substantially flat portion and the second emissive surface section includes a second substantially flat portion and wherein at least one of the curved portions is flexible so that the relative juxtaposition of the second substantially flat portion to the first substantially flat portion can be changed.

35. The furniture assembly of claim 34 wherein the driver presents a user interface via at least one of the first and second emissive surface sections and wherein, as the relative juxtaposition of the second substantially flat portion to the first substantially flat portion changes, the driver modifies the user interface so that the interface remains unblocked from an assembly user.

36. The furniture assembly of claim 1 further including a support structure for supporting the emissive surface sections above an ambient floor surface and wherein the emissive surfaces form a workstation.

37. The furniture assembly of claim 36 wherein the emissive surface sections form at least three substantially flat emissive surface portions and wherein at least one of the substantially flat emissive surface portions is substantially horizontally oriented.

38. The furniture assembly of claim 37 wherein the second substantially flat portions extends upward adjacent a rear edge of the first substantially flat portion.

39. A furniture assembly including emissive surfaces on which dynamic information may be presented, the assembly comprising:
a first emissive surface section including at least a first straight peripheral portion and at least a first curved portion that curves about at least a first axis, curved portions of the first emissive surface section only curving about axis that are substantially parallel to the at least a first axis, the first emissive surface section further including at least a first substantially flat portion;
a second emissive surface section including at least a second curved portion that curves about at least a second axis, curved portions of the second emissive surface section only curving about axis that are substantially parallel to the at least a second axis, the second emissive surface section adjacent to and abutting the first straight peripheral portion along the length of the first straight peripheral portion, the second axis non-parallel to the first axis, the second emissive surface section forming at least a second substantially flat portion, at least one of the first and second curved portions being flexible so that the relative juxtaposition of at least a first portion and a second portion of the emissive surface sections can be modified; and
a driver for controlling information presented on the emissive surface sections.

40. The furniture assembly of claim 39 wherein the first substantially flat portion and the second substantially flat portion are separated by at least one of the first and second curved portions.

41. The furniture assembly of claim 40 wherein at least the curved portion that separates the first and second emissive surface portions is flexible.

42. The furniture assembly of claim 39 wherein the driver presents a user interface on at least a portion of the emissive surfaces and wherein the driver modifies the user interface as the relative juxtapositions of the surface portions are modified.

43. The furniture assembly of claim 39 wherein the first and second substantially flat portions are substantially horizontal and substantially vertical, respectively.

44. A furniture assembly including emissive surfaces on which dynamic information may be presented, the assembly comprising:
a first emissive surface section including at least a first straight peripheral portion and at least a first curved portion that curves about at least a first axis, curved portions of the first emissive surface section only curving about axis that are substantially parallel to the at least a first axis, the first emissive surface section further including at least first and second substantially flat portions that are adjacent to and separated by the first curved portion, the first substantially flat portion substantially horizontal;
a second emissive surface section including at least a second curved portion that curves about at least a second axis, curved portions of the second emissive surface section only curving about axis that are substantially parallel to the at least a second axis, the second emissive surface section adjacent to and abutting the first straight peripheral portion along the length of the first straight peripheral portion, the second axis non-parallel to the first axis;
a support structure for supporting the emissive surface sections above an ambient floor surface with the first substantially flat portion supported in a substantially horizontal orientation and the second substantially flat portion extending substantially upward from the first curved portion; and
a driver for controlling information presented on the emissive surface sections.

45. The furniture assembly of claim 44 wherein the second substantially flat portion is substantially vertical.

46. The furniture assembly of claim 45 wherein the second emissive surface section includes a third substantially flat portion that is separated from the second substantially flat portion by the second curved portion.

47. The furniture assembly of claim 46 further including a third emissive surface section that includes a third curved portion separated from the second curved portion by the second substantially flat portion and a fourth substantially flat portion separated from the second substantially flat portion by the third curved portion.

* * * * *